(12) United States Patent
Grip

(10) Patent No.: US 8,056,865 B2
(45) Date of Patent: Nov. 15, 2011

(54) MECHANISM FOR CHANGING THE SHAPE OF A CONTROL SURFACE

(75) Inventor: Robert Erik Grip, Ranchos Palos Verdes, CA (US)

(73) Assignee: The Boeing Company, Chicago, IL (US)

(*) Notice: Subject to any disclaimer, the term of this patent is extended or adjusted under 35 U.S.C. 154(b) by 502 days.

(21) Appl. No.: 12/398,951

(22) Filed: Mar. 5, 2009

(65) Prior Publication Data

US 2010/0224734 A1    Sep. 9, 2010

(51) Int. Cl.
B64C 3/44 (2006.01)
(52) U.S. Cl. ............................... 244/219; 244/201
(58) Field of Classification Search ............ 244/219, 244/201, 200, 213, 214, 215, 218, 203
See application file for complete search history.

(56) References Cited

U.S. PATENT DOCUMENTS

| | | | |
|---|---|---|---|
| 3,698,668 A | 10/1972 | Cole | |
| 3,994,452 A | 11/1976 | Cole | |
| 4,053,124 A | 10/1977 | Cole | |
| 4,200,253 A | 4/1980 | Rowarth | |
| 4,247,066 A * | 1/1981 | Frost et al. | 244/219 |
| 4,252,287 A * | 2/1981 | Zimmer | 244/219 |
| 4,351,502 A | 9/1982 | Statkus | |
| 4,429,844 A | 2/1984 | Brown et al. | |
| 4,475,702 A | 10/1984 | Cole | |
| 4,553,722 A | 11/1985 | Cole | |
| 4,650,140 A | 3/1987 | Cole | |
| 4,706,913 A | 11/1987 | Cole | |
| 5,887,828 A * | 3/1999 | Appa | 244/215 |
| 6,010,098 A * | 1/2000 | Campanile et al. | 244/219 |
| 6,644,599 B2 * | 11/2003 | Perez | 244/219 |
| 6,796,534 B2 | 9/2004 | Beyer et al. | |
| 7,264,206 B2 | 9/2007 | Wheaton et al. | |
| 7,270,305 B2 | 9/2007 | Rampton et al. | |
| 7,322,547 B2 | 1/2008 | Konings | |
| 7,338,018 B2 | 3/2008 | Huynh et al. | |
| 7,699,270 B2 | 4/2010 | Lonsinger et al. | |
| 2006/0157623 A1 * | 7/2006 | Voglsinger et al. | 244/219 |
| 2007/0152106 A9 * | 7/2007 | Perez-Sanchez | 244/219 |
| 2011/0017876 A1 * | 1/2011 | Manley et al. | 244/219 |

FOREIGN PATENT DOCUMENTS

| | | | |
|---|---|---|---|
| EP | 1205383 A2 | 5/2002 | |
| WO | 0247976 A2 | 6/2002 | |

OTHER PUBLICATIONS

PCT Search report for application PCT/US2010/023503 dated Sep. 2, 2010.
Davis et al., "Development of the Variable Camber System for a Supercritical Wing", Distribution Limited to Government Agencies Only; Test and Evaluation Data; Jul. 1976; pp. 1-381.
U.S. Appl. No. 13/021,646, filed Feb. 4, 2011, Grip.
U.S. Appl. No. 12/368;559, filed Feb. 10, 2010, Grip.

* cited by examiner

Primary Examiner — Christopher P Ellis
(74) Attorney, Agent, or Firm — Yee & Associates, P.C.

(57) ABSTRACT

An apparatus comprises a structure having a first side, a second side substantially opposite to the first side, a flexible skin, and a plurality of deformable assemblies. The flexible skin is attached to the first side and the second side of the structure. The plurality of deformable assemblies is moveably connected to the structure, in which each deformable assembly in the plurality of deformable assemblies has a vertex and a base. The each deformable assembly in the plurality of deformable assemblies has a height that is capable of changing to change a shape of the structure and a shape of the flexible skin.

60 Claims, 34 Drawing Sheets

MECHANISM FOR CHANGING THE SHAPE OF A CONTROL SURFACE

BACKGROUND INFORMATION

1. Field

The present disclosure relates generally to aircraft and, in particular, to a method and apparatus for controlling aerodynamic performance of an aircraft. Still more particularly, the present disclosure relates to a method and apparatus for changing the shape of a control surface for an aircraft.

2. Background

An aircraft is a type of vehicle capable of flying through the atmosphere. Aircraft may include fixed-wing aircraft and rotor craft. The flight of an aircraft may be controlled by a number of flight control surfaces. A flight control surface is a part of the surface of an aircraft that may control the aerodynamic performance of an aircraft. A flight control surface may be used to adjust or control the attitude of an aircraft. The shape and/or position of flight control surfaces may generate lift, control stability, change direction, change drag, and/or change other suitable aerodynamic parameters for an aircraft.

Flight control surfaces on an aircraft may be used to change the direction of an aircraft around three axes. These axes include a vertical axis, a longitudinal axis, and a lateral axis. A vertical axis passes through an aircraft from top to bottom. Rotation or movement about this axis is called yaw. Yaw changes the direction of the nose of an aircraft pointing it to the left or right. The longitudinal axis passes through the aircraft from the nose to the tail. Rotation about this axis is referred to as bank or roll. The lateral axis passes from one wing tip of an aircraft to another wing tip of an aircraft. Rotation about this axis is referred to as pitch.

Control surfaces may include, for example, an aileron, an elevator, a rotor, a trim, a rudder, a spoiler, a flap, a slat, a thrust reverser, and/or other suitable control surfaces. Different control surfaces may be attached to an airfoil to provide for different axes of motion for the aircraft. An airfoil may be a wing or a blade of an aircraft. These control surfaces may be used to optimize the aerodynamic surfaces of an airfoil.

For example, a flap may be located at a trailing edge of an airfoil in the form of a wing. A flap is an extension to the back of a wing to provide lift augmentation as well as drag augmentation. Further, deployment of a flap may reduce the stalling speed for an aircraft by altering airflow over the wing. Flap deployment may allow an aircraft to climb and/or descend at a steeper angle without an increase in speed. Movement of this type of control surface, as well as other control surfaces, during flight may be performed to maximize the handling and performance of the aircraft.

When deploying a flight control surface, it is desirable to have a control surface that may remain straight in an undeployed configuration but may have a high degree of flow turning in a deployed configuration. The degree of flow turning for a control surface is the degree at which airflow over a wing may be turned or deflected with respect to the original direction of airflow. For example, the deployment of a flap may cause the airflow over a wing during flight to be deflected at some downward angle with respect to the original direction of airflow. Further, it is desirable to have a first side of a control surface that curves in a smooth manner. In other words, the control surface does not have sharp discontinuities in the slope of the first side when in a deployed configuration. It is also desirable to have control surface shape changing systems that do not have protrusions in the mold line of the control surfaces or the aircraft parts to which they are attached.

Currently, existing control surfaces include extension and/or unfolding mechanisms that have protrusions. For example, currently used flap systems may have fittings which protrude into the airstream on a second side of a wing. Some existing control surfaces may use sliding joints to lengthen the first side of a control surface and shorten the second side of a control surface during deployment of the control surface. Further, some control surfaces may also use a sliding joint at the tip of a control surface. These control surfaces may have inadequate strength, may be heavy, and/or may be expensive.

The types of changes to the shape of a control surface that may be made with existing flight control surfaces may be limited and may not provide desired aerodynamic performance. For example, existing flap systems do not allow for a high degree of flow turning. A high degree of flow turning may be direction of airflow at the tip of a deployed flap and may be greater than around 50 degrees inclined to the horizontal plane of the aircraft.

Therefore, it would be advantageous to have a method and apparatus that addresses at least some of the issues discussed above and possibly other issues.

SUMMARY

In one advantageous embodiment, an apparatus comprises a structure having a first side, a second side substantially opposite to the first side, a flexible skin, and a plurality of deformable assemblies. The flexible skin is attached to the first side and the second side of the structure. The plurality of deformable assemblies is moveably connected to the structure, in which each deformable assembly in the plurality of deformable assemblies has a vertex and a base. Each deformable assembly in the plurality of deformable assemblies has a height that is capable of changing to change a shape of the structure and a shape of the flexible skin.

In another advantageous embodiment, an apparatus comprises a structure having a first side, a second side substantially opposite to the first side, a plurality of bays, a flexible skin, a plurality of deformable assemblies, a plurality of connection structures, and an actuator system. The plurality of bays is located within the structure. The flexible skin is attached to the first side and the second side of the structure. The plurality of deformable assemblies is moveably connected to the structure, in which each deformable assembly in the plurality of deformable assemblies has a vertex and a base. Each deformable assembly in the plurality of deformable assemblies has a height that is capable of changing to change a shape of the structure and a shape of the flexible skin. The plurality of connection structures is connected to the plurality of deformable assemblies. Each connection structure in the plurality of connection structures has a vertex and a plurality of members extending from the vertex to an associated deformable assembly in the plurality of deformable assemblies. A first member of the plurality of members is connected to the vertex of each deformable assembly, and a number of other members in the plurality of members is connected to a base of each deformable assembly. The actuator system is connected to a first vertex of a first deformable assembly in a first bay of the plurality of bays and a second vertex of a second deformable assembly in the first bay. A first number of the plurality of deformable assemblies has a first number of vertices linked in series to the first vertex. A second number of the plurality of deformable assemblies has a second number of vertices linked in series to the second vertex. The actuator system is capable of moving the first vertex and the second vertex to change the shape of the structure and the shape of the flexible skin attached to the structure.

In yet another advantageous embodiment, an apparatus comprises a structure, a plurality of bays, a flexible skin, a plurality of deformable assemblies, a plurality of connection structures, a polyhedron structure, and an actuator. The structure has a first side, a second side substantially opposite to the first side, and a base rotatably connected to a frame. The plurality of bays is located within the structure. The flexible skin is attached to the first side and the second side of the structure. The plurality of deformable assemblies is moveably connected to the structure, in which each deformable assembly in the plurality of deformable assemblies has a vertex and a base. The vertex has a height that is capable of changing to change a shape of the structure and a shape of the flexible skin. The plurality of connection structures is connected to the plurality of deformable assemblies, wherein each connection structure in the plurality of connection structures has a vertex and a plurality of members extending from the vertex to an associated deformable assembly in the plurality of deformable assemblies. A first member of the plurality of members is connected to the vertex of each deformable assembly, and a number of other members in the plurality of members is connected to a base of each deformable assembly. Vertices in a number of connection structures in the plurality of connection structures are connected in series to each other. The polyhedron structure has a first vertex and a second vertex forming an edge of the polyhedron structure; a first elongate member extending from a third vertex of the polyhedron structure to the base of the structure; and a second elongate member extending from a fourth vertex to a first vertex in a first connection structure in the number of connection structures. The actuator is connected to the base of the structure, wherein the actuator is capable of moving the base to rotate the structure. Movement of the base is capable of causing the polyhedron structure to move the first vertex in the first connection structure such that the vertex of each deformable assembly changes height to change the shape of the structure and the shape of the flexible skin attached to the structure.

In still another advantageous embodiment, an apparatus comprises a structure, a flexible skin, an array of bays, and a plurality of diagonal members. The structure has a base rotatably attached to a frame. The flexible skin is attached to the structure. The array of bays is in the structure and has a quadrilateral shape capable of changing shape. The plurality of diagonal members is connected to corners in the array of bays. The plurality of diagonal members is capable of changing a length in connection with each other to change the quadrilateral shape of the array of bays to change a shape of the structure. One of the plurality of diagonal members is capable of rotating the structure with a control surface about the frame.

In a further advantageous embodiment, a method is present for controlling a control surface. A position for the control surface comprising a structure having a first side and a second side substantially opposite to the first side is identified. A flexible skin is attached to the first side and the second side of the structure. A plurality of deformable assemblies is moveably connected to the structure, in which each deformable assembly in the plurality of deformable assemblies has a vertex, and a base. The vertex has a height that is capable of changing. A motion generation system connected to the vertex is activated to move the vertex to change a height of a number of deformable assemblies in the plurality of deformable assemblies to change a shape of the control surface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The different advantageous embodiments recognize that it may be desirable to have a control surface that may quickly change shape. The different advantageous embodiments also recognize that it may be desirable to have a control surface that provides a high degree of flow turning for an aircraft. For example, it may be desirable to have a control surface that is straight in an undeployed configuration but curved in a deployed configuration. The curved shape of the control surface may provide a high degree of flow turning.

The different advantageous embodiments recognize that a control surface that curves smoothly such that there are no sharp discontinuities and/or gaps on the first side of the control surface may be desirable. Further, the different advantageous embodiments recognize that a control surface without protrusions in the mold line of the control surface or the airfoil to which the control surface is attached may be desirable.

Current systems may use sliding joints for both the first side and the second side of a control surface. These systems may also use a sliding joint at the tip of the control surface. However, the different advantageous embodiments recognize that it may be desirable to have a control surface without a sliding joint at the tip to improve the stiffness of the tip section of the control surface. Further, problems with sealing the interior of the control surface from the outside environment may be avoided.

Figure 1:
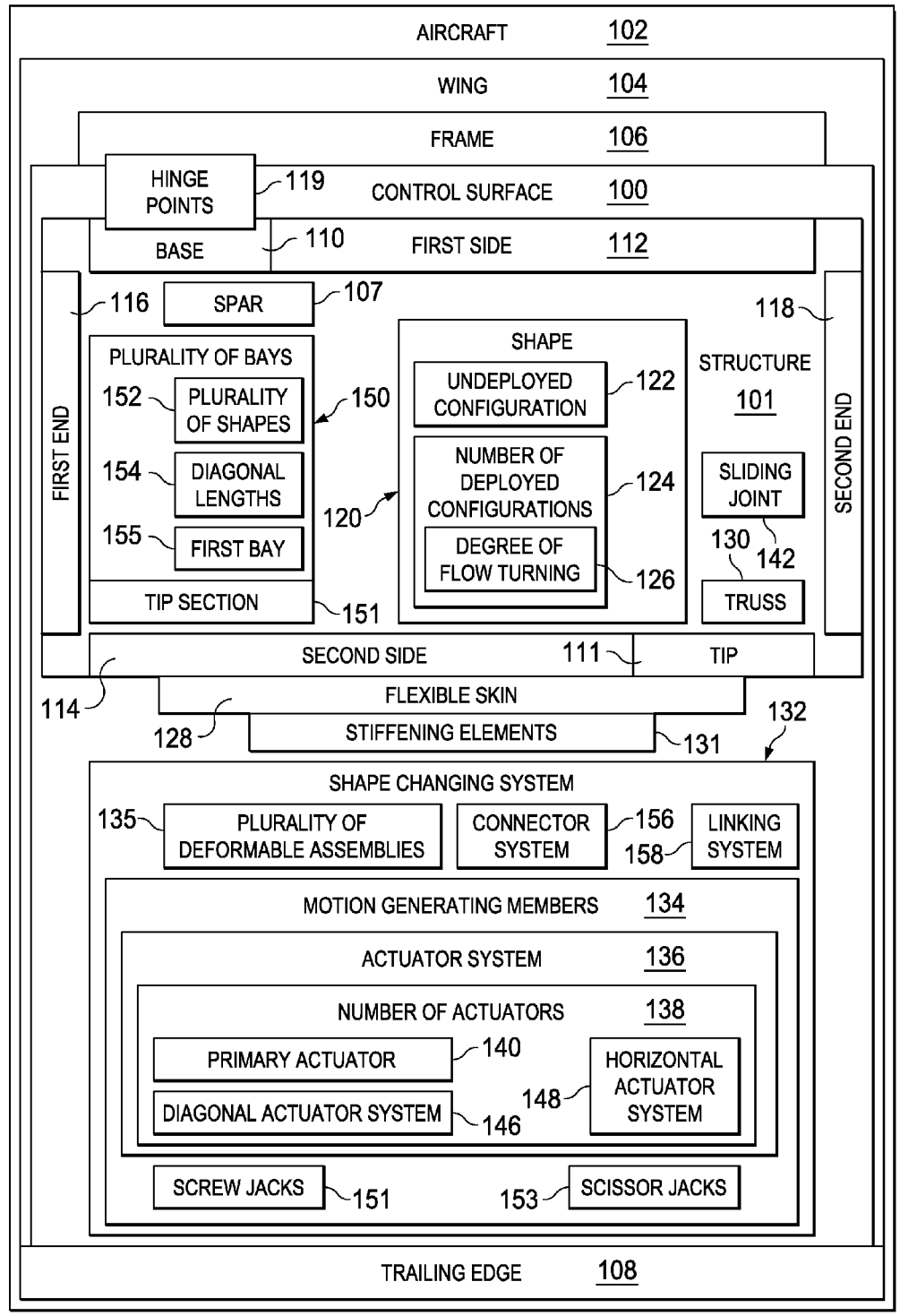
FIG. 1 is a diagram of a control surface for an aircraft in which an advantageous embodiment may be implemented.

With reference now to the figures and, in particular, with reference to FIG. 1, a diagram of a control surface for an aircraft is depicted in which an advantageous embodiment may be implemented. Control surface 100 may be one example of a control surface that may be implemented in an aircraft such as, for example, aircraft 102.

In this illustrative example, aircraft 102 may have wing 104 with control surface 100 attached to frame 106 of wing 104. Control surface 100 may be located at trailing edge 108 of wing 104. Frame 106 may include a number of structural components. These components may include, for example, without limitation, spars, ribs, and/or other structural components. As used herein, "a number of" items refers to one or more items. For example, a number of structural components means one or more structural components.

In this illustrative example, control surface 100 may have structure 101. Structure 101 may be comprised of various members. For example, without limitation, structure 101 may comprise rods, joints, linkage assemblies, and/or various other suitable structural components. Structure 101 may have base 110, tip 111, first side 112, second side 114, first end 116, and second end 118. Structure 101 may also include spar 107. Spar 107 may be moveably attached to frame 106 of wing 104 at hinge points 119 at first side 112 of structure 101.

Hinge points 119 may allow control surface 100 to be moveably attached to wing 104. Hinge points 119 may be stationary fixed hinge points connecting spar 107, first side 112, and base 110 of structure 101 to frame 106. Hinge points 119 may allow movement of structure 101 and control surface 100 with respect to hinge points 119. For example, structure 101 may be capable of rotating about hinge points 119. Tip 111 may be located near trailing edge 108 of wing 104.

In this illustrative example, structure 101 may have a shape such as, for example, shape 120. Shape 120 may be a straight shape, a curved shape, and/or some other suitable shape for structure 101. Shape 120 may change as structure 101 is moved between undeployed configuration 122 and number of deployed configurations 124. In undeployed configuration 122, control surface 100 may have a straight shape. In number of deployed configurations 124, structure 101 may have curved shapes of varying degrees of curvature.

In these examples, number of deployed configurations 124 may allow for a range of degrees of flow turning. For example, number of deployed configurations 124 may provide degree of flow turning 126. In these examples, degree of flow turning 126 may be the angle at which airflow over wing 104 may be deflected to flow over control surface 100. In this manner, number of deployed configurations 124 for control surface 100 may be based on the range of degree of flow turning 126. For example, control surface 100 may allow a 24 degree angle of flow turning with one deployed configuration and a 36 degree angle of flow turning with a second deployed configuration.

Control surface 100 may have a flexible skin such as, for example, flexible skin 128. Flexible skin 128 may be attached to structure 101 on first side 112 and second side 114 of flexible skin 128. Flexible skin 128 may be formed from one or more skin panels. Flexible skin 128 may be a thin skin comprised of a material capable of bending. As structure 101 and control surface 100 change shape, flexible skin 128 may also curve to change shape. For example, flexible skin 128 may be a material capable of bending as control surface 100 is moved into number of deployed configurations 124 and may take on a curved shape for shape 120. Flexible skin 128 may be capable of curving to provide degree of flow turning 126. In these illustrative examples, flexible skin 128 may be made out of materials such as, for example, without limitation, corrugated metal, ceramic, titanium, composite skin, and/or some other suitable material.

In these examples, control surface 100 may have stiffening elements 131 attached to flexible skin 128. Stiffening elements 131 may be capable of increasing the stiffness of flexible skin 128 in a spanwise direction in a number of sections in flexible skin 128, while allowing flexible skin 128 to remain flexible in the chordwise direction. Stiffening elements 131 may be made out of materials such as, for example, without limitation, aluminum, titanium, fiber-reinforced composites, other metals, and/or other suitable materials.

For example, stiffening elements 131 may be metal stiffeners attached to flexible skin 128 along the span of control surface 100 to provide stiffness in the spanwise direction. In these examples, the spanwise direction refers to the direction from first end 116 to second end 118 and vice versa. In some advantageous embodiments, stiffening elements 131 may be embedded within flexible skin 128 or added to flexible skin 128 during its construction. For example, stiffening elements 131 may be machined as part of flexible skin 128.

In some advantageous embodiments, structure 101 may include truss 130 attached to flexible skin 128. Truss 130 may provide load-bearing support for flexible skin 128. Flexible skin 128 may transfer air loads to truss 130 at points of attachment between flexible skin 128 and structure 101. Air loads may be the forces on flexible skin 128 and control surface 100 due to air and wind during flight. Truss 130 may be comprised of various elements. These elements may include, for example, without limitation, rods, beams, tubes, joints, linkages, and/or other structural components that may form truss 130 for structure 101.

In these illustrative examples, control surface 100 may be divided into plurality of bays 150. In some advantageous embodiments, plurality of bays 150 may be sections of structure 101 that may be delineated by components of structure 101. For example, plurality of bays 150 may be defined by components. These components may include, for example, without limitation, stiffening elements 131, components of truss 130, and/or other suitable components of structure 101. In yet other advantageous embodiments, plurality of bays 150 may be sections of structure 101 divided in a virtual manner. For example, plurality of bays 150 may be sections of structure 101 without a physical basis or not delineated by structural components.

Plurality of bays 150 may be a number of bays adjacent to each other in the chordwise direction. In these examples, the chordwise direction may be the direction from base 110 to tip 111 and vice versa. Each bay within plurality of bays 150 may extend from first end 116 to second end 118 of structure 101.

Further, in addition to plurality of bays 150, structure 101 may include tip section 151. Tip section 151 may be a portion of structure 101 located between plurality of bays 150 and tip 111. For example, structure 101 may be divided into plurality of bays 150 and tip section 151 from base 110 to tip 111 of structure 101. These sections may have varying lengths in the chordwise direction. In these illustrative examples, plurality of bays 150 may have lengths in the chordwise direction that decrease from base 110 to tip 111.

In these illustrative examples, plurality of bays 150 may have plurality of shapes 152 and diagonal lengths 154. Plurality of shapes 152 may be, for example, without limitation, hexahedral shapes. In these examples, diagonal lengths 154 may be the lengths of plurality of shapes 152 along the diagonals of plurality of shapes 152. Plurality of shapes 152 and diagonal lengths 154 for plurality of bays 150 may change as control surface 100 is moved between undeployed configuration 122 and number of deployed configurations 124. The changing of plurality of shapes 152 and diagonal lengths 154 may cause shape 120 of control surface 100 to also change.

Plurality of shapes 152 and diagonal lengths 154 may be controlled by a shape changing system such as, for example, without limitation, shape changing system 132. Shape changing system 132 may use motion generation system 134 and/or plurality of deformable assemblies 135 to change plurality of shapes 152 and diagonal lengths 154 to change shape 120 of structure 101 and control surface 100.

In these illustrative examples, plurality of deformable assemblies 135 may include one deformable assembly on first end 116 of structure 101 and one deformable assembly on second end 118 of structure 101 for each bay within plurality of bays 150. Thus, each bay within plurality of bays 150 may have two deformable assemblies. Plurality of deformable assemblies 135 may have points and/or sections capable of moving relative to other points and/or sections in plurality of deformable assemblies 135.

Further, plurality of deformable assemblies 135 may be moveably connected to structure 101 with points and/or sections that may move with respect to points and/or sections of structure 101. Motion generation system 134 may be capable of controlling the form of plurality of deformable assemblies 135 to change plurality of shapes 152 and diagonal lengths 154.

In these examples, motion generation system 134 may include, for example, without limitation, actuator system 136. Actuator system 136 may include number of actuators 138. In these illustrative examples, number of actuators 138 may include primary actuator 140, diagonal actuator system 146, and/or horizontal actuator system 148.

Primary actuator 140 may be an actuator attached to spar 107 of structure 101 at second side 114 and base 110 of structure 101 and to frame 106 of wing 104. Primary actuator 140 may control rotation of structure 101 and control surface 100 about hinge points 119 by lengthening or shortening to rotate spar 107 and thus, structure 101. Rotation of control surface 100 may provide degree of flow turning 126 for control surface 100. Further, rotation of control surface 100 in a downward direction about hinge points 119 may cause second side 114 to move in a direction towards wing 104.

In these advantageous embodiments, second side 114 may be connected to spar 107 and wing 104 by a sliding joint such as, for example, without limitation, sliding joint 142. Sliding joint 142 may allow second side 114 of control surface 100 to slide into wing 104 during a downward rotation of control surface 100. In this manner, the interior of control surface 100 may remain sealed from the exterior environment in both undeployed configuration 122 and number of deployed configurations 124. Further, sliding joint 142 may make it easier to design a stiff structure for tip section 151 of control surface 100. In addition, sliding joint 142 may allow for designing tip section 151 to have an optimal size.

In some advantageous embodiments, actuator system 136 may include diagonal actuator system 146 in addition to primary actuator 140. Diagonal actuator system 146 may include, for example, without limitation, a number of actuators used to change shape 120 of structure 101 by changing diagonal lengths 154 of plurality of bays 150, and thus, plurality of shapes 152. These actuators may be connected to structure 101 of control surface 100 on both first end 116 and second end 118. These actuators may extend across diagonal lengths 154 of plurality of bays 150.

For example, the actuators within diagonal actuator system 146 may increase in length to increase diagonal lengths 154. The increase in diagonal lengths 154 may change plurality of shapes 152 for plurality of bays 150 and may change shape 120 of structure 101. Flexible skin 128 may respond to the change in shape 120 by curving with shape 120.

Thus, motion generation system 134 may allow control surface 100 to have a curved shape for number of deployed configurations 124. This curved shape, in addition to the rotation caused by primary actuator 140 to provide degree of flow turning 126, may form number of deployed configurations 124 for control surface 100.

In some advantageous embodiments, actuator system 136 may include horizontal actuator system 148 in addition to primary actuator 140. Horizontal actuator system 148 may include, for example, without limitation, a number of actuators used to change shape 120 of structure 101 by changing diagonal lengths 154 of plurality of bays 150, and thus, plurality of shapes 152. In these examples, horizontal actuator system 148 may be connected to plurality of deformable assemblies 135. Horizontal actuator system 148 may be used to change the form of plurality of deformable assemblies 135 to change diagonal lengths 154.

In these illustrative examples, for each bay in plurality of bays 150, a deformable assembly on first end 116 may be connected to a deformable assembly on second end 118 by an actuator within horizontal actuator system 148. These actuators may lengthen or shorten to change the form of each pair of deformable assemblies in each bay in plurality of bays 150. In turn, this may change diagonal lengths 154 and plurality of shapes 152 to change shape 120 of structure 101. Flexible skin 128 may curve in response to the change in shape 120.

In yet other advantageous embodiments, shape 120 may be changed using a combination of horizontal actuator system 148 and connector system 156. In these examples, horizontal actuator system 148 may include a single actuator connecting the pair of deformable assemblies within first bay 155 of plurality of bays 150. First bay 155 may be the bay located nearest to base 110. The pair of deformable assemblies within first bay 155 may also each be connected to connector system 156.

Connector system 156 may be a series of vertices and/or members connecting first bay 155 to the other bays within plurality of bays 150. The vertices may be, for example, without limitation, joints, linkages, and/or some other type of vertex. The members may be, for example, without limitation, rods, tubes, beams, and/or some other type of member. The form changing of the deformable assemblies within first bay 155 may, in turn, lead to the form changing of the other deformable assemblies within plurality of deformable assemblies 135 using connector system 156. In this manner, the forms of plurality of deformable assemblies 135 may be changed to change diagonal lengths 154, and thus, shape 120.

In still yet other advantageous embodiments, shape 120 may be changed using a combination of primary actuator 140, connector system 156, and linking system 158. Linking system 158 may include a number of polyhedron structures, a number of members, and/or other suitable components. These components may be, for example, without limitation, rods, tubes, beams, and/or some other suitable components.

In these examples, linking system 158 may relate the rotational movement caused by primary actuator 140 to plurality of deformable assemblies 135. For example, linking system 158 may be connected to spar 107. Linking system 158 may also be connected to connector system 156. Connector system 156 may be moveably connected to plurality of deformable assemblies 135. In other words, movement of connector system 156 may cause plurality of deformable assemblies 135 to move and change form.

Linking system 158 may relate the rotation of spar 107 caused by primary actuator 140 to movement of connector system 156. This movement may, in turn, cause plurality of deformable assemblies 135 to change form and diagonal lengths 154 to change length. In this manner, shape 120 of structure 101 may be changed by the rotational motion caused by a single actuator, such as, for example, primary actuator 140.

In other advantageous embodiments, motion generation system 134 may include, for example, without limitation, screw jacks 160, scissor jacks 153, and/or some other suitable motion generation system or device capable of changing diagonal lengths 154 and plurality of shapes 152 to change shape 120. Of course, compared to these other systems, actuators may allow for faster response times for changing shape 120.

In these examples, the actuators used may be hydraulic linear actuators. However, in other advantageous embodiments, other actuators such as, for example, without limitation, linear motor actuators, electro-mechanical actuators, piezoelectric actuators, and/or other types of actuators may be used.

The illustration of control surface 100 in FIG. 1 is not meant to imply physical or architectural limitations to the manner in which control surfaces may be implemented. Other components in addition to, or in place of, the ones illustrated may be used in some advantageous embodiments. Some components illustrated in control surface 100 may be omitted in some advantageous embodiments.

For example, control surface 100 may not have truss 130 attached to flexible skin 128. Plurality of deformable assemblies 135 may be connected to flexible skin 128 in these examples. In other advantageous embodiments, primary actuator 140 may be a system including more than one actuator. In yet other advantageous embodiments, a number of deformable assemblies in plurality of deformable assemblies 135 may be located at the center of plurality of bays 150 in addition to at first end 116 and second end 118. These deformable assemblies may provide additional support for control surface 100.

For example, these deformable assemblies may help control surface 100 remain operational under conditions of battle damage, malfunction, and/or some other condition. Further, additional components in addition to the ones described may be used. Other components in addition to, or in place of, the ones illustrated may be used in different advantageous embodiments. Further, in some advantageous embodiments, some of the components illustrated for control surface 100 may be unnecessary.

Figure 2:
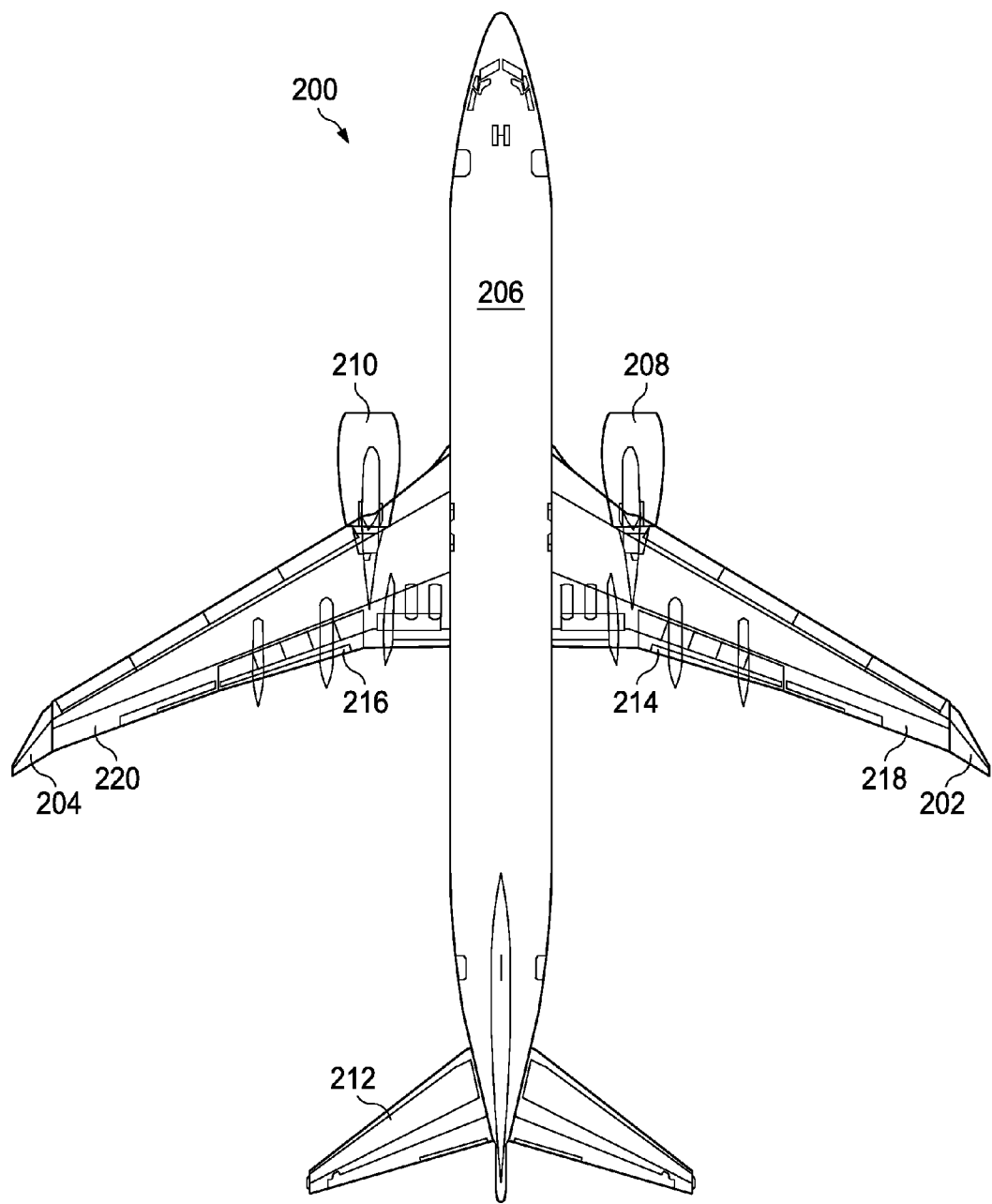
FIG. 2 is a diagram of an aircraft in which an advantageous embodiment may be implemented.

With reference now to FIG. 2, a diagram of an aircraft is depicted in which an advantageous embodiment may be implemented. Aircraft 200 is an example of an aircraft in which a control surface such as, for example, without limitation, control surface 100 in FIG. 1 may be implemented.

In this illustrative example, aircraft 200 has wings 202 and 204 attached to body 206. Aircraft 200 includes wing-mounted engine 208, wing-mounted engine 210, and tail 212. Further, wings 202 and 204 have flaps 214 and 216, respectively, attached to and/or located on trailing edges 218 and 220 of wings 202 and 204, respectively. In this illustrative example, flaps 214 and 216 may be examples of control surface 100 in FIG. 1. In other advantageous embodiments, aircraft 200 may take the form of a different type of aircraft.

For example, aircraft 200 may take the form of a stealth aircraft, such as an F-117, F-22, B-2, F-35, or some other suitable type of aircraft.

Figure 3:
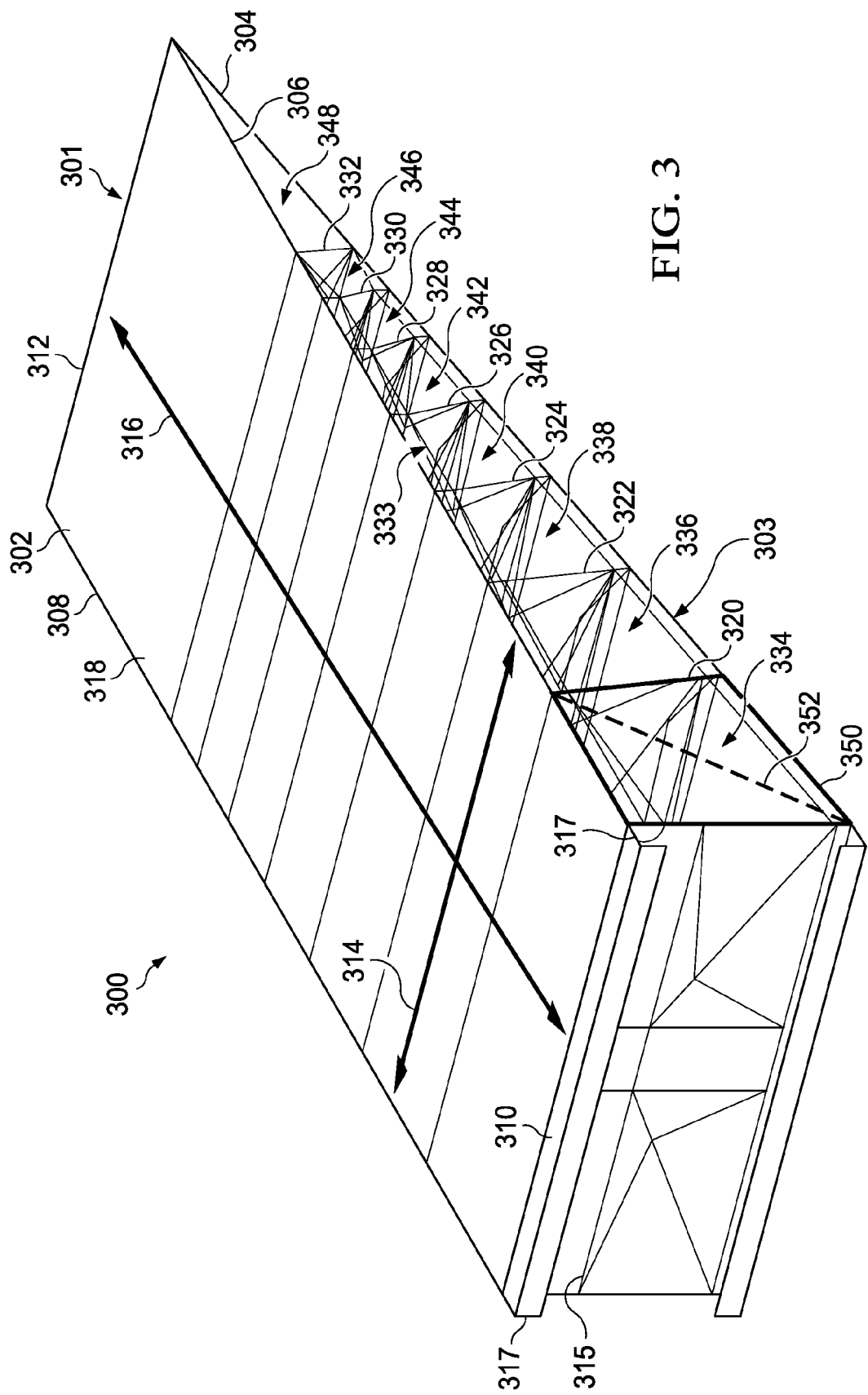
FIG. 3 is a diagram of a flap in accordance with an advantageous embodiment.

With reference now to FIG. 3, a diagram of a flap is depicted in accordance with an advantageous embodiment. In this example, flap 300 may be one example of a control surface, such as, for example, without limitation, control surface 100 in FIG. 1.

Flap 300 may have undeployed configuration 301, which may be one example of undeployed configuration 122 in FIG. 1. Further, flap 300 may have structure 303, which may be one example of one implementation of structure 101 in FIG. 1. In undeployed configuration 301, structure 303 may have a straight shape, which may be one example of shape 120 of structure 101 in FIG. 1.

In these illustrative examples, structure 303 may have first side 302, second side 304, first end 306, second end 308, base 310, and tip 312. Structure 303 may extend from first end 306 to second end 308 in a spanwise direction such as, for example, spanwise direction 314. Structure 303 may also extend from base 310 to tip 312 in a chordwise direction such as, for example, chordwise direction 316. Further, structure 303 may include spar 315. Spar 315 may be attached to the wing of an aircraft at hinge points 317.

Flap 300 may have flexible skin 318 attached to structure 303 on first side 302 and second side 304 of structure 303. In these examples, flexible skin 318 may be one example of flexible skin 128 in FIG. 1. Further, flexible skin 318 may be attached to stiffeners 320-332. Stiffeners 320-332 may be examples of stiffening elements such as, for example, without limitation, stiffening elements 131 in FIG. 1.

In these examples, structure 303 may have truss 333 attached to flexible skin 318. In these examples, flexible skin 318 may be capable of transferring air loads to truss 333. For example, first side 302 of structure 303 may encounter an air load of around 2 pounds per square inch, and second side 304 of structure 303 may encounter an air load of around 2 pounds per square inch. Flexible skin 318 may transfer these air loads to the attachment points of truss 333 to flexible skin 318.

In these illustrative examples, structure 303 may be divided into bays 334-346 and tip section 348. Bays 334-346 may be examples of bays within plurality of bays 150 in FIG. 1. Bays 334-346 may be arranged adjacent to each other beginning at base 310 in chordwise direction 316 from base 310 to tip section 348. In these depicted examples, tip section 348 may be one example of tip section 151 in FIG. 1.

In this view, bays 334-346 may be defined by stiffeners 320-332. Bays 334-346 may have hexahedral shapes with at least four faces formed by portions of first end 306, second end 308, first side 302, and second side 304.

Bay 334 may be a first bay such as, for example, first bay 155 of plurality of bays 150 in FIG. 1. As one example, bay 334 may have quadrilateral shape 350 on first end 306. Quadrilateral shape 350 may form one face of a hexahedral shape for bay 334. Bay 334 may have a similar quadrilateral shape (not shown) on second end 308.

In these advantageous embodiments, quadrilateral shape 350 may have diagonal length 352. Diagonal length 352 may also be the diagonal length of the hexahedral shape for bay 334. By changing diagonal length 352, quadrilateral shape 350 of bay 334 may also be changed. Similarly, changing the diagonal lengths for bays 336-346 may change the quadrilateral shapes for bays 336-346. By changing the quadrilateral shapes for bays 334-346, structure 303 may be reconfigured to have a curved shape for a number of deployed configurations such as, for example, number of deployed configurations 124 in FIG. 1. Flexible skin 318 may curve with structure 303 in a smooth manner.

Figure 4:
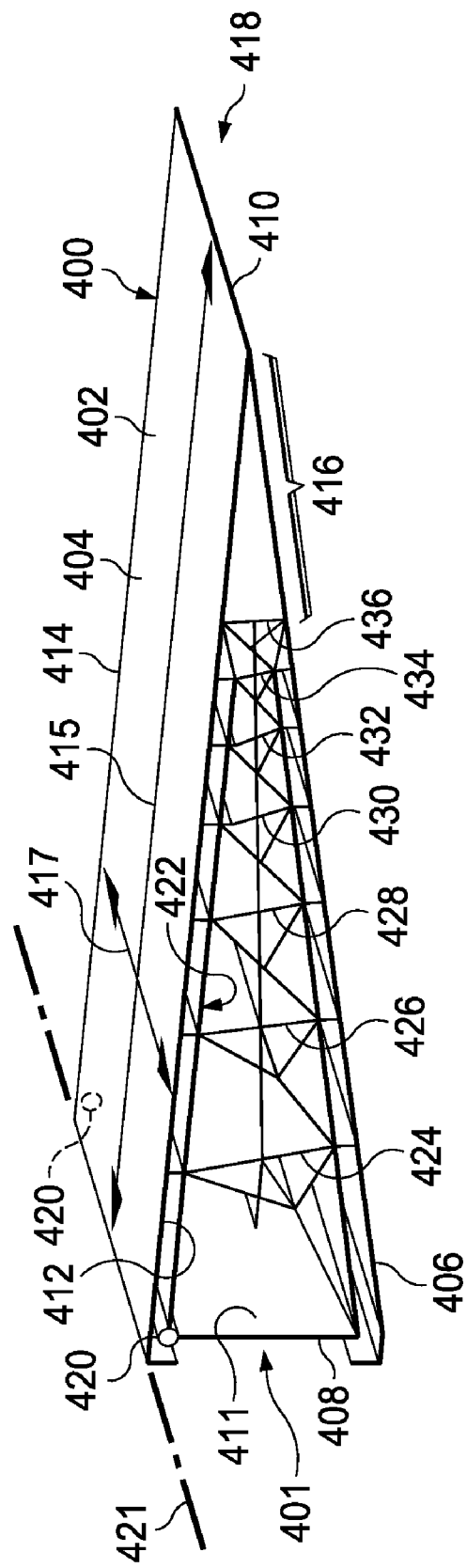
FIG. 4 is a diagram of a flap in accordance with an advantageous embodiment.

With reference now to FIG. 4, a diagram of a flap is depicted in accordance with an advantageous embodiment. Flap 400 may be one example of one implementation of a control surface such as, for example, flap 300 in FIG. 3. Flap 400 may be attached to a frame of a wing of an aircraft such as, for example, frame 106 of wing 104 in aircraft 102 in FIG. 1.

Flap 400 may have structure 401 with first side 404 and second side 406. Flexible skin 402 may be attached to first side 404 and second side 406 of flap 400. Flexible skin 402 may be one example of flexible skin 318 in FIG. 3. Structure 401 may also have base 408, tip 410, first end 412, and second end 414. Tip section 416 may be located at tip 410 of structure 401. In this illustrative example, flap 400 may have undeployed configuration 418.

This configuration may have a zero degree angle for tip 410 with respect to the plane of flap 400. In other examples, flexible skin 402 may curve in such a way that tip 410 may be at an inclined angle with respect to undeployed configuration 418 of flap 400. Hinge points 420 may provide attachment points for connecting spar 411 of flap 400 to the frame of the wing of an aircraft. Spar 411 may be located at base 408 and may be part of structure 401.

Hinge points 420 may be aligned to axis of rotation 421 by which the degree of incline of tip 410 may be measured. The degree of incline of tip 410 may determine the degree of flow turning for flap 400.

In these illustrative examples, structure 401 may have a truss such as, for example, without limitation, truss 422. Truss 422 may be one example of truss 333 FIG. 3. Truss 422 may be attached to flexible skin 402 to provide load-bearing support for flexible skin 402 and flap 400. In other words, truss 422 may reduce and/or eliminate stress in chordwise direction 415 for flexible skin 402 under air loads.

Without truss 422, flexible skin 402 may tend to buckle from compression under air loads. Further, stiffening elements 424-436, attached to flexible skin 402, may be used to provide stiffness for flexible skin 402 in spanwise direction 417, while allowing flexible skin 402 to maintain flexibility in chordwise direction 415. These stiffening elements may be examples of stiffeners 320-332 in FIG. 3.

The flexibility of flexible skin 402 in chordwise direction 415 may allow flexible skin 402 to curve. Bending of flexible skin 402 may not cause flexible skin 402 to change in length. Flexible skin 402 may be a thin skin in which one dimension of flexible skin 402 may be negligibly small with respect to the other two dimensions. This thinness and the design of flap 400 may result in flexible skin 402 experiencing negligible in-plane stress in three dimensions. This in-plane stress may be a mid-surface stress of flexible skin 402.

In other words, when flap 400 is deployed, the inner and outer surfaces of flexible skin 402 may experience compression and tension, respectively. In the deployed state, the mid-surface stress between the inner and outer surfaces for flexible skin 402 may be around zero. Further, stresses in the direction perpendicular to the inner and outer surfaces of flexible skin 402 may also be small enough to be considered negligible. Thus, in these examples, the capability of flexible skin 402 to curve may help reduce and/or eliminate in-plane stress for flexible skin 402.

Figure 5:
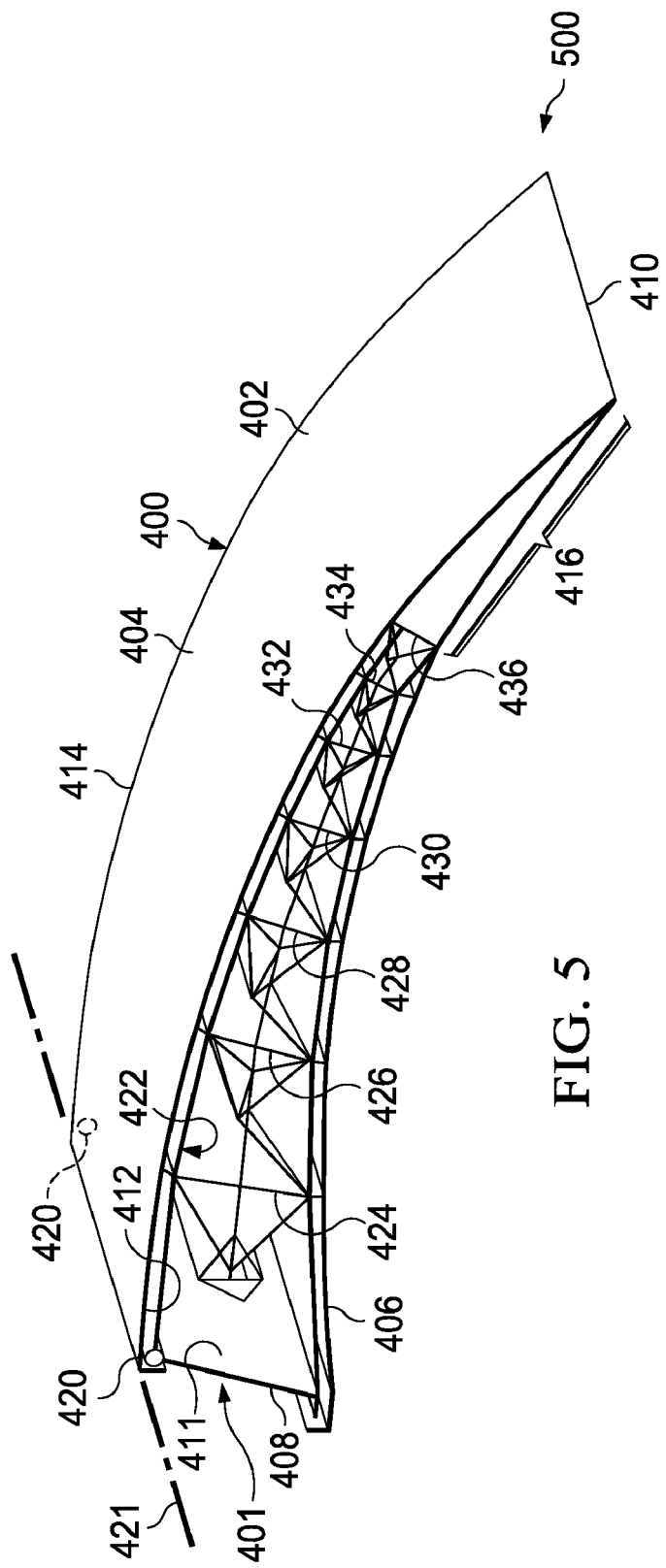
FIG. 5 is a diagram of a partially deployed flap in accordance with an advantageous embodiment.

With reference now to FIG. 5, a diagram of a partially deployed flap is depicted in accordance with an advantageous embodiment. Flap 400 may be rotated in addition to being changed from a straight shape to a curved shape to form deployed configuration 500. Deployed configuration 500 may have an angle of around 36 degrees for tip 410 inclined with respect to tip 410 in undeployed configuration 418 in FIG. 4. At this angle, flap 400 may provide around 36 degrees of flow turning. The bending of flexible skin 402 and flap 400 may provide a smooth surface over which air may flow.

Figure 6:
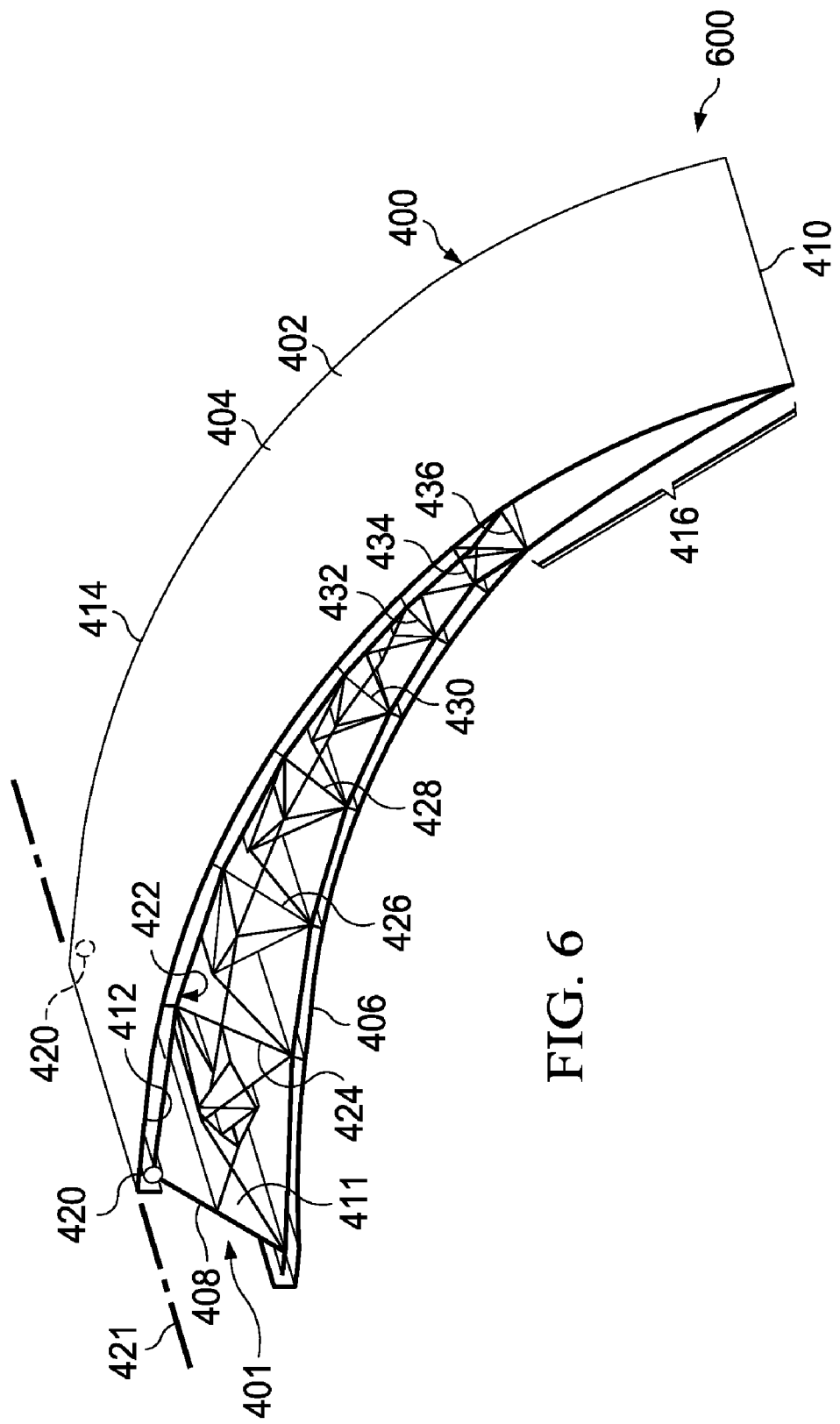
FIG. 6 is a diagram of a fully deployed flap in accordance with an advantageous embodiment.

With reference now to FIG. 6, a diagram of a fully deployed flap is depicted in accordance with an advantageous embodiment. Flap 400 may be further rotated and further curved to form deployed configuration 600. Deployed configuration 600 may have an angle of around 60 degrees for tip 410 inclined with respect to tip 410 in undeployed configuration 418. At this angle, flap 400 may provide around 60 degrees of flow turning. In these illustrative examples, flap 400 may not be capable of bending more than around 60 degrees. In other advantageous embodiments, flap 400 may curve up to around 90 degrees or some other angle.

Figure 7:
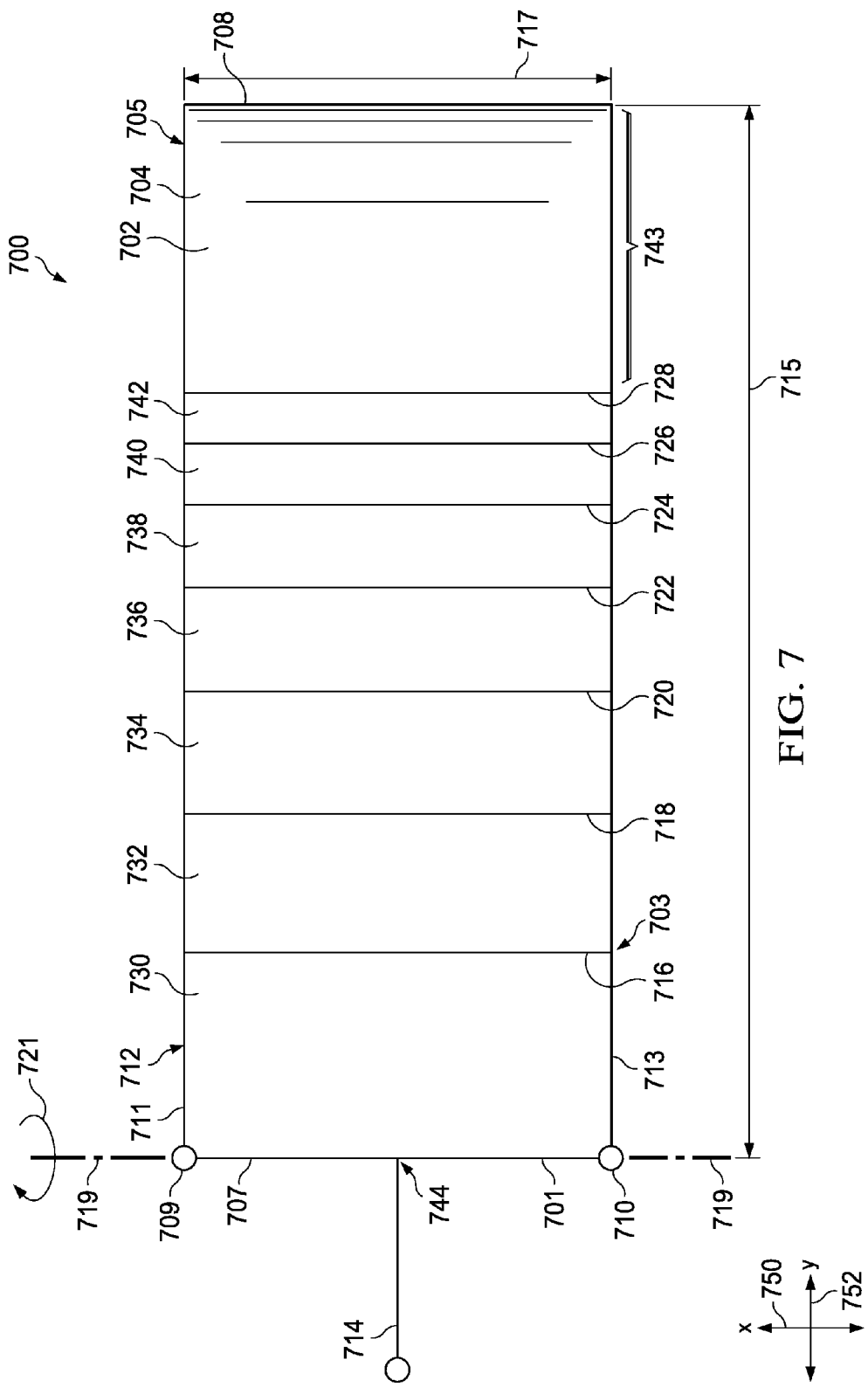
FIG. 7 is an exposed top view of a flap in accordance with an advantageous embodiment.

With reference now to FIG. 7, an exposed top view of a flap is depicted in accordance with an advantageous embodiment. Flap 700 may be one example of one implementation of a control surface such as, for example, without limitation, control surface 100 in FIG. 1. Flap 700 may have undeployed configuration 705, which may be one example of undeployed configuration 122 in FIG. 1. Further, flap 700 may have a straight shape, which may be one example of shape 120 in FIG. 1.

In these illustrative examples, flap 700 may have structure 703. Structure 703 may include structural components such as, for example, without limitation, rods, beams, tubes, joints, screws, bolts, linkage assemblies, and/or other structural components. Flexible skin 702 may be attached to first side 704 and a second side (not shown) of structure 703. The second side may be substantially opposite to first side 704 of structure 703. Flexible skin 702 may be one example of flexible skin 128 in FIG. 1. Structure 703 may also have base 707 and tip 708. In undeployed configuration 705, tip 708 may be at a zero degree angle with respect to the plane of flap 700.

The plane of flap 700 may be an X-Y plane formed by X-axis 750 and Y-axis 752. Hinge point 709 may be located on end 711 of structure 703, and hinge point 710 may be located on end 713 of structure 703.

Hinge points 709 and 710 may be aligned to each other along base 707 of structure 703. Ends 711 and 713 may be substantially opposite ends of structure 703 and flap 700. Hinge points 709 and 710 may be stationary hinge points of attachment for connecting spar 701 of structure 703 of flap 700 to the wing of an aircraft. An illustrative depiction of a portion of a wing may be seen in FIG. 8, below. Hinge points 709 and 710 may also be aligned to axis 719, which may be an axis of rotation for flap 700.

In these illustrative examples, flap 700 may rotate about axis 719. This rotation may cause tip 708 to be at an inclined angle with respect to tip 708 in undeployed configuration 705. Flap 700 may be rotated by primary actuator 714 connected to the second side opposite to first side 704 of structure 703.

Primary actuator 714 may rotate flap 700 around hinge points 709 and 710 and axis 719. This rotation may provide a degree of flow turning for flap 700. Primary actuator 714 may be attached to spar 701. Primary actuator 714 may lengthen or shorten to rotate spar 701 in the direction of arrow 721 around axis 719 and about hinge points 709 and 710. This rotation of spar 701 may pull the second side (not shown) of structure 703 into the wing of an aircraft at sliding joint 744. Sliding joint 744 may be a joint connecting spar 701, base 707, and the second side of structure 703. Sliding joint 744 may allow a portion of structure 703 to slide into the wing of an aircraft.

In these examples, primary actuator 714 may be one example of primary actuator 140 in FIG. 1. Sliding joint 744 may be one example of sliding joint 142 in FIG. 1.

In these illustrative examples, structure 703 may include a truss such as, for example, truss 712. Truss 712 may be one example of truss 130 in FIG. 1. Truss 712 may be attached to flexible skin 702 to provide load-bearing support for flexible skin 702 and flap 700. In other words, truss 712 may reduce and/or eliminate stress in chordwise direction 715 for flexible skin 702 under air loads. Without truss 712, flexible skin 702 may tend to buckle from compression under air loads.

Further, stiffening elements 716-728 may be attached to flexible skin 702. Stiffening elements 716-728 may provide stiffness for flexible skin 702 in spanwise direction 717, while allowing flexible skin 702 to maintain flexibility in chordwise direction 715.

In these illustrative examples, structure 703 may be divided up into bays 730-742 and tip section 743. These bays may be defined by stiffening elements 716-728. Bays 730-742 may be arranged adjacent to each other beginning from base 707 in chordwise direction 715. Tip section 743 may be located between tip 708 and bay 742.

Figure 8:
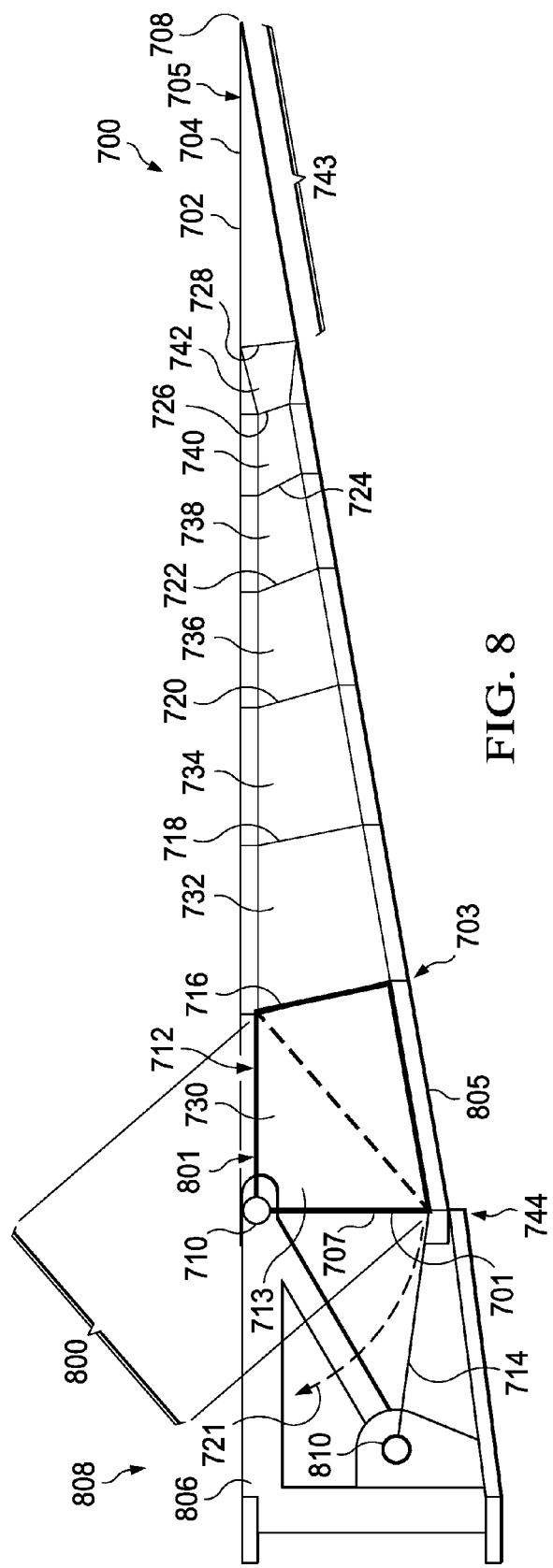
FIG. 8 is an exposed cross-sectional view of a flap in accordance with an advantageous embodiment.

With reference now to FIG. 8, an exposed cross-sectional view of flap 700 is depicted in accordance with an advantageous embodiment. This view of flap 700 may be a view of end 713 of structure 703. Flap 700 may have undeployed configuration 705 and a straight shape. Second side 805 may be visible in this view of flap 700. Second side 805 may be substantially opposite to first side 704.

In this view in FIG. 8, hinge point 710 may connect spar 701 to frame 806 of wing 808 of an aircraft. Further, primary actuator 714 may be connected to wing 808 at attachment point 810 of frame 806. Frame 806 of wing 808 may be one example of an implementation of frame 106 of wing 104 in FIG. 1. Sliding joint 744 may allow structure 703 to slide into wing 808 during rotation of spar 701 and structure 703 by primary actuator 714.

In these illustrative examples, when viewed from an end of structure 703, bays 730-742 may have quadrilateral shapes. Further, bays 730-742 may have diagonal lengths, which may be the diagonal lengths of these quadrilateral shapes. These diagonal lengths may not be actual structural elements but may be measurements or dimensions for bays 730-742.

For example, bay 730 may have diagonal length 800 and quadrilateral shape 801 in undeployed configuration 705. Diagonal length 800 and quadrilateral shape 801 may be substantially the same for both end 711 and end 713 for bay 730 of structure 703. In these advantageous embodiments, the diagonal lengths of bays 730-742 may be changed to change the quadrilateral shapes of bays 730-742. These changes may cause a change in the shape of structure 703, and thus, flap 700. Flexible skin 702 may curve with the shape of structure 703.

In these advantageous embodiments, flap 700 may be implemented using at least one of a motion generation system, a plurality of deformable assemblies, and a linking system to change the diagonal lengths and quadrilateral shapes of bays 730-742. These different implementations may be depicted in the following illustrative examples.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and/or other suitable combinations.

Figure 9:
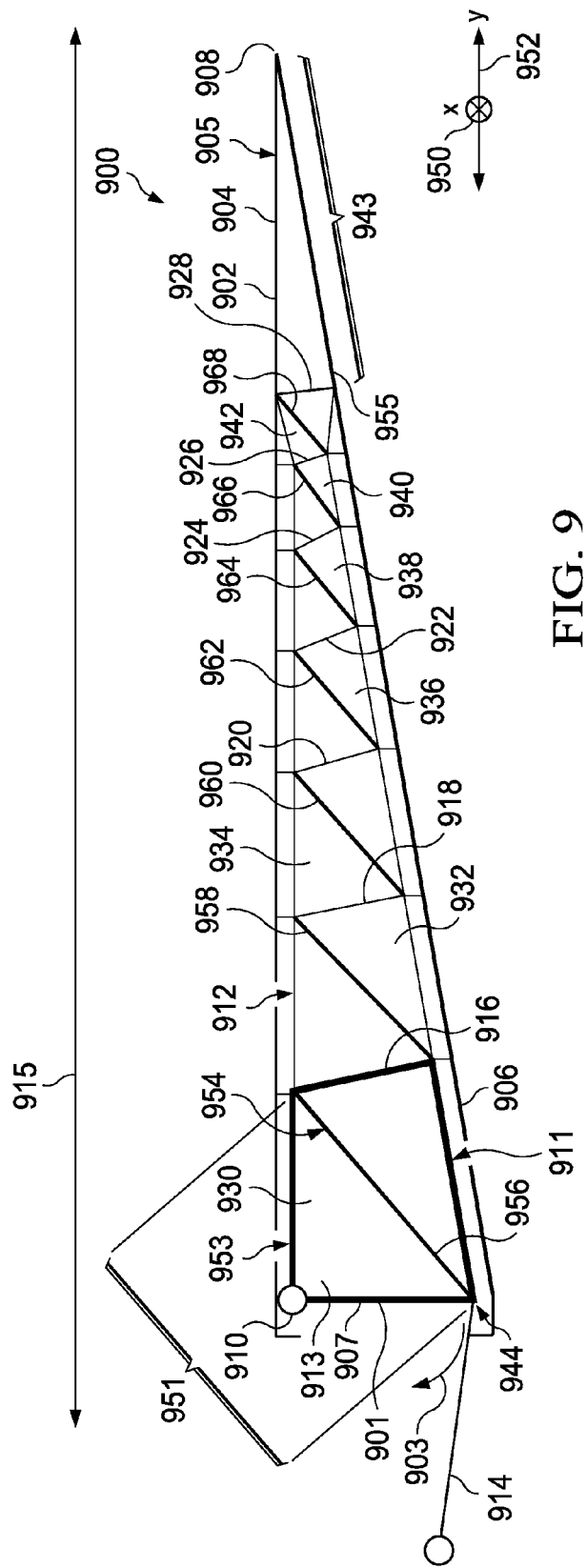
FIG. 9 is an exposed cross-sectional view of a flap in an undeployed configuration in accordance with an advantageous embodiment.
Figure 10:
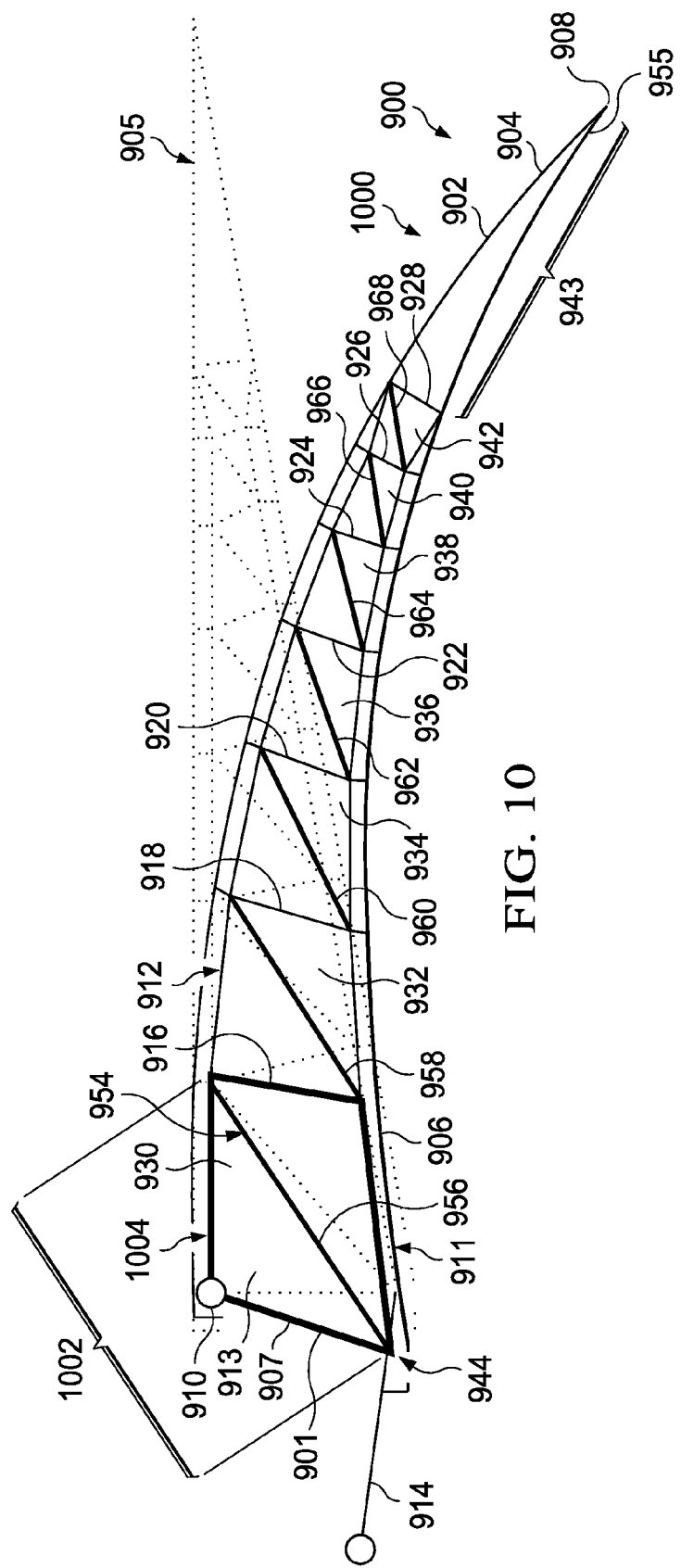
FIG. 10 is an exposed cross-sectional view of a partially deployed flap in accordance with an advantageous embodiment.
Figure 11:
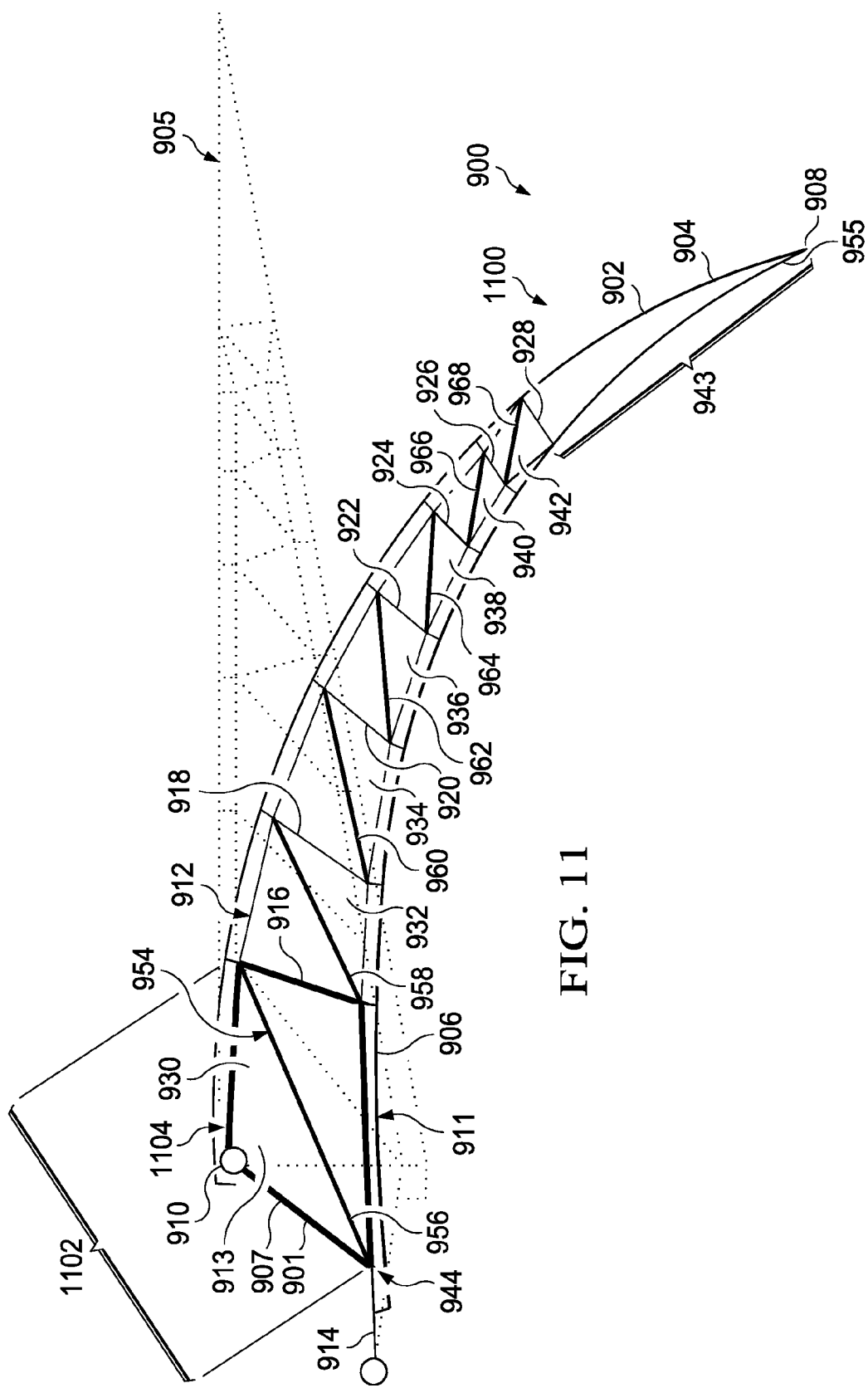
FIG. 11 is an exposed cross-sectional view of a fully deployed flap in accordance with an advantageous embodiment.

With reference now to FIGS. 9-11, a flap is depicted in accordance with an advantageous embodiment. In these examples, flap 900 is depicted using a motion generation system having a diagonal actuator system and a primary actuator.

With reference first to FIG. 9, an exposed cross-sectional view of a flap in an undeployed configuration is depicted in accordance with an advantageous embodiment. Flap 900 may be one example of one implementation of a control surface such as, for example, without limitation, control surface 100 in FIG. 1. Flap 900 may have undeployed configuration 905, which may be one example of undeployed configuration 122 in FIG. 1. Further, flap 900 may have a straight shape, which may be one example of shape 120 in FIG. 1.

In these illustrative examples, flap 900 may have structure 911. Structure 911 may include structural components such as, for example, without limitation, rods, beams, tubes, joints, screws, bolts, linkage assemblies, and/or other structural components. Flexible skin 902 may be attached to first side 904 and second side 906 of structure 911. Flexible skin 902 may be one example of flexible skin 128 in FIG. 1. Structure 911 may also have base 907, tip 908, end 913, and an end substantially opposite to end 913, which may not be visible in this view. In undeployed configuration 905, tip 908 may be at a zero degree angle with respect to the plane of flap 900. The plane of flap 900 may be an X-Y plane formed by X-axis 950 and Y-axis 952.

Hinge point 910 may be located on end 913 of flap 900. Hinge point 910 may be aligned with a second hinge point (not shown) at the end of structure 911 substantially opposite to end 913. These hinge points may be aligned along an axis of rotation (not shown) perpendicular to end 913. Further, these hinge points may be stationary hinge points for attaching spar 901 of structure 911 to the wing of an aircraft. Spar 901 may be one example of spar 107 in FIG. 1.

In these illustrative examples, structure 911 may rotate in the direction of arrow 903. This rotation may cause tip 908 to be at an inclined angle with respect to tip 908 in undeployed configuration 905. Structure 911 may be rotated by a lengthening or shortening of primary actuator 914 connected to second side 906 of structure 911.

Primary actuator 914 may rotate spar 901 and structure 911 around hinge point 910 and a second hinge point (not shown) at the end of structure 911 substantially opposite to end 913. This rotation may provide a degree of flow turning for flap 900. Primary actuator 914 may cause movement of structure 911 in the direction of arrow 903.

Sliding joint 944 may be a joint connecting spar 901, second side 906, and base 907 of flap 900 to a wing. Sliding joint 944 may allow second side 906 of structure 911 to slide into the wing during rotation of spar 901 by primary actuator 914. In these examples, primary actuator 914 may be one example of primary actuator 140 in FIG. 1. Sliding joint 944 may be one example of sliding joint 142 in FIG. 1.

In these illustrative examples, structure 911 may include a truss such as, for example, truss 912. Truss 912 may be one example of truss 130 in FIG. 1. Truss 912 may be attached to flexible skin 902 to provide load-bearing support for flexible skin 902 and flap 900. In other words, truss 912 may reduce and/or eliminate stress in chordwise direction 915 for flexible skin 902 under air loads. Without truss 912, flexible skin 902 may tend to buckle from compression under air loads.

Further, stiffening elements 916-928 may be attached to flexible skin 902. Stiffening elements 916-928 may provide stiffness for flexible skin 902 in a spanwise direction (not shown), while allowing flexible skin 902 to maintain flexibility in chordwise direction 915.

In these illustrative examples, flap 900 may be divided into bays 930-942 and tip section 943. These bays may be visualized as being divided by stiffening elements 916-928. Bays 930-942 may be arranged adjacent to each other beginning from base 907 in chordwise direction 915. Tip section 943 may be located between tip 908 and bay 942.

In these illustrative examples, bays 930-942 may have quadrilateral shapes. Further, bays 930-942 may have diagonal lengths, which may be the diagonal lengths of these quadrilateral shapes. These diagonal lengths may not be actual structural elements but may be measurements or dimensions for bays 930-942.

For example, bay 930 may have diagonal length 951 and quadrilateral shape 953 in undeployed configuration 905. Diagonal length 951 and quadrilateral shape 953 may be the same for both end 913 and the opposite end of structure 911. In these advantageous embodiments, the diagonal lengths of bays 930-942 may be changed to change the quadrilateral shapes of bays 930-942. These changes may cause a change in the shape of structure 911 and flap 900.

In these illustrative examples, flap 900 may use diagonal actuator system 954 in addition to primary actuator 914 to move flap 900 from undeployed configuration 905 to a deployed configuration with a curved shape. Diagonal actuator system 954 may be one example of an implementation of diagonal actuator system 146 in FIG. 1.

Diagonal actuator system 954 may include diagonal members 956-968. Diagonal members 956-968 may be attached to structure 911 on end 913. Further, diagonal members 956-968 may be located in bays 930-942, respectively.

In these illustrative examples, flap 900 may have a similar set of diagonal members (not shown) attached to structure 911 on an end of structure 911 substantially opposite to end 913 of structure 911.

Thus, each of bays 930-942 may have two diagonal members, one on each end of bays 930-942. In these examples, flap 900 may have a total of 14 diagonal members for bays 930-942.

Of course, in other advantageous embodiments, different numbers of diagonal members may be used, depending on the number of bays and the span of flap 900. For example, in some advantageous embodiments, each bay may have three diagonal members with the third diagonal member positioned in the center of the bay. The additional diagonal member may provide additional support. Further, in other advantageous embodiments, diagonal members 956-968 may be attached to flexible skin 902 directly.

Diagonal members 956-968 may fully extend across the diagonal lengths of bays 930-942 on end 913 of flap 900. For example, diagonal member 956 may have length 951 of bay 930. Each of diagonal members 956-968 may change in length. In these examples, diagonal members 956-968 may be actuators such as, for example, without limitation, linear actuators that change in length.

In these illustrative examples, diagonal members 956-968 may change in length to change the diagonal lengths of bays 930-942. Changing these diagonal lengths may also change the quadrilateral shapes of bays 930-942. For example, diagonal member 956 may lengthen to increase diagonal length 951 and change quadrilateral shape 953 for bay 930. The changing of these diagonal lengths and quadrilateral shapes may change the shape of flap 900. In other words, changing the diagonal lengths may result in a change in the shape of structure 911. The change in the shape of structure 911 may result in flexible skin 902 curving in this shape in a smooth manner. Structure 911 may bend to move tip 908 to a downward angle. Flexible skin 902 may bend without lengthening and/or shortening in response to the lengthening of diagonal members 956-968.

With reference now to FIG. 10, an exposed cross-sectional view of a partially deployed flap is depicted in accordance with an advantageous embodiment. Flap 900 may have deployed configuration 1000 with a curved shape in this depicted example.

In these illustrative examples, deployed configuration 1000 may have tip 908 at an inclined angle of around 36 degrees with respect to tip 908 in undeployed configuration 905 of flap 900. Further, diagonal members 956-968 in FIG. 10 may be lengthened in deployed configuration 1000 with respect to diagonal members 956-968 in undeployed configuration 905.

As one example, diagonal member 956, and thus, bay 930, may have increased length 1002, which may be longer than length 951 in FIG. 9. Increased length 1002 may result in quadrilateral shape 1004. The lengthening of diagonal members 956-968 may cause structure 911 to change shape and flexible skin 902 to curve with this shape in a smooth manner and without sharp discontinuities and/or gaps in first side 904 or second side 906.

Primary actuator 914 may allow rotation of spar 901 and structure 911 about hinge point 910 and the hinge point located at the end of structure 911 opposite to end 913. This rotation may result in a degree of flow turning for flap 900. The curved shape generated by the lengthening of diagonal members 956-968 and the rotation of flap 900 by primary actuator 914 may form deployed configuration 1000 for flap 900.

With reference now to FIG. 11, an exposed cross-sectional view of a fully deployed flap is depicted in accordance with an advantageous embodiment. Flap 900 may have deployed configuration 1100 with a curved shape in this depicted example.

In these illustrative examples, deployed configuration 1100 may have tip 908 at an inclined angle of around 60 degrees with respect to tip 908 in undeployed configuration 905 of flap 900. Diagonal members 956-968 may be further lengthened in deployed configuration 1100 with respect to diagonal members 956-968 in undeployed configuration 905 and deployed configuration 1100. For example, diagonal member 956, and thus bay 930, may have increased length 1102, which may be longer than lengths 951 in FIGS. 9 and 1002 in FIG. 10. Further, bay 930 may have quadrilateral shape 1104.

The illustrations of flap 900 in FIGS. 9-11 are not meant to imply physical or architectural limitations to the manner in which a diagonal actuator system for a flap may be implemented. For example, in other advantageous embodiments, the changing of the lengths of diagonal members 956-968 may be implemented using screw jacks, scissor jacks, and/or some other suitable mechanism or device. In yet other advantageous embodiments, diagonal members 956-968 may be positioned across the substantially opposite diagonal lengths of bays 930-942 to cause similar changes to structure 901 and flap 900.

Figure 12:
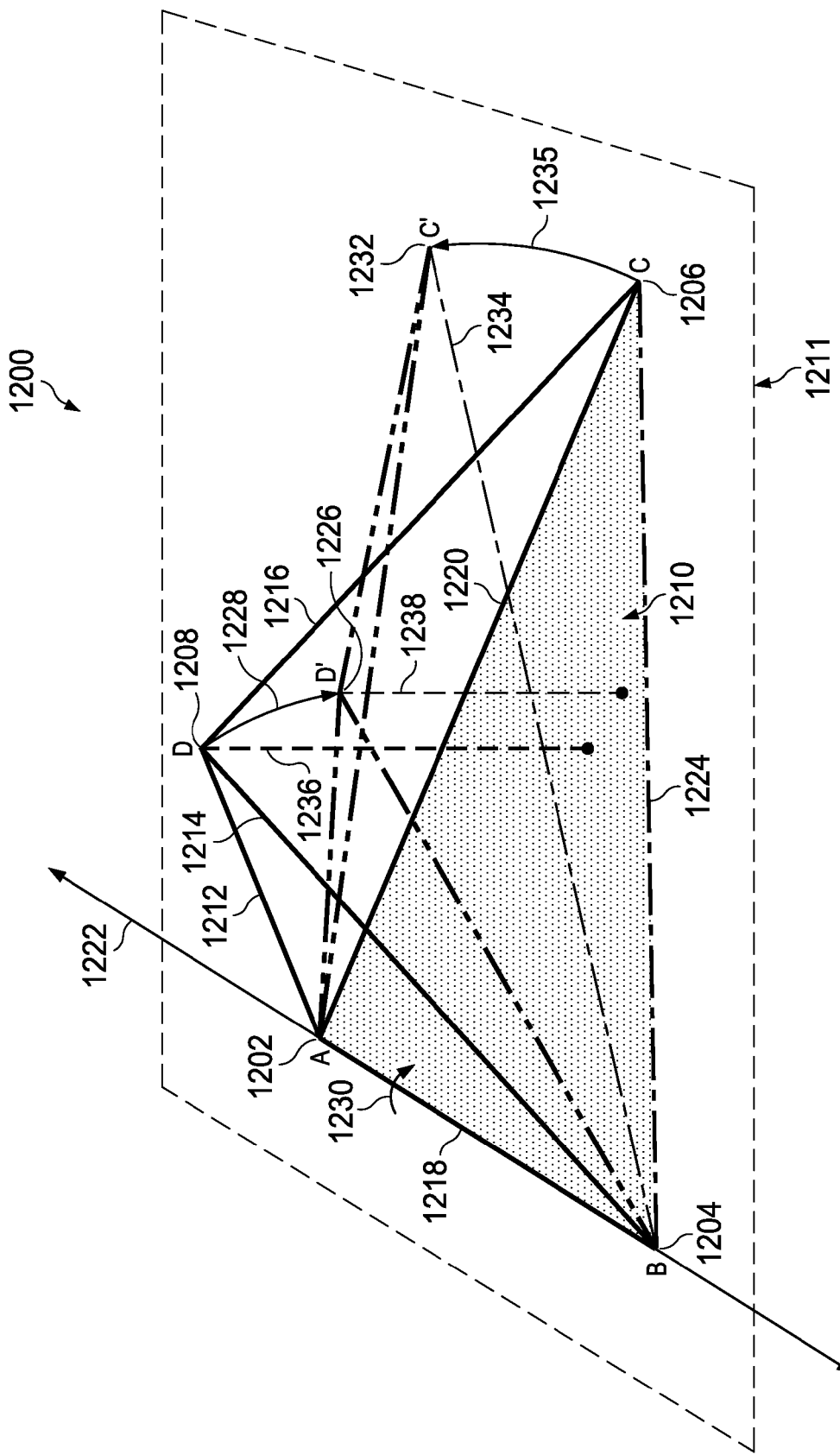
FIG. 12 is a diagram of a deformable assembly in accordance with an advantageous embodiment.

With reference now to FIG. 12, a diagram of a deformable assembly is depicted in accordance with an advantageous embodiment. Deformable assembly 1200 may be one example of an implementation of a deformable assembly within a plurality of deformable assemblies such as, for example, plurality of deformable assemblies 135 in FIG. 1.

In this illustrative example, deformable assembly 1200 may be formed by vertices A 1202, B 1204, C 1206, and D 1208. Vertices A 1202, B 1204, and C 1206 may form base 1210 of deformable assembly 1200. The vertices depicted in these examples may be a type of joint, bearing, mechanical link, and/or some other suitable connection point.

Members A-D 1212, B-D 1214, and C-D 1216 may have fixed lengths and may be connected at vertex D 1208. Member A-B 1218 and member A-C 1220 may also have fixed lengths and may be attached to a structure such as, for example, structure 703 of flap 700 in FIG. 7. Member A-B 1218 may be attached to structure 703 at vertex A 1202 and vertex B 1204. Member A-C 1220 may be attached to structure 703 at vertex A 1202 and vertex C 1206. Each of these members in deformable assembly 1200 may be physical components such as, for example, without limitation, rods, beams, tubes, and/or other physical components.

In this representation of deformable assembly 1200, base 1210 may be formed by a portion of an end of a structure of a flap. For example, base 1210 may be formed by a portion of end 713 of structure 703 in FIG. 7. Base 1210 may lie on plane 1211. Plane 1211 may be the same plane in which an end of a structure of a flap may lie. Length 1224 may be a length from vertex B 1204 to vertex C 1206.

In these examples, length 1224 may represent the diagonal length of a bay within a flap such as, for example, bay 730 in structure 703 in FIG. 7. This diagonal length may be a measured length and/or dimension of bay 730 when flap 700 is in an undeployed configuration with a straight shape.

In these illustrative examples, vertex D 1208 may be moved to vertex D' 1226 in the direction of arrow 1228. This movement may be generated by an actuator such as, for example, an actuator within horizontal actuator system 148 in FIG. 1. Movement of vertex D 1208 may cause a change in the form of deformable assembly 1200.

The fixed lengths of members A-B 1218, A-D 1212, and B-D 1214 may cause deformable assembly 1200 to relate movement of vertex D 1208 to a rotation about member A-B 1218 in the direction of arrow 1230. The fixed lengths of members A-C 1220, A-D 1212, and C-D 1216 may cause deformable assembly 1200 to also relate movement of vertex D 1208 to a movement of vertex C 1206 to vertex C' 1232. Vertex C 1206 may rotate about vertex A 1202 in the direction of arrow 1235. In these examples, vertex C 1206 may be limited to movement in plane 1211. For example, in flap 700 in FIG. 7, vertex C 1206 may only be moved along end 713 of structure 703.

Movement of vertex C 1206 to vertex C' 1232 may lead to an increase in the length from vertex B 1204 to vertex C 1206. In other words, the length may be increased from length 1224 to length 1234. This increased length may correspond to an increased diagonal length for a bay within a flap. Length 1234 may correspond to a diagonal length of a bay when the flap is in a deployed configuration with a curved shape. In this manner, deformable assembly 1200 may be capable of changing a diagonal length of a bay. The changing of the diagonal length of a bay may result in a change in the shape of the structure of the flap. The change in the shape of the structure may result in the flexible skin of the flap curving with the shape of the structure in a smooth manner.

In these examples, deformable assembly 1200 may have height 1236 from vertex D 1208 to plane 1211. Movement of vertex D 1208 to vertex D' 1226 in the direction of arrow 1228 may decrease height 1236 to height 1238. Height 1238 may be the height of deformable assembly 1200 from vertex D' 1226 to plane 1211. The change in the height of deformable assembly 1200 may be directly due to an actuator acting at vertex D 1208.

With reference now to FIGS. 13-18, a flap is depicted in accordance with an advantageous embodiment. In these examples, flap 1300 is depicted using a plurality of deformable assemblies and a motion generation system having a primary actuator and a horizontal actuator system.

Figure 13:
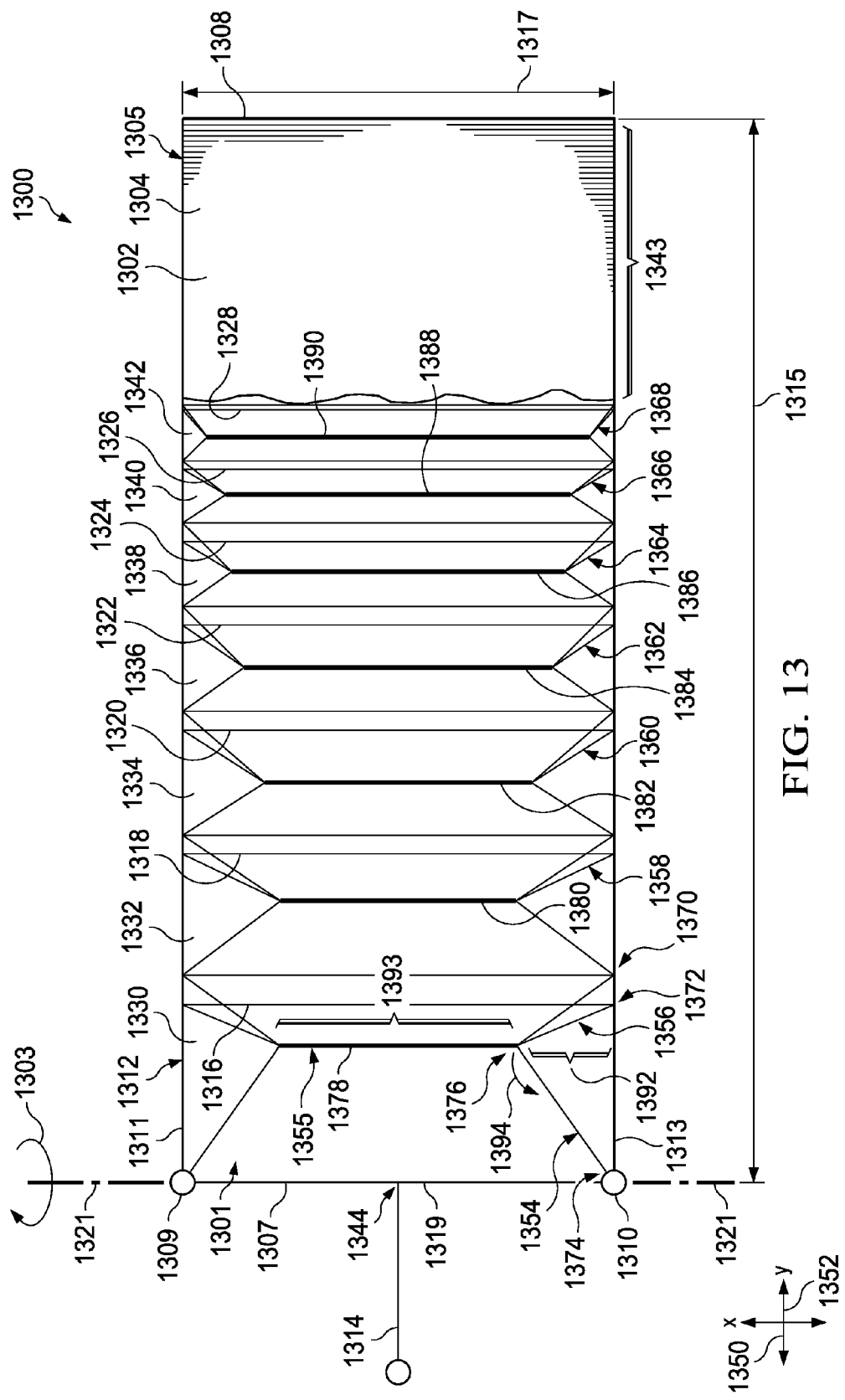
FIG. 13 is an exposed cross-sectional top view of a flap in an undeployed configuration in accordance with an advantageous embodiment.

With reference first to FIG. 13, an exposed cross-sectional top view of a flap in an undeployed configuration is depicted in accordance with an advantageous embodiment. Flap 1300 may be one example of one implementation of a control surface such as, for example, control surface 100 in FIG. 1. Flap 1300 may have undeployed configuration 1305, which may be one example of undeployed configuration 122 in FIG. 1. Further, flap 1300 may have a straight shape, which may be one example of shape 120 in FIG. 1.

In these illustrative examples, flap 1300 may have structure 1301. Structure 1301 may include structural components such as, for example, without limitation, rods, beams, tubes, joints, screws, bolts, linkage assemblies, and/or other structural components. Flexible skin 1302 may be attached to first side 1304 and a second side (not shown) of structure 1301. The second side may be substantially opposite to first side 1304 of structure 1301. Flexible skin 1302 may be one example of flexible skin 128 in FIG. 1. Structure 1301 may also have base 1307, tip 1308, end 1311, and end 1313. Ends 1311 and 1313 may be substantially opposite ends of structure 1301. In undeployed configuration 1305, tip 1308 may be at a zero degree angle with respect to the plane of flap 1300. The plane of flap 1300 may be an X-Y plane formed by X-axis 1350 and Y-axis 1352.

Hinge point 1309 may be located on end 1311 of structure 1301, and hinge point 1310 may be located on end 1313 of structure 1301. Hinge points 1309 and 1310 may be aligned to each other along base 1307 of structure 1301. Hinge points 1309 and 1310 may be aligned along axis 1321. Axis 1321 may be an axis of rotation for flap 1300.

Hinge points 1309 and 1310 may be stationary hinge points of attachment for connecting spar 1319 of structure 1301 of flap 1300 to the wing of an aircraft. An illustrative depiction of a portion of a wing may be seen in FIG. 14, below. Hinge points 1309 and 1310 may also be aligned to axis 1321, which may be an axis of rotation for flap 1300.

In these illustrative examples, structure 1301 and flap 1300 may rotate about hinge points 1309 and 1310 and axis 1321 in the direction of arrow 1303. This rotation may cause tip 1308 to be at an inclined angle with respect to tip 1308 in undeployed configuration 1305. Flap 1300 may be rotated by primary actuator 1314 attached to base 1307 of structure 1301. Primary actuator 1314 may rotate flap 1300 about axis 1321. This rotation may provide a degree of flow turning for flap 1300. Primary actuator 1314 may be attached to spar 1319.

Primary actuator 1314 may lengthen or shorten to rotate spar 1319 in the direction of arrow 1303 around axis 1321 and about hinge points 1309 and 1310. This rotation of spar 1319 may pull the second side (not shown) of structure 1301 into the wing of an aircraft at sliding joint 1344. Sliding joint 1344 may be a joint connecting spar 1319, base 1307, and the second side of structure 1301. Sliding joint 1344 may allow a portion of structure 1301 to slide into the wing of an aircraft. In these depicted examples, primary actuator 1314 may be one example of primary actuator 140 in FIG. 1. Sliding joint 1344 may be one example of sliding joint 142 in FIG. 1.

In these illustrative examples, structure 1301 may include a truss such as, for example, truss 1312. Truss 1312 may be one example of truss 130 in FIG. 1. Truss 1312 may be attached to flexible skin 1302 to provide load-bearing support for flexible skin 1302 and flap 1300. In other words, truss 1312 may reduce and/or eliminate stress in chordwise direction 1315 for flexible skin 1302 under air loads. Without truss 1312, flexible skin 1302 may tend to buckle from compression under air loads.

Further, stiffening elements 1316-1328 may be attached to flexible skin 1302. Stiffening elements 1316-1328 may stiffen flexible skin 1302 in spanwise direction 1317, while allowing flexible skin 1302 to maintain flexibility in chordwise direction 1315.

In these illustrative examples, structure 1301 may be divided up into bays 1330-1342 and tip section 1343. These bays may be visualized as being defined by stiffening elements 1316-1328. Bays 1330-1342 may be arranged adjacent to each other beginning from base 1307 in chordwise direction 1315. Tip section 1343 may be located between tip 1308 and bay 1342.

In these illustrative examples, flap 1300 may use plurality of deformable assemblies 1354 and horizontal actuator system 1355 to change the diagonal lengths and quadrilateral shapes of bays 1330-1342. Plurality of deformable assemblies 1354 may include deformable assemblies 1356-1368 in bays 1330-1342, respectively.

These deformable assemblies may be examples of deformable assembly 1200 in FIG. 12. Deformable assemblies 1356-1368 may be attached to structure 1301 at end 1313. In these examples, bays 1330-1342 may have a similar set of deformable assemblies (not shown) attached to structure 1301 at end 1311. Thus, each bay may have two deformable assemblies. These additional deformable assemblies have not been shown for simplicity and understanding. Deformable assemblies 1356-1368 may be moveably connected to structure 1301. Deformable assemblies 1356-1368 may move relative to their points of attachment on structure 1301.

As one example, deformable assembly 1356 may have vertex A 1370, vertex B 1372, vertex C 1374, and vertex D 1376. Deformable assemblies 1358-1368 may have vertices similar to deformable assembly 1356. These vertices may correspond to the vertices for deformable assembly 1200 in FIG. 12. Vertex A 1370 may correspond to vertex A 1202. Vertex B 1372 may correspond to vertex B 1204. Vertex C 1374 may correspond to vertex C 1206. Vertex D 1376 may correspond to vertex D 1208. Deformable assemblies 1356-1368 may change form in the same manner as deformable assembly 1200 in FIG. 12.

In these illustrative examples, horizontal members 1378-1390 may be attached to deformable assemblies 1356-1368 at vertices D at both ends of structure 1301. For example, horizontal member 1378 may be attached to deformable assembly 1356 at vertex D 1376. In addition, horizontal member 1378 may also be attached to another deformable assembly (not shown) moveably connected to structure 1301 at end 1311. Horizontal members 1378-1390 may be actuators in horizontal actuator system 1355. These actuators may be, for example, without limitation, linear actuators capable of changing length.

Horizontal members 1380-1390 may also be attached to the deformable assemblies attached to structure 1301 in a similar manner as horizontal member 1378. Thus, each bay of bays 1330-1342 may have one horizontal member connecting two deformable assemblies. In these depicted examples, flap 1300 may have seven horizontal members. As a result, flap 1300 may have seven horizontal members plus primary actuator 1314 for a total of eight actuators for flap 1300. In this manner, the use of horizontal members and deformable assemblies may reduce the total number of actuators needed as opposed to using diagonal members.

In these illustrative examples, horizontal members 1378-1390 may change lengths in spanwise direction 1317 to affect the form of the deformable assemblies of flap 1300. For example, deformable assembly 1356 may have height 1392, which may be measured from end 1313 to vertex D 1376. Horizontal member 1378 may have length 1393. Horizontal member 1378 may increase in length to move vertex D 1376 in the direction of arrow 1394.

Movement of vertex D 1376 may correspond to a similar movement of vertex D 1208 to vertex D' 1226 in FIG. 12. This movement may cause a decrease in height 1392 of deformable assembly 1356. In these examples, height 1392 may correspond to height 1236 in FIG. 12. Changes in deformable assemblies 1356-1368 may relate to changes in the shapes of bays 1330-1342. These changes may result in a change in the shape of structure 1301 to a curved shape. Flexible skin 1302 may curve with this shape. Such changes may result in a curved shape for flap 1300.

Figure 14:
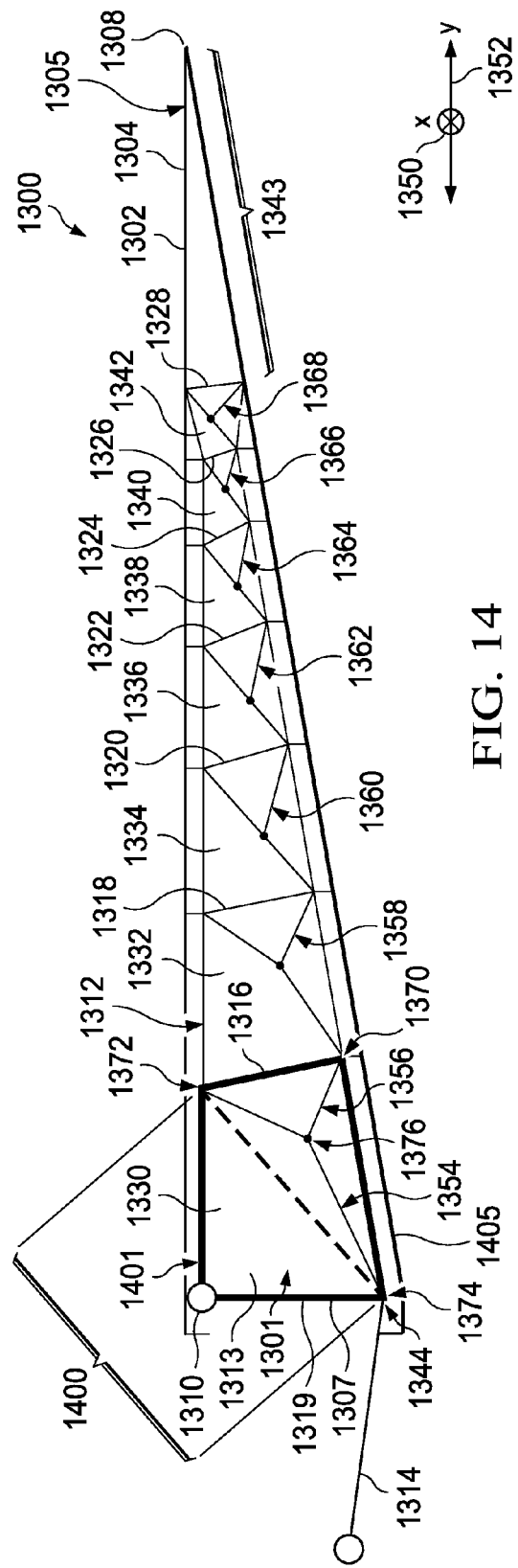
FIG. 14 is an exposed cross-sectional view of a flap in an undeployed configuration in accordance with an advantageous embodiment.

With reference now to FIG. 14, an exposed cross-sectional view of flap 1300 in an undeployed configuration is depicted in accordance with an advantageous embodiment. This view of flap 1300 may be a view of end 1313 of structure 1301. Flap 1300 may have undeployed configuration 1305 with a straight shape. In this view of flap 1300, second side 1405 of structure 1301 may be seen. Second side 1405 may be substantially opposite to first side 1304 of structure 1301.

In this view in FIG. 14, hinge point 1310 may connect spar 1319 to frame 1406 of wing 1408 of an aircraft. Further, primary actuator 1314 may be connected to wing 1408 at attachment point 1410 of frame 1406. Frame 1406 of wing 1408 may be one example of an implementation of frame 106 of wing 104 in FIG. 1. Sliding joint 1344 may allow structure 1301 to slide into wing 1408 during rotation of spar 1319 and structure 1301 by primary actuator 1314.

In these illustrative examples, when viewed from an end of structure 1301, bays 1330-1342 may have quadrilateral shapes. Further, bays 1330-1342 may have diagonal lengths, which may be the diagonal lengths of these quadrilateral shapes. For example, bay 1330 may have diagonal length 1400 and quadrilateral shape 1401 in undeployed configuration 1305. Diagonal length 1400 and quadrilateral shape 1401 may be substantially the same for both end 1311 and end 1313 of bay 1330 for flap 1300. In these advantageous embodiments, the diagonal lengths of bays 1330-1342 may be changed to change the quadrilateral shapes of bays 1330-1342. These changes may cause a change in the shape of structure 1301. In response to the change in the shape of structure 1301, flexible skin 1302 may curve with structure 1301.

In these examples, diagonal length 1400 may increase in length as horizontal member 1378 in FIG. 13 increases in length and height 1392 (not shown) of deformable assembly 1356 decreases in height. As diagonal length 1400 changes, quadrilateral shape 1401 may also change. As horizontal members 1378-1390 increase in length, the diagonal lengths of bays 1330-1342 increase in length. This increase in length may, in turn, change the quadrilateral shapes of bays 1330-1342. These changes may result in structure 1301 and flexible skin 1302, and thus, flap 1300, having a curved shape.

Figure 15:
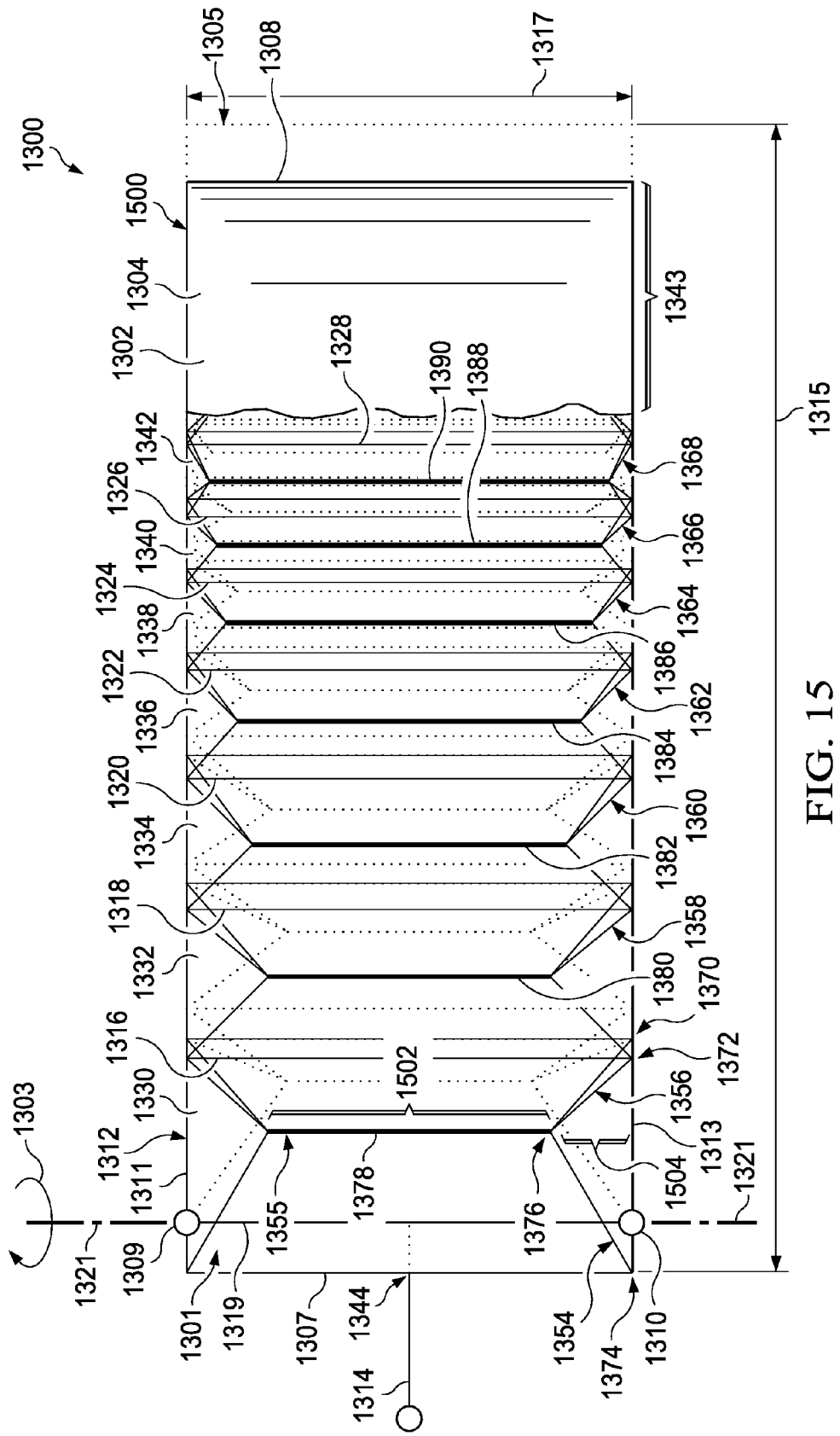
FIG. 15 is an exposed top view of a flap in a partially deployed configuration in accordance with an advantageous embodiment.

With reference now to FIG. 15, an exposed top view of flap 1300 in a partially deployed configuration is depicted in accordance with an advantageous embodiment. Flap 1300 may have deployed configuration 1500. In deployed configuration 1500, flap 1300 may have tip 1308 at an inclined angle of around 36 degrees with respect to tip 1308 in undeployed configuration 1305.

In these illustrative examples, horizontal members 1378-1390 may have increased lengths in deployed configuration 1500 with respect to their lengths in undeployed configuration 1305. These increased lengths may result in decreased heights for deformable assemblies 1356-1368. For example, length 1393 of horizontal member 1378 may increase to around length 1502. This increase may result in deformable assembly 1356 having height 1504. Height 1504 may be greater than height 1392 of deformable assembly 1356 in undeployed configuration 1305. These changes may result in changes in the quadrilateral shapes of bays 1330-1342.

Figure 16:
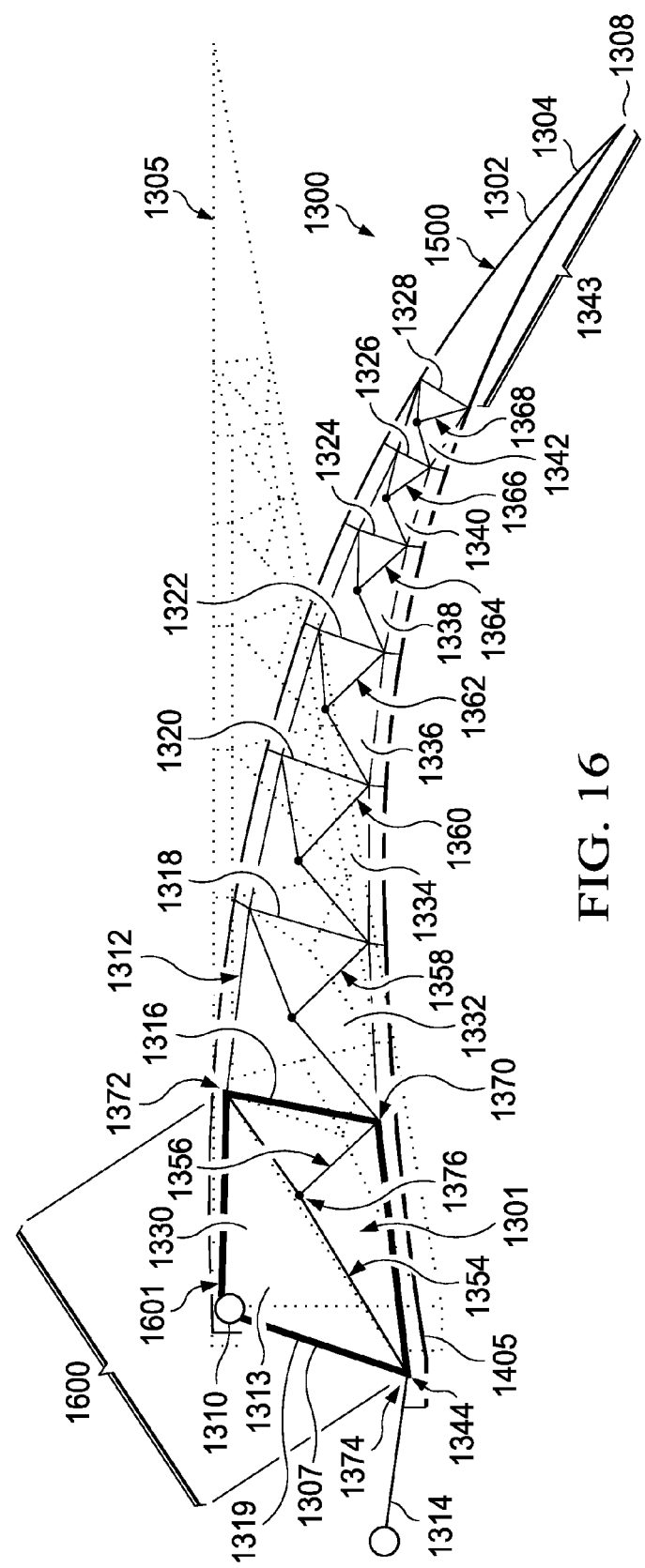
FIG. 16 is an exposed cross-sectional view of a flap in a deployed configuration in accordance with an advantageous embodiment.

With reference now to FIG. 16, an exposed cross-sectional view of flap 1300 in a deployed configuration is depicted in accordance with an advantageous embodiment. Flap 1300 may have deployed configuration 1500. In this example, tip 1308 may be at an inclined angle of around 36 degrees with respect to tip 1308 in undeployed configuration 1305.

Bays 1330-1342 may have increased diagonal lengths in deployed configuration 1500 with respect to the diagonal lengths in undeployed configuration 1305. For example, bay 1330 may have diagonal length 1600 in deployed configuration 1500, which may be longer than diagonal length 1400 in undeployed configuration 1305. Further, bay 1330 may have quadrilateral shape 1601 in deployed configuration 1500.

The increase in the diagonal lengths of bays 1330-1342 may result in a change in the shape of structure 1301. In response to the change in the shape of structure 1301, flexible skin 1302 may curve with the shape of structure 1301 in a smooth manner. This shape changing of structure 1301 and curving of flexible skin 1302, in addition to the rotation of flap 1300 by primary actuator 1314, may form deployed configuration 1500.

Figure 17:
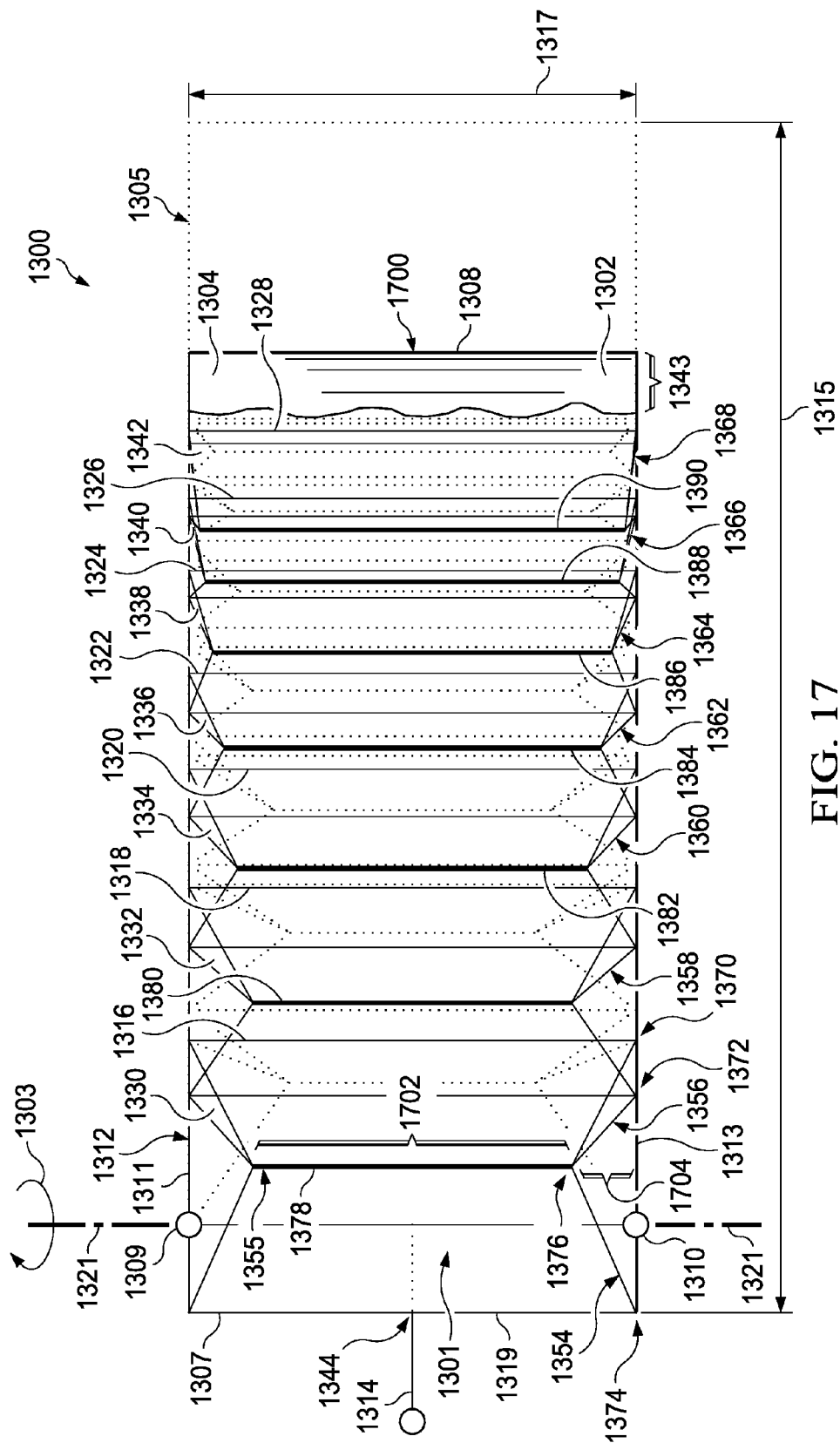
FIG. 17 is an exposed top view of a flap in a fully deployed configuration in accordance with an advantageous embodiment.

With reference now to FIG. 17, an exposed top view of flap 1300 in a fully deployed configuration is depicted in accordance with an advantageous embodiment. Flap 1300 may have deployed configuration 1700. In deployed configuration 1700, tip 1308 may be at an inclined angle of around 60 degrees with respect to tip 1308 in undeployed configuration 1305.

In this illustrative example, horizontal members 1378-1390 may have increased lengths with respect to the lengths of horizontal members 1378-1390 in undeployed configuration 1305 and deployed configuration 1500. Further, the heights of deformable assemblies 1356-1368 may be decreased with respect to the heights of deformable assemblies 1356-1368 in undeployed configuration 1305 and deployed configuration 1500. For example, horizontal member 1378 may have length 1702, which may be longer than lengths 1393 and 1502. Deformable assembly 1356 may have height 1704, which may be greater than heights 1392 and 1504.

Figure 18:
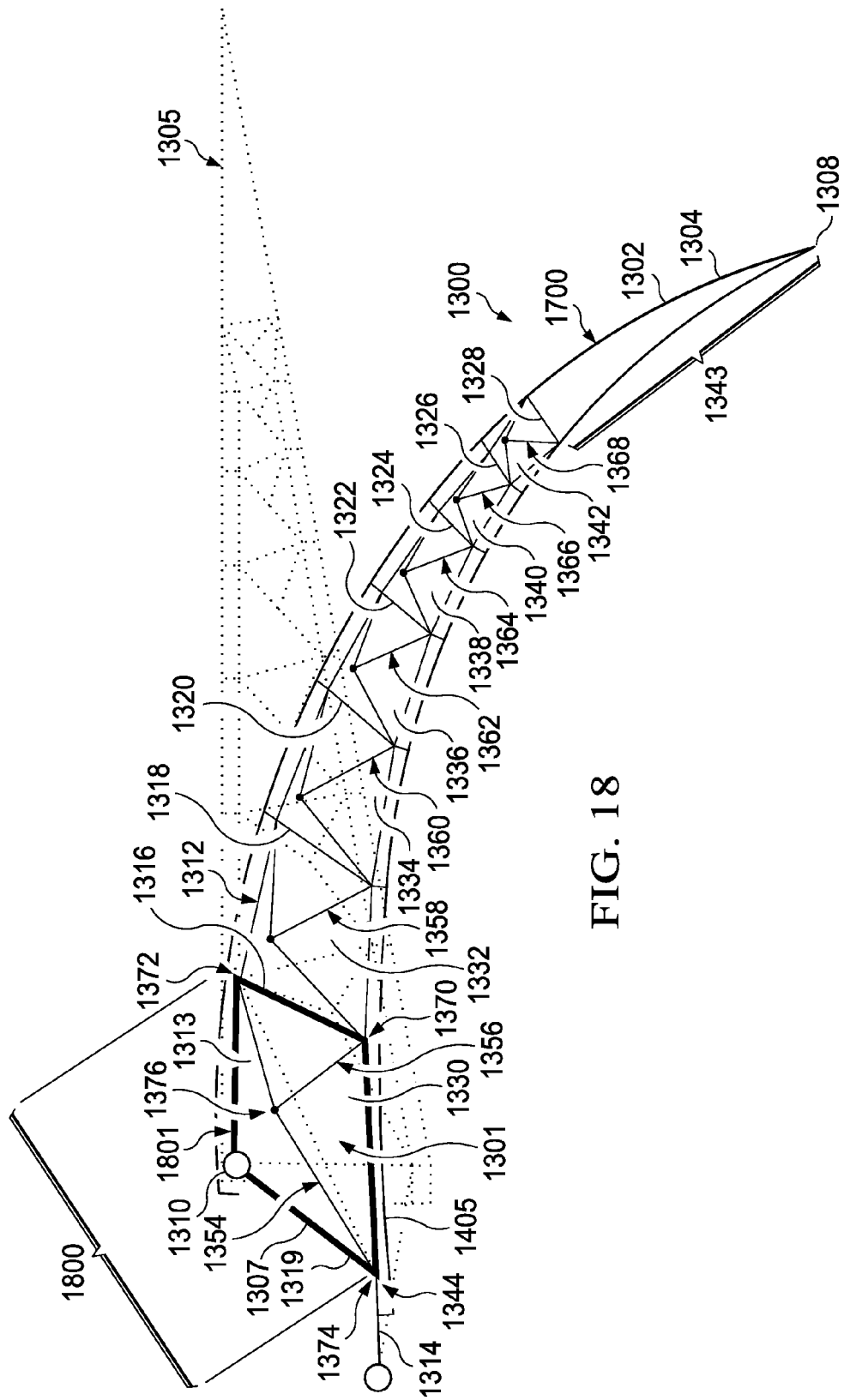
FIG. 18 is an exposed cross-sectional view of a flap in a deployed configuration in accordance with an advantageous embodiment.

With reference now to FIG. 18, an exposed cross-sectional view of flap 1300 in deployed configuration 1700 is depicted in accordance with an advantageous embodiment. In this illustrative example, bays 1330-1342 may have increased diagonal lengths with respect to the diagonal lengths of bays 1330-1342 in undeployed configuration 1305 and deployed configuration 1500. For example, bay 1330 may have diagonal length 1800, which may be longer than diagonal lengths 1400 and 1600. Further, bay 1330 may have quadrilateral shape 1801.

Figure 19:
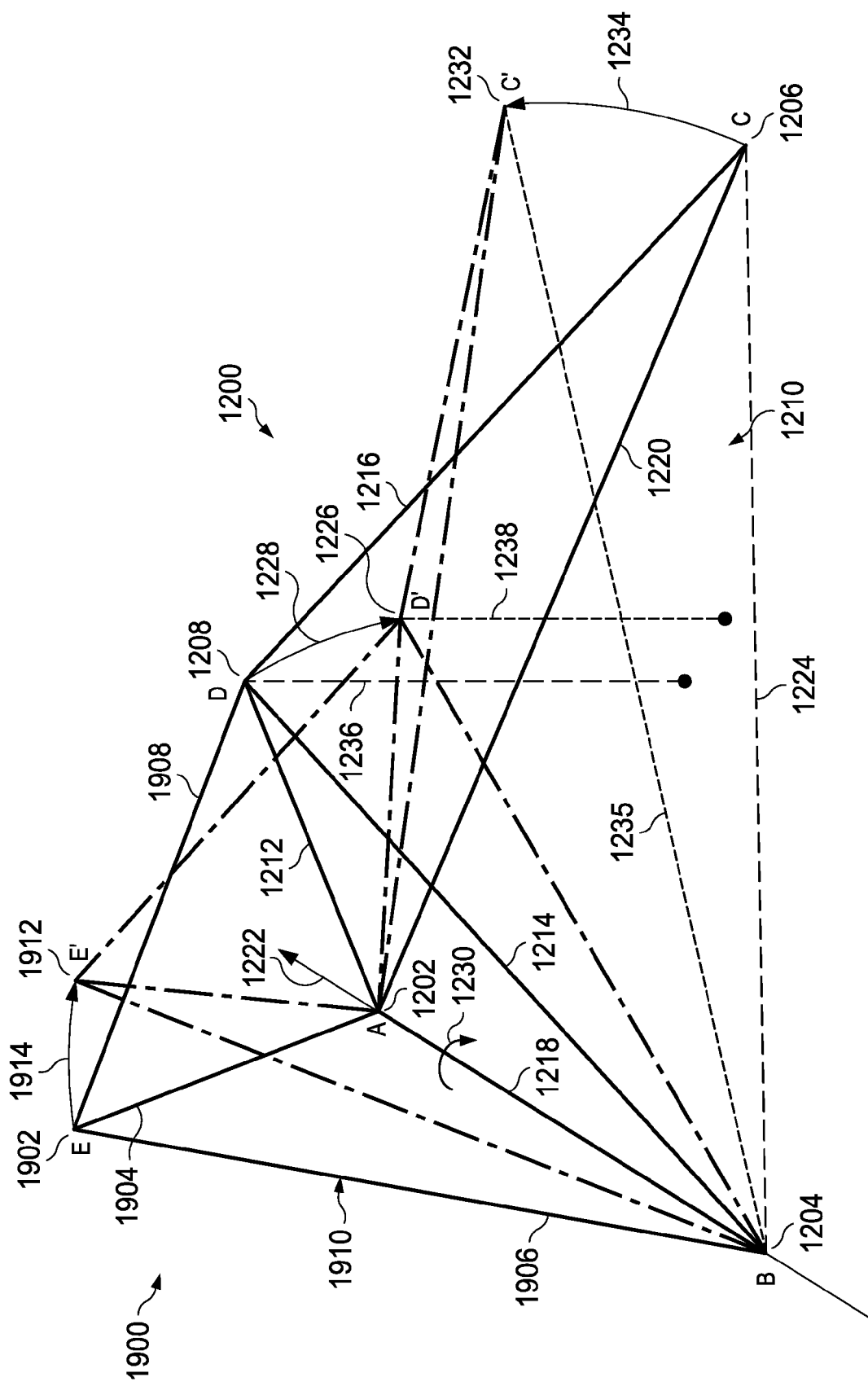
FIG. 19 is a diagram of a deformable assembly connected to a portion of a connector system in accordance with an advantageous embodiment.

With reference now to FIG. 19, a diagram of a deformable assembly connected to a portion of a connector system is depicted in accordance with an advantageous embodiment. In this depicted example, deformable assembly 1200 in FIG. 12 may be connected to a portion of connector system 1900.

Connector system 1900 may be one example of one implementation for connector system 156 in FIG. 1.

In these illustrative examples, connector system 1900 may include vertex E 1902, member A-E 1904, member B-E 1906, and member D-E 1908. Each of these members of connector system 1900 may have a fixed length. Member A-E 1904, member B-E 1906, member D-E 1908, member A-B 1218, member A-D 1212, and member B-D 1214 may form connection structure 1910 in FIG. 19. Connection structure 1910 may be fixed and rigid due to the fixed lengths of its members. However, connection structure 1910 may be capable of rotation and/or movement. Vertex D 1208 of deformable assembly 1200 may be connected to vertex E 1902 of connector system 1900 by member D-E 1908.

The rigidity of connection structure 1910 and the connection of vertex D 1208 to vertex E 1902 may cause movement of vertex D 1208 to move connection structure 1910. For example, movement of vertex D 1208 to vertex D' 1226 may cause vertex E 1902 to move to vertex E' 1912. In other words, vertex E 1902 may be rotated about member A-B 1218 in the direction of arrow 1230. In this manner, the movement of vertex D 1208 and deformable assembly 1200 may be linked to the movement of vertex E 1902 and connection structure 1910. In a similar manner, movement of vertex E 1902 may cause vertex D 1208 to move and deformable assembly 1200 to change form. In some advantageous embodiments, connector system 1900 may include a number of connection structures similar to connection structure 1910.

With reference now to FIGS. 20-25, a flap is depicted in accordance with an advantageous embodiment. Flap 1300 is depicted using a plurality of deformable assemblies, a motion generation system having a horizontal actuator system and a primary actuator, and a connector system.

Figure 20:
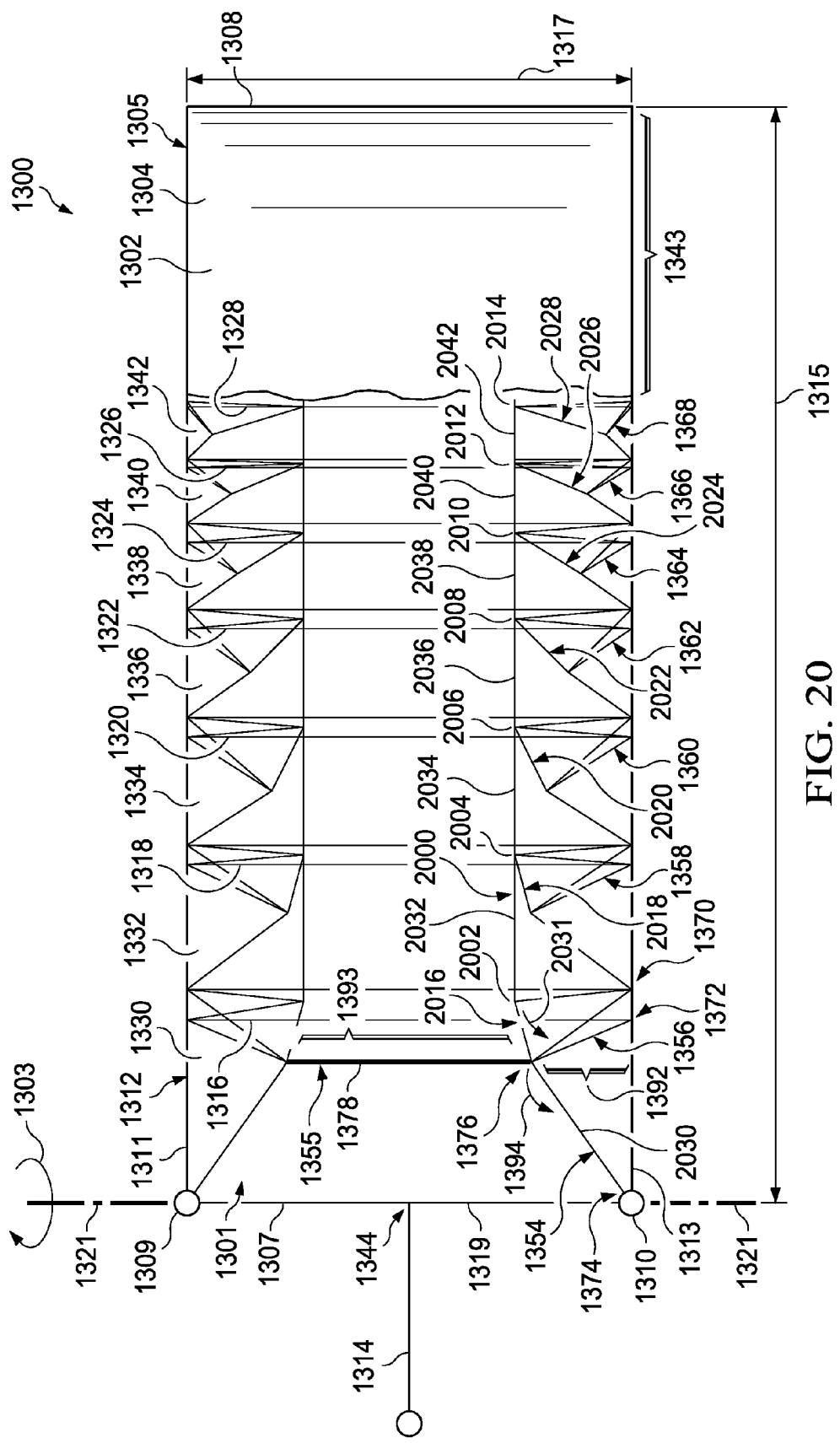
FIG. 20 is an exposed top view of a flap in an undeployed configuration in accordance with an advantageous embodiment.

With reference first to FIG. 20, an exposed top view of a flap in an undeployed configuration is depicted in accordance with an advantageous embodiment. In these depicted examples, flap 1300 may be implemented using single horizontal member 1378 and connector system 2000. Horizontal members 1380-1390 in FIG. 13 may not be present in bays 1332-1342. Connector system 2000 may be one example of one implementation for connector system 156 in FIG. 1. In these examples, structure 1301 may still have plurality of deformable assemblies 1354.

In these examples, connector system 2000 may relate changes in deformable assembly 1356 in bay 1330 to changes in deformable assemblies 1358-1368. In other words, the changes in deformable assembly 1356 generated by horizontal member 1378 may be used to affect similar changes in deformable assemblies 1358-1368. For example, an increase in length of horizontal member 1378 may cause a change in the form and height of deformable assembly 1356. This change may result in an increased diagonal length for bay 1330.

Connector system 2000 may connect deformable assembly 1356 in bay 1330 to deformable assemblies 1358-1368 in bays 1332-1342. In this manner, the change in the diagonal length of bay 1330 may be translated into changes in the diagonal lengths of bays 1332-1342.

Connector system 2000 may include vertices E 2002-2014 and connection structures 2016-2028. Vertices E 2002-2014 may be examples of vertex E 1902 in FIG. 19. Connection structures 2016-2028 may be examples of connection structure 1910 in FIG. 19. Vertices E 2002-2014 and connection structures 2016-2028 may relate changes in deformable assembly 1356 to changes in deformable assemblies 1358-1368.

For example, vertex E 2002 may be connected to vertex D 1376 of deformable assembly 1356 in bay 1330. Vertex E 2002 may be connected to vertex D 1376 by member 2030 of connection structure 2016. Member 2030 may be one example of member D-E 1908 in FIG. 19. Movement of vertex D 1376 in the direction of arrow 1394 by horizontal member 1378 may cause movement of vertex E 2002 and connection structure 2016 in the direction of arrow 2031.

In these examples, each of bays 1330-1342 may have vertices E 2002-2014 connected to the vertices D of deformable assemblies 1356-1368 by members similar to member 2030. In these examples, vertices E 2002-2014 may be connected by members 2032-2042. Members 2032-2042 may connect connection structures 2016-2028 in a series fashion.

Movement of vertex E 2002 and connection structure 2016 in the direction of arrow 2031 may cause movement of vertices E 2004-2014 and connection structures 2018-2028 in a similar direction. Movement of vertices E 2002-2014 and connection structures 2016-2028 may result in movement of the vertices D of deformable assemblies 1356-1368. Further, movement of these vertices D may result in changes in the heights and forms of deformable assemblies 1356-1368. In these illustrative examples, a second connector system (not shown) similar to connector system 2000 may be present at end 1311 of structure 1301. This second connector system may affect changes in deformable assemblies that may also be present at end 1311 of structure 1301.

Figure 21:
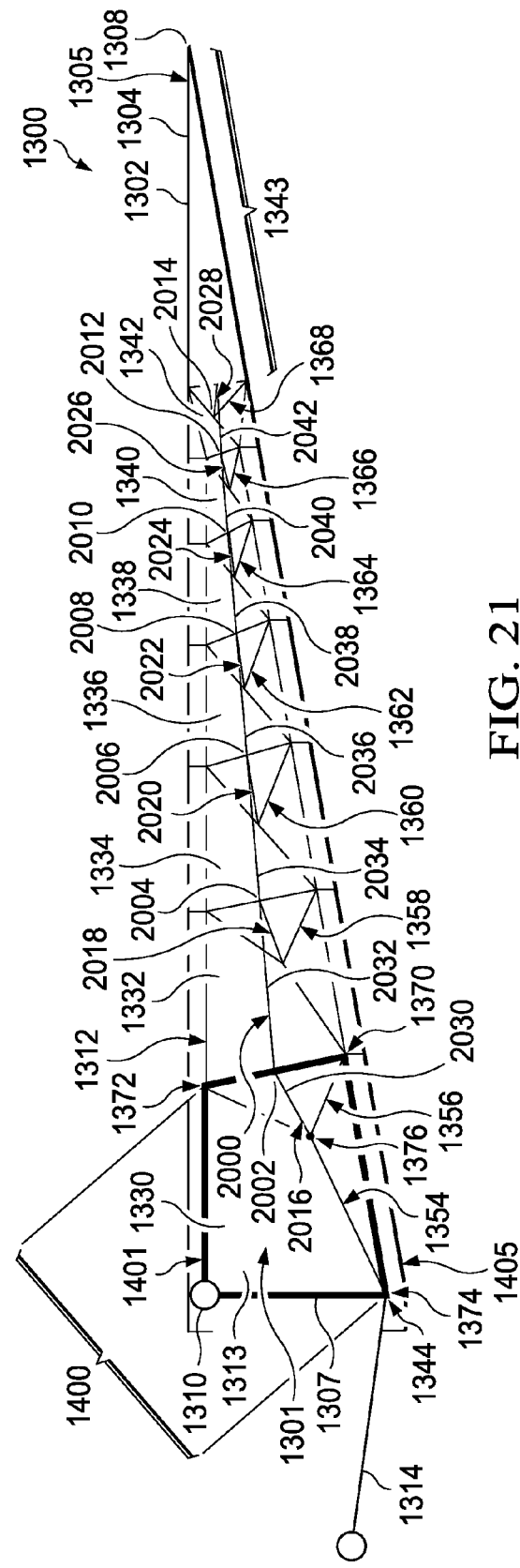
FIG. 21 is an exposed cross-sectional view of a flap in an undeployed configuration in accordance with an advantageous embodiment.

With reference now to FIG. 21, an exposed cross-sectional view of a flap in an undeployed configuration is depicted in accordance with an advantageous embodiment. This view of flap 1300 may be a view of end 1313 of flap 1300. Flap 1300 may have undeployed configuration 1305 with a straight shape. In this view of flap 1300, second side 1405 of structure 1301 may be seen.

In these illustrative examples, the diagonal lengths and quadrilateral shapes for bays 1330-1342 may be changed to change the shape of structure 1301 and flap 1300. For example, movement of vertex D 1376 may change diagonal length 1400 and quadrilateral shape 1401 for bay 1330.

Movement of the vertices D of deformable assemblies 1356-1368 may result in changes in the diagonal lengths for bays 1330-1342. Changes in the diagonal lengths for bays 1330-1342 may result in changes in the quadrilateral shapes for bays 1330-1342. In this manner, changes to these diagonal lengths and quadrilateral shapes may result in a change in the shape of structure 1301. Flexible skin 1302 may curve in a smooth manner with structure 1301 in response to a change in the shape of structure 1301.

In this manner, connector system 2000 may connect deformable assembly 1356 in bay 1330 to deformable assemblies 1358-1368 in bays 1332-1342. The change in the diagonal length of bay 1330 may be translated into changes in the diagonal lengths of bays 1332-1342.

In these examples, flap 1300 may use a total of two actuators, primary actuator 1314 and horizontal member 1378 (not shown) to change the shape of flap 1300. Thus, connector system 2000 may reduce the need for additional actuators affecting deformable assemblies 1358-1368 as compared to other advantageous embodiments.

In these examples, this movement may be related to movement of connector system 2000. Movement of vertex D 1376 may cause movement of vertex E 2002. This movement may cause connector system 2000 to move. Connector system 2000 may translate the movement of deformable assembly 1356 into movement of deformable assemblies 1358-1368. In this manner, the change in the form of deformable assembly 1356 will relate to a change in the forms of deformable assemblies 1358-1368.

Figure 22:
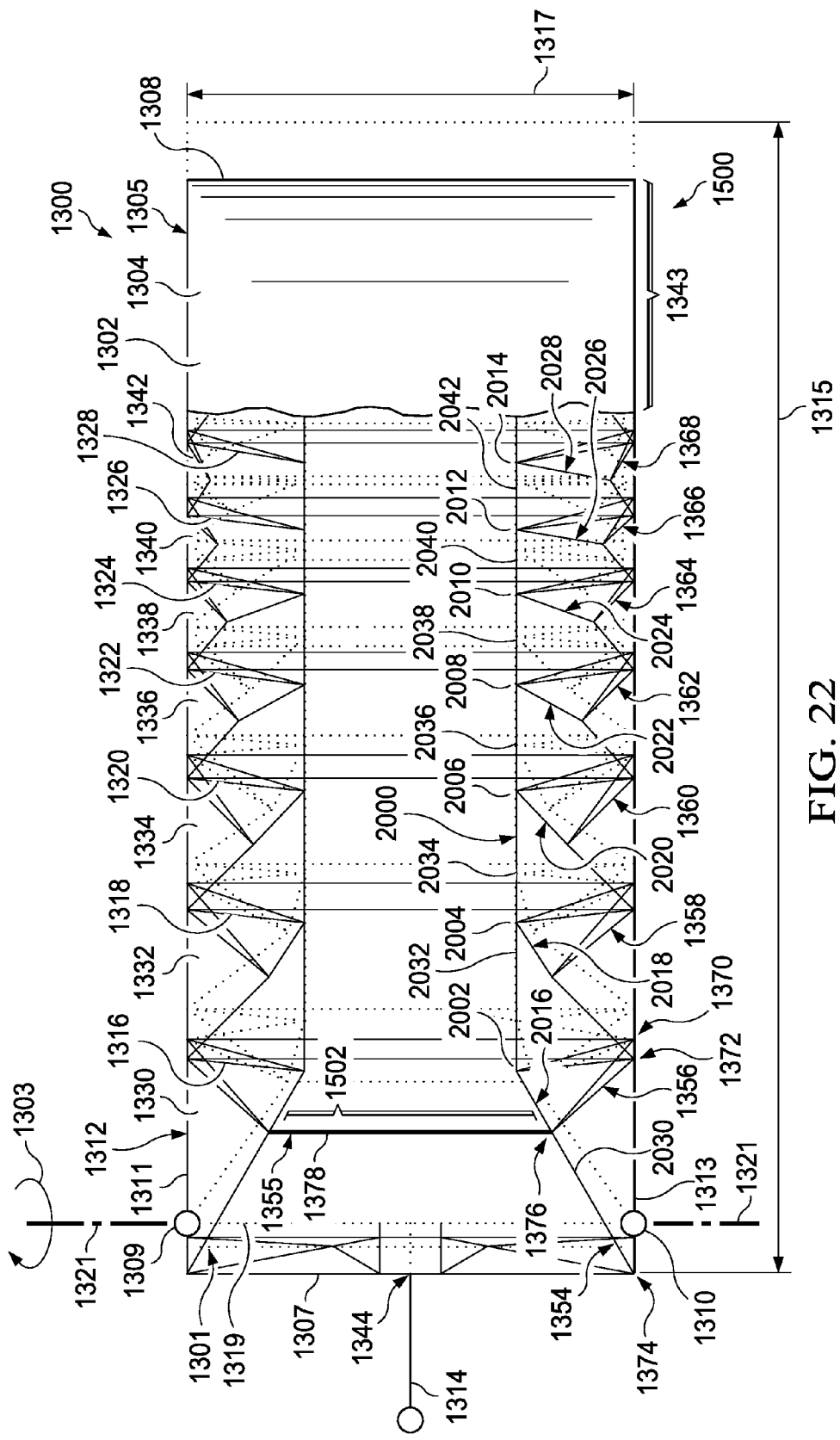
FIG. 22 is an exposed top view of a flap in a deployed configuration in accordance with an advantageous embodiment.

With reference now to FIG. 22, an exposed top view of flap 1300 in a deployed configuration is depicted in accordance with an advantageous embodiment. Flap 1300 may have deployed configuration 1500. In deployed configuration 1500, tip 1308 may be at an inclined angle of around 36 degrees with respect to tip 1308 in undeployed configuration 1305.

In deployed configuration 1500, connector system 2000 may be moved in response to a changing length of horizontal member 1378. Horizontal member 1378 may change length to move vertex D 1376 and change the form and height of deformable assembly 1356. The connection of vertex D 1376 to vertex E 2002 by member 2030 may relate movement of vertex D 1376 to movement of connector system 2000. In this manner, connector system 2000 may allow for the changing of the forms of deformable assemblies 1358-1368 without the need for additional actuators.

Figure 23:
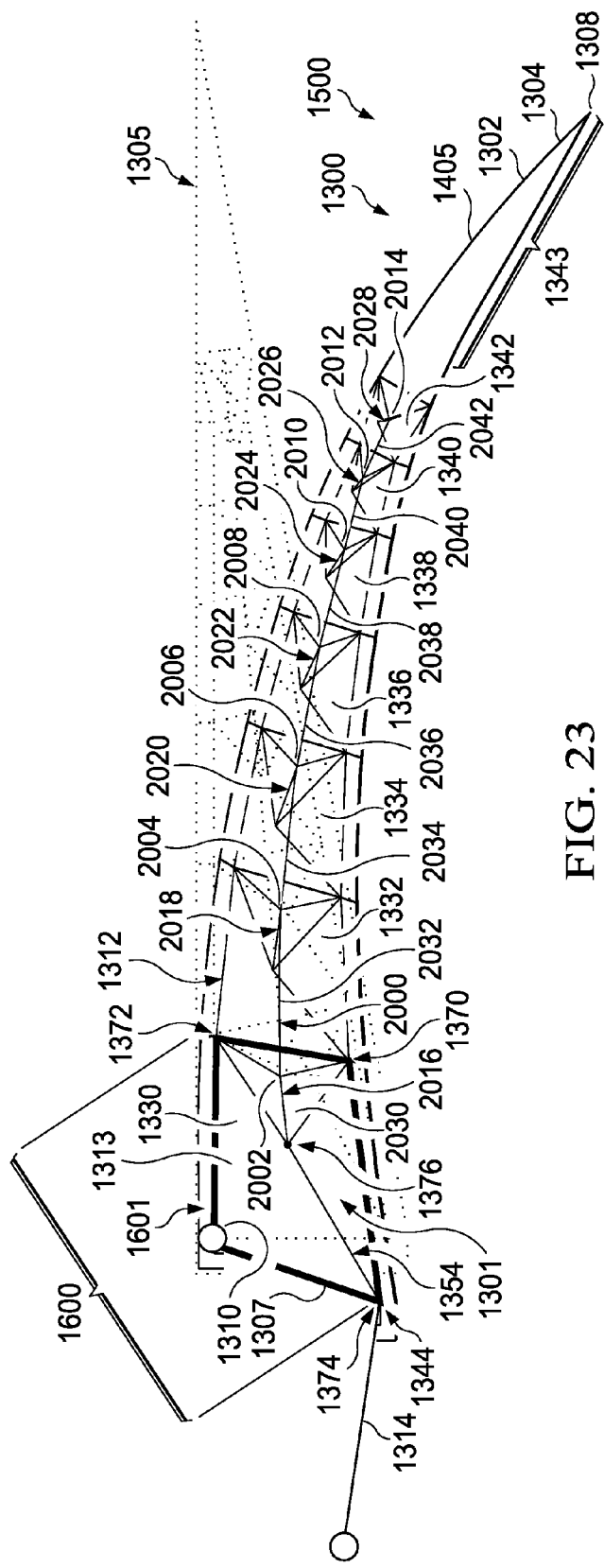
FIG. 23 is a cross-sectional view of a flap in a deployed configuration in accordance with an advantageous embodiment.

With reference now to FIG. 23, a cross-sectional view of flap 1300 in a deployed configuration is depicted in accordance with an advantageous embodiment. Flap 1300 may have deployed configuration 1500. In this example, tip 1308 may be at an inclined angle of around 36 degrees with respect to tip 1308 in undeployed configuration 1305. Further, the change in length of horizontal member 1378 (not shown) and the movement of connector system 2000 may change the diagonal lengths and quadrilateral shapes of bays 1330-1342. These changes may result in a change in the shape of structure 1301. This change in the shape of structure 1301 lead to flexible skin 1302 curving with structure 1301 in a smooth manner with flap 1300 having a curved shape for deployed configuration 1500 as depicted.

Figure 24:
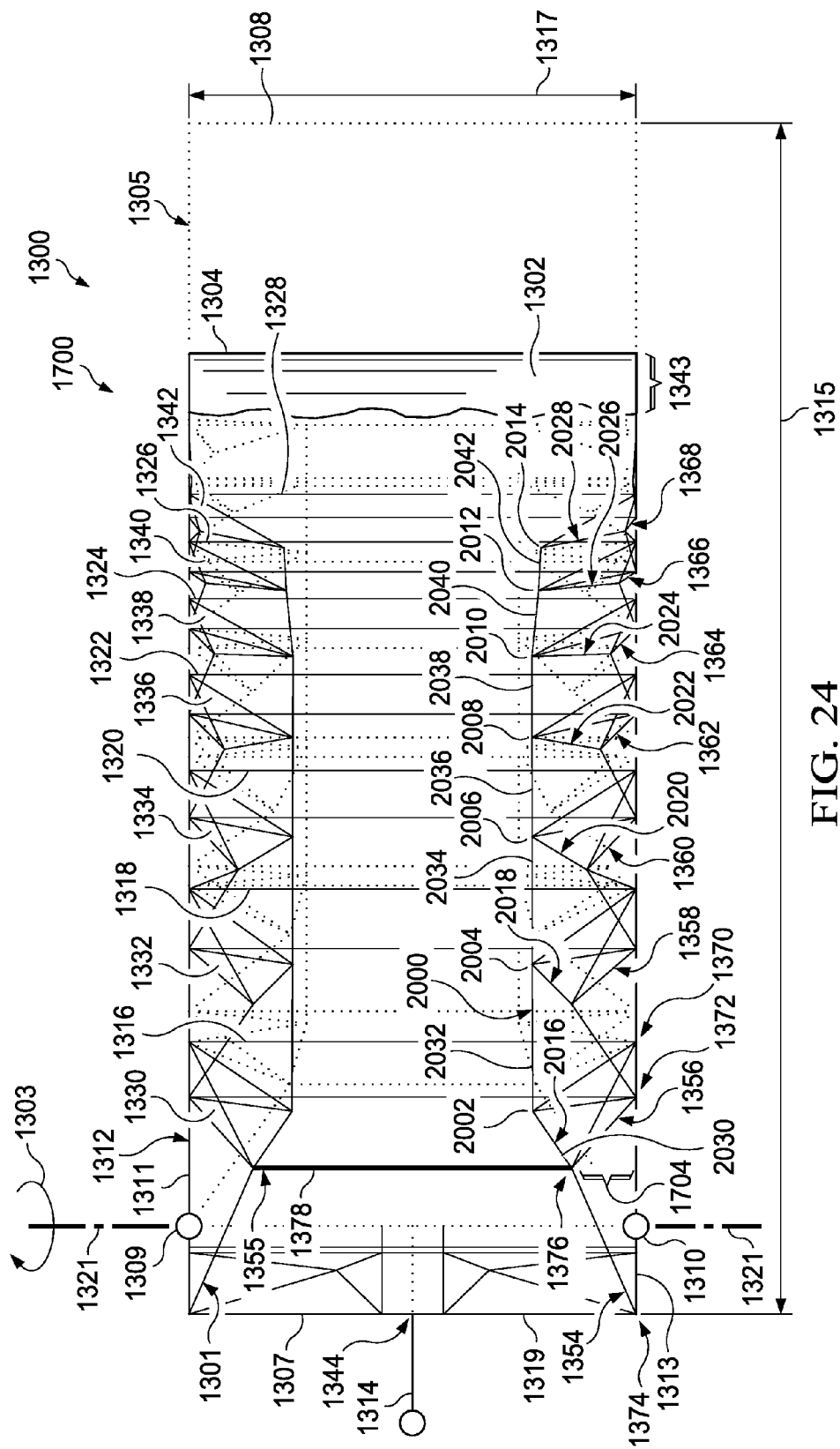
FIG. 24 is an exposed top view of a flap in a deployed configuration in accordance with an advantageous embodiment.

With reference now to FIG. 24, an exposed top view of flap 1300 in a deployed configuration is depicted in accordance with an advantageous embodiment. Flap 1300 may have deployed configuration 1700. In deployed configuration 1700, tip 1308 may be at an inclined angle of around 60 degrees with respect to tip 1308 in undeployed configuration 1305.

In deployed configuration 1700, horizontal member 1378 may change length to move vertex D 1376. Movement of vertex D 1376 may lead to movement of connector system 2000. In this manner, connector system 2000 may move to change the heights and forms of deformable assemblies 1358-1368 in response to the change to height 1704 of deformable assembly 1356.

Figure 25:
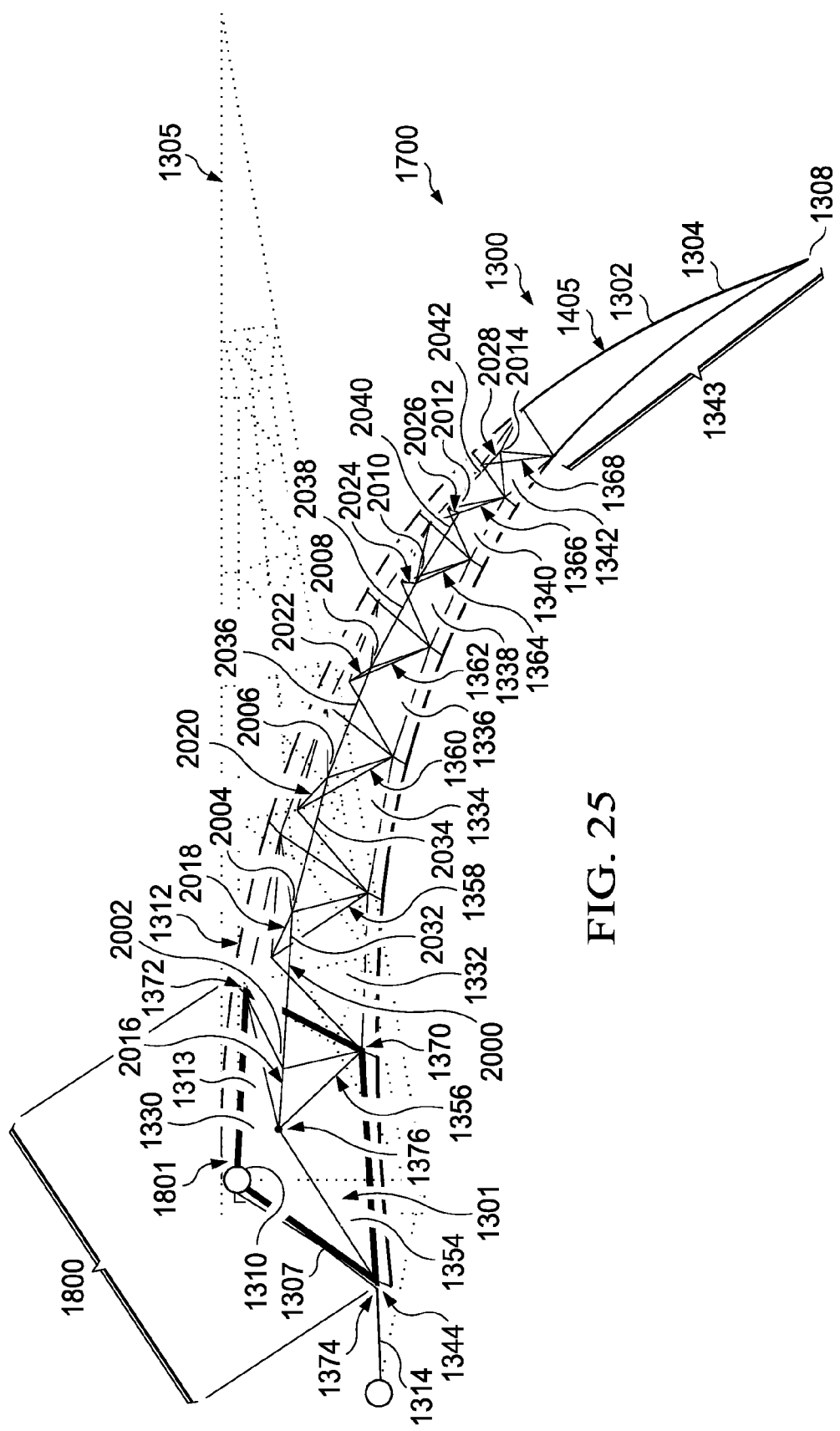
FIG. 25 is a cross-sectional view of a flap in a deployed configuration in accordance with an advantageous embodiment.

With reference now to FIG. 25, a cross-sectional view of flap 1300 in a deployed configuration is depicted in accordance with an advantageous embodiment. Flap 1300 may have deployed configuration 1700. In this example, tip 1308 may be at an inclined angle of around 60 degrees with respect to tip 1308 in undeployed configuration 1305. Further, the changing of deformable assemblies 1356-1368 by horizontal member 1378 (not shown) and connector system 2000 may change the diagonal lengths of bays 1330-1342. In this manner, the shape of structure 1301 may be changed, with flexible skin 1302 curving in a smooth manner to follow the shape of structure 1301. This curved shape for flap 1300 along with rotation of flap 1300 by primary actuator 1314, may form deployed configuration 1700 for flap 1300.

The illustrations of flap 1300 in FIGS. 13-18 and FIGS. 20-25 are not meant to imply physical or architectural limitations to the manner in which flaps may be implemented. For example, flap 1300 may not have truss 1312 attached to flexible skin 1302. In other advantageous embodiments, the changing of the lengths of horizontal members 1378-1390 may be implemented using screw jacks, scissor jacks, and/or some other mechanism or device. However, the use of actuators for horizontal members 1378-1390 may allow for faster response rates.

Figure 26:
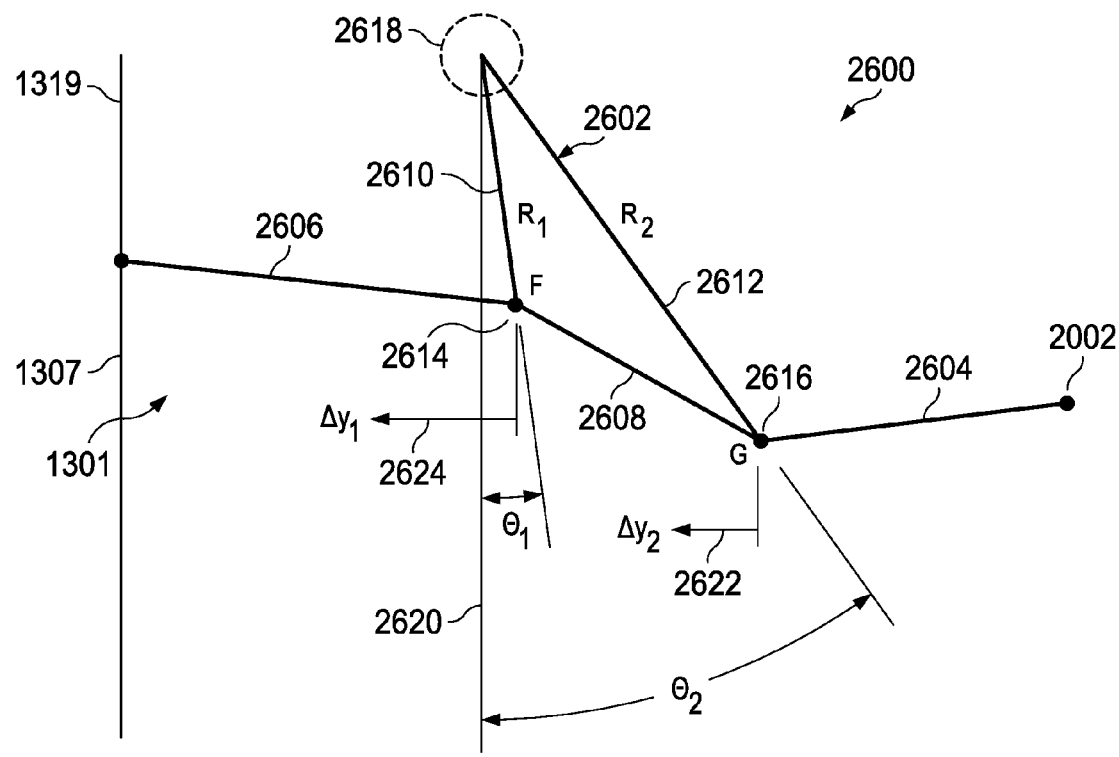
FIG. 26 is a diagram of a linking system in accordance with an advantageous embodiment.

With reference now to FIG. 26, a diagram of a linking system is depicted in accordance with an advantageous embodiment. Linking system 2600 may be one example of one implementation of a linking system for a control surface such as, for example, linking system 158 for control surface 100 in FIG. 1. In these examples, linking system 2600 may be viewed from a top view. Linking system 2600 may be connected to connector system 2000 (not shown) and base 1307 of flap 1300 in FIG. 20. In these examples, linking system 2600 may be used in the place of horizontal member 1378.

Linking system 2600 may include polyhedron structure 2602, first member 2604, and second member 2606. Second member 2606 may connect polyhedron structure 2602 to a spar at a base of a structure such as, for example, spar 1319 at base 1307 of structure 1301 of flap 1300. First member 2604 may connect polyhedron structure 2602 to a connector system such as, for example, connector system 2000 (not shown). In these examples, first member 2604 may connect to connector system 2000 (not shown) at vertex E 2002.

Polyhedron structure 2602 may have members 2608-2612, vertex F 2614, vertex G 2616, and hinge point 2618. Hinge point 2618 may be stationary and may connect members 2610 and 2612. Vertex F 2614 may connect member 2610, member 2608, and second member 2606. Vertex G 2616 may connect member 2612, member 2608, and first member 2604. In this illustrative example, polyhedron structure 2602 may have a second hinge point (not shown) and a number of members (not shown) connecting the second hinge point to polyhedron structure 2602. This second hinge point may be stationary and may be positioned below hinge point 2618 in this view of linking system 2600.

The vertices and members of linking system 2600 may be designed to have fixed angles and fixed lengths. In this manner, polyhedron structure 2602 may be designed to have a rigid structure of fixed lengths and fixed angles. The different members in linking system 2600 may be, for example, without limitation, rods, beams, tubes, and/or other suitable structural components. The vertices in linking system 2600 may be, for example, without limitation, joints, mechanical links, and/or other suitable types of connections.

Linking system 2600 may relate motion of spar 1319 caused by primary actuator 1314 (not shown) to movement of vertex E 2002 and thus, vertices E 2004-2014 (not shown). For example, a lengthening or shortening of primary actuator 1314 may cause a rotation of spar 1319. Member 2606 may connect spar 1319 to polyhedron structure 2602. This connection may translate rotation of spar 1319 into rotation of polyhedron structure 2602 about hinge point 2618 and the second hinge point. Further, member 2604 may connect polyhedron structure 2602 to vertex E 2002. This connection may translate rotation of polyhedron structure 2602 into movement of vertex E 2002 and connection structure 2016 (not shown) relative to structure 1301.

Thus, linking system 2600 may allow vertex E 2002 to move a required amount to achieve a change in the shape of structure 1301 in response to movement generated by primary actuator 1314. This relation of motion requires that vertex E 2002 be moved a relatively greater distance towards the rear of a wing compared to the forward portion of flap 1300. This motion may be referred to as a "multiplying" motion. Thus, linkage system 2600 may function as a lever.

Vertex E 2002 may be connected to vertices E 2004-2014 in FIG. 20 in such a way that movement of vertex E 2002 causes movement of vertices E 2004-2014. The movement of vertices E 2002-2014 causes changes in the forms of the deformable assemblies within flap 1300. These changes may result in increased diagonal lengths for the bays of flap 1300. Increased diagonal lengths for the bays may lead to a change in the shape of structure 1301. In response to this change, flexible skin 1302 may curve to follow the shape of structure 1301, and flap 1300 may have a curved shape.

The design parameters for linking system 2600 may take into account certain geometric considerations based on the required movement of vertex E 2002 to change the shape of structure 1301 in response to the movement caused by primary actuator 1314. In this manner, the movement of vertex E 2002 may be controlled to cause flap 1300 to bend to a desired configuration in response to primary actuator 1314.

In this example, the behavior of linking system 2600 may be governed by the quantities R1, R2, θ1, and θ2. As depicted, R1 may be a length of member 2610, and R2 may be a length of member 2612. Further, θ1 may be an angle between member 2610 and horizontal axis 2620, and θ2 may be an angle between horizontal axis 2620 and member 2612. Horizontal axis 2620 may be an axis parallel to spar 1319 when flap 1300 is in undeployed configuration 1305. The values of R1, R2, θ1, and θ2, may be used to tune the rates of change of movement for vertex E 2002.

If R2 is greater than R1, the motion of vertex E 2002 may be amplified. In other words, the motion Δy2 of vertex G 2616 in the direction of arrow 2622 may be faster than the motion Δy1 of vertex F 2614 in the direction of arrow 2624. In this manner, polyhedron structure 2602 of linking system 2600 may function as a lever.

Figure 27:
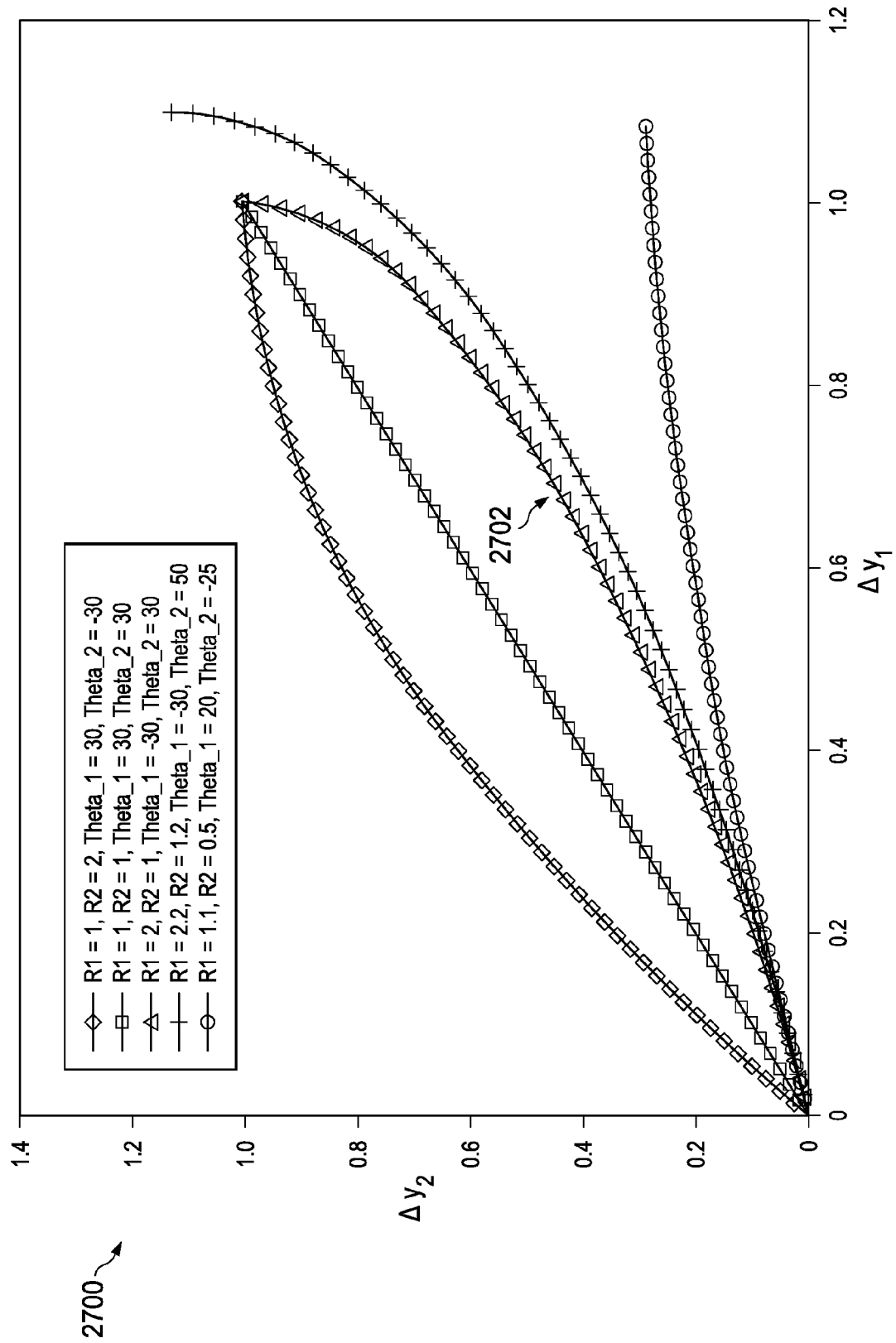
FIG. 27 is a graph illustrating rates of change for a linkage assembly in accordance with an advantageous embodiment.

With reference now to FIG. 27, a graph illustrating rates of change for a linkage assembly is depicted in accordance with an advantageous embodiment. In this example, the rates of change for motion Δy1 and motion Δy2 for a linkage assembly such as, for example, linking system 2600, may be illustrated.

As illustrated in graph 2700, depending on the values selected for the design parameters R1, R2, θ1, and θ2, the rates of change between motion Δy1 and motion Δy2 may be designed to be either linear or nonlinear. In some advantageous embodiments, it may be desirable to specify some degree of linearity for the behavior of linking system 2600. In other words, it may be desirable to design linking system 2600 to partially and/or approximately linearize the nonlinear behavior of the deformable assemblies in a flap.

As depicted in graph 2700, the nonlinear behavior of deformable assemblies may be at least partially linearized by selecting a geometry for linking system 2600 that follows a similar behavior to geometry 2702. Geometry 2702 may have the design parameters R1 equal to around 2, R2 equal to around 1, θ1 equal to around −30 degrees, and θ2 equal to around 30 degrees.

Figure 28:
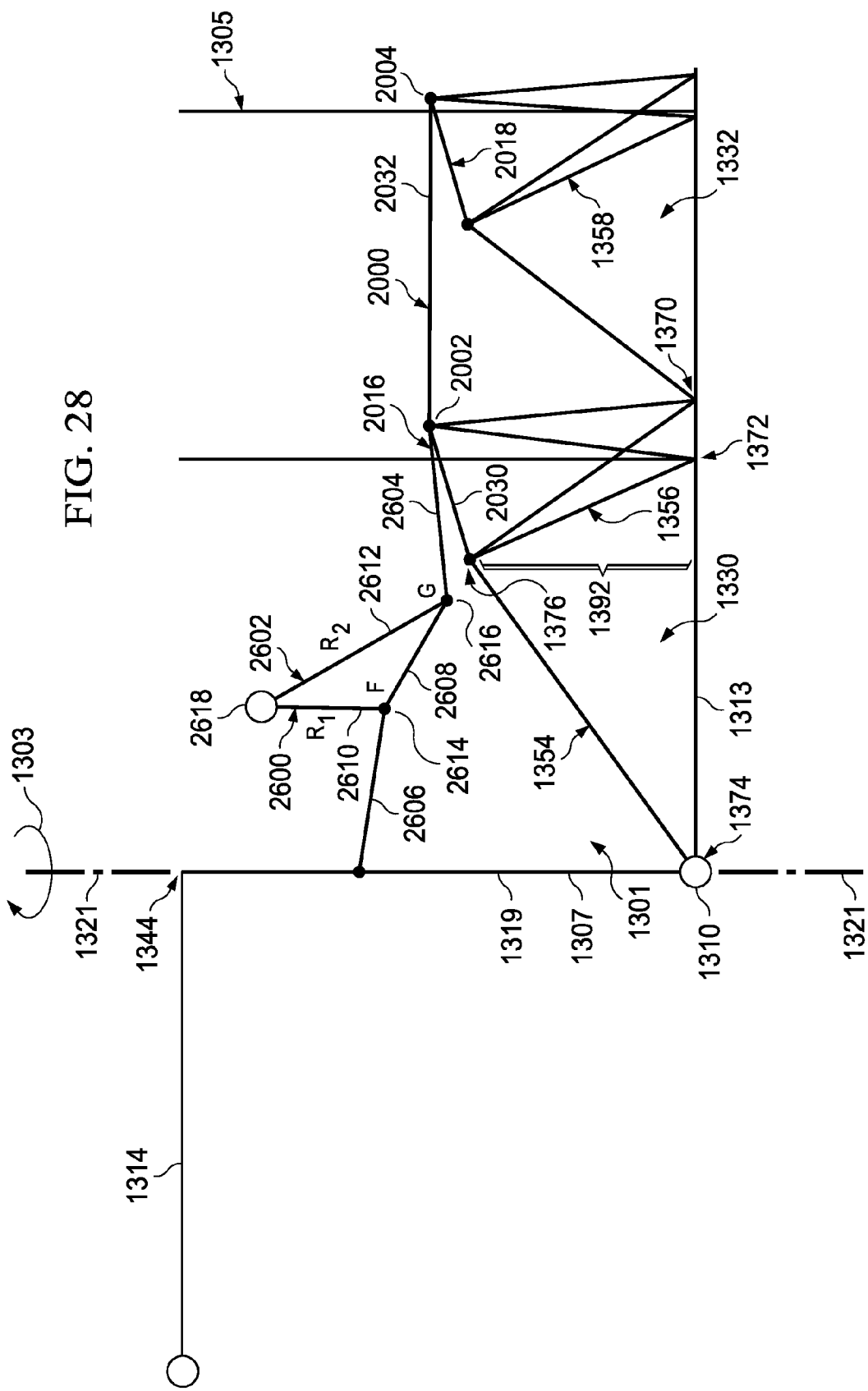
FIG. 28 is a partially exposed top view of a flap with a linking system in an undeployed configuration in accordance with an advantageous embodiment.

With reference now to FIG. 28, a partially exposed top view of flap 1300 with linking system 2600 in FIG. 26 in undeployed configuration 1305 is depicted in accordance with an advantageous embodiment. In this view, bays 1330 and 1332 of structure 1301 may be viewed with deformable assemblies 1356 and 1358 and a portion of connector system 2000.

In this example, flap 1300 may change its shape using one actuator, primary actuator 1314, and linking system 2600. Horizontal member 1378 and horizontal members 1380-1390 may not be present in these advantageous embodiments.

Linking system 2600 may connect to connector system 2000 at vertex E 2002. Movement of spar 1319 due to rotation caused by primary actuator 1314 may translate into movement of vertex E 2002. As depicted, movement of vertex E 2002 may cause movement of vertex E 2004. Movement of vertex E 2002 and vertex E 2004 may cause deformable assemblies 1356 and 1358 to change form and height. For example, height 1392 of deformable assembly 1356 may be changed in response to movement of vertex E 2002. These changes may, in turn, lead to changes in the diagonal lengths for bays 1330 and 1332.

In this manner, linking system 2600 may reduce the number of actuators needed to change the shape of structure 1301 and give flap 1300 a curved shape. In these illustrative examples, flap 1300 may have a second linking system (not shown) connected to a second connector system (not shown) at a vertex E (not shown) at end 1311 of flap 1300.

Using linking system 2600, the movement and changing of the deformable assemblies for flap 1300 may be substantially the same as the movement and changing of the deformable assemblies for flap 1300 using horizontal actuators. Linking system 2600 may reduce the number of actuators used to a total of one actuator. Further, linking system 2600 may be connected directly to vertex E 2002 unlike horizontal member 1378, which may be connected to vertex D 1376.

Figure 29:
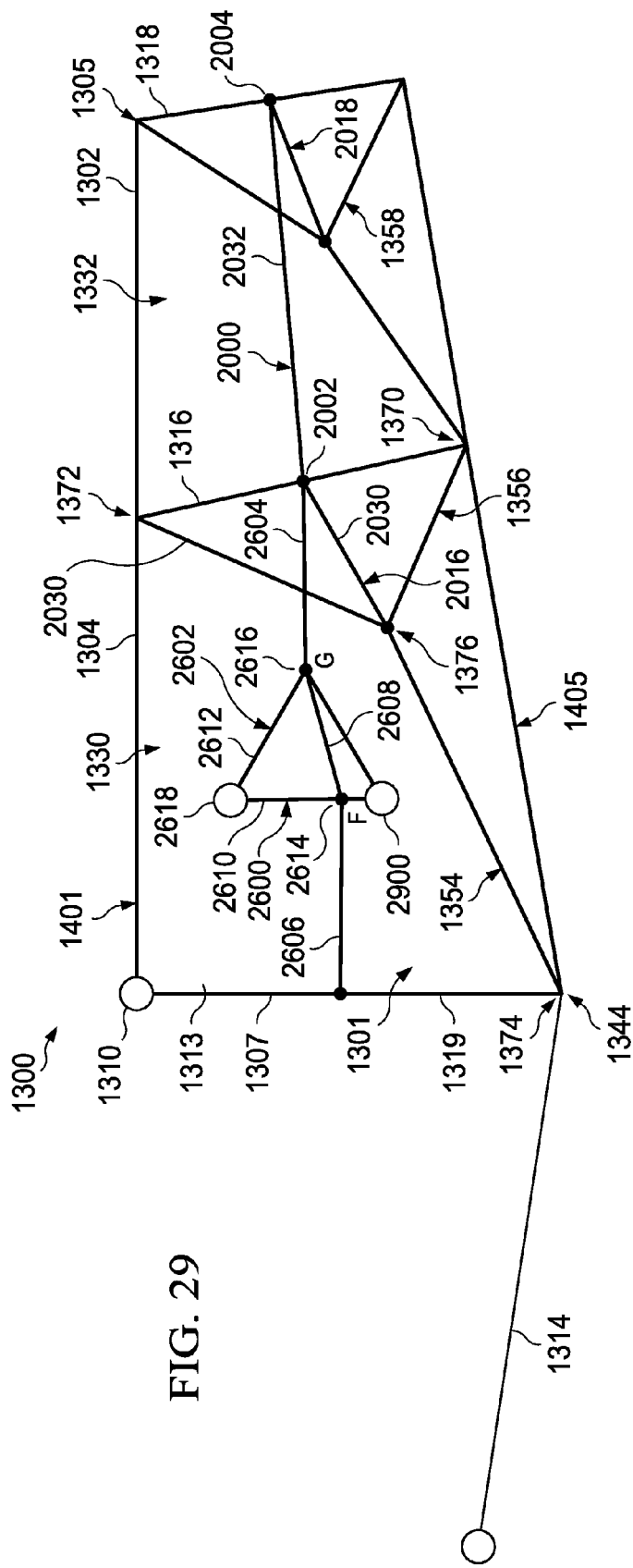
FIG. 29 is a cross-sectional view of a flap in an undeployed configuration in accordance with an advantageous embodiment.

With reference now to FIG. 29, a cross-sectional view of a flap in an undeployed configuration is depicted in accordance with an advantageous embodiment. This view of flap 1300 may be a view of end 1313 of flap 1300. Flap 1300 may have undeployed configuration 1305 with a straight shape. In this view of flap 1300, second side 1405 of structure 1301 may be seen. In this example, flap 1300 may have linking system 2600 in FIG. 26. Further, both hinge point 2618 and hinge point 2900 for polyhedron structure 2602 may be seen.

In these illustrative examples, the diagonal lengths and quadrilateral shapes for the bays of flap 1300 may be changed to change the shape of structure 1301. For example, primary actuator 1314 may rotate spar 1319 and structure 1301 about hinge point 1310 and hinge point 1309 (not shown). This rotation causes polyhedron structure 2602 of linking system 2600 to rotate about hinge points 2618 and 2900. This rotation of polyhedron structure 2602 moves vertex E 2002, which may then cause vertex D 1376 to move. Movement of vertex D 1376 may change the diagonal length and the quadrilateral shape for bay 1330. Connector system 2000 may relate these changes to the other bays of flap 1300.

Figure 30:
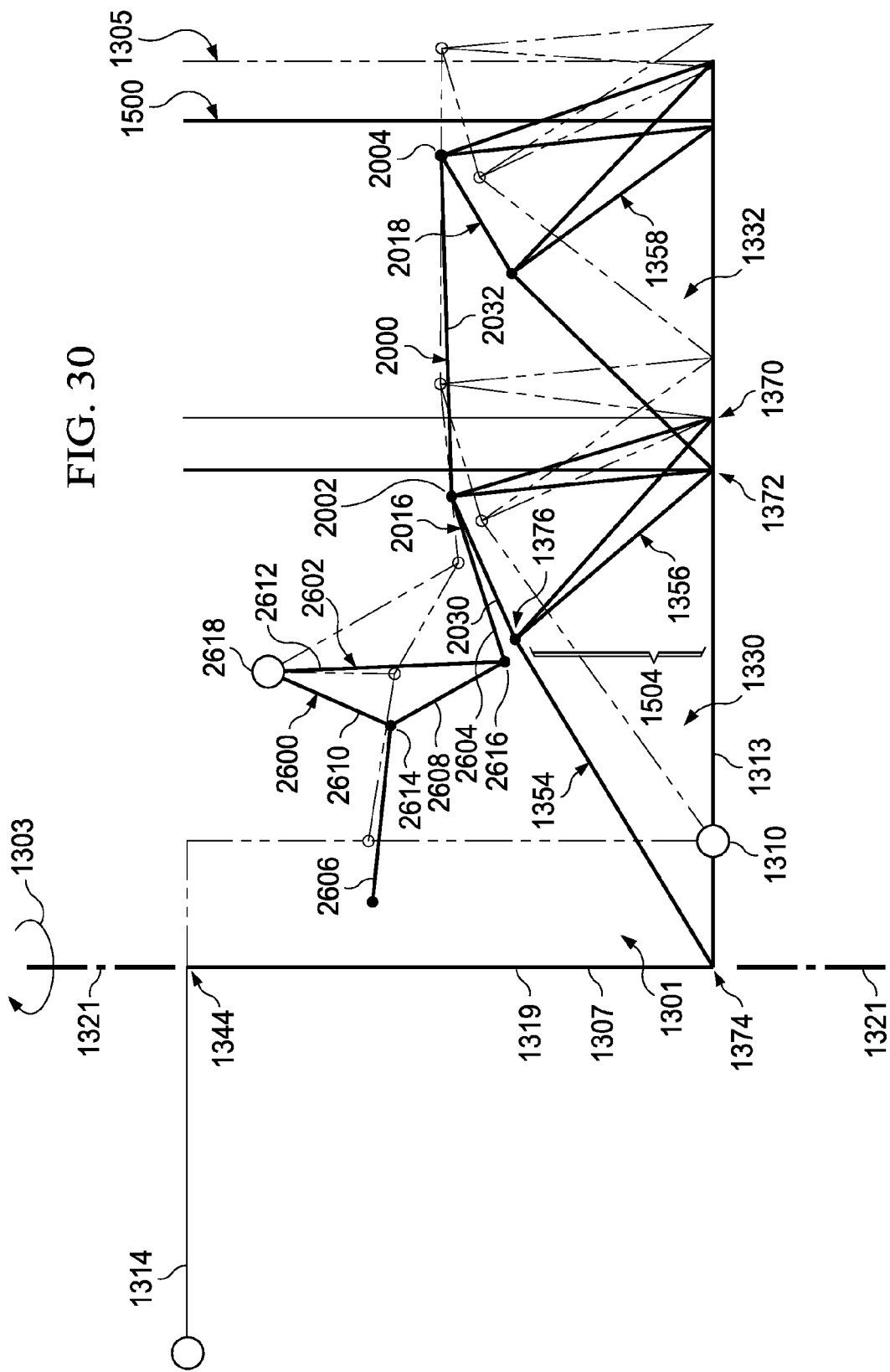
FIG. 30 is an exposed top view of a flap in a deployed configuration in accordance with an advantageous embodiment.

With reference now to FIG. 30, an exposed top view of flap 1300 in a deployed configuration is depicted in accordance with an advantageous embodiment. Flap 1300 may have deployed configuration 1500. In deployed configuration 1500, connector system 2000 may be moved in response to rotation of spar 1319 and polyhedron structure 2602 of linking system 2600 caused by primary actuator 1314.

Figure 31:
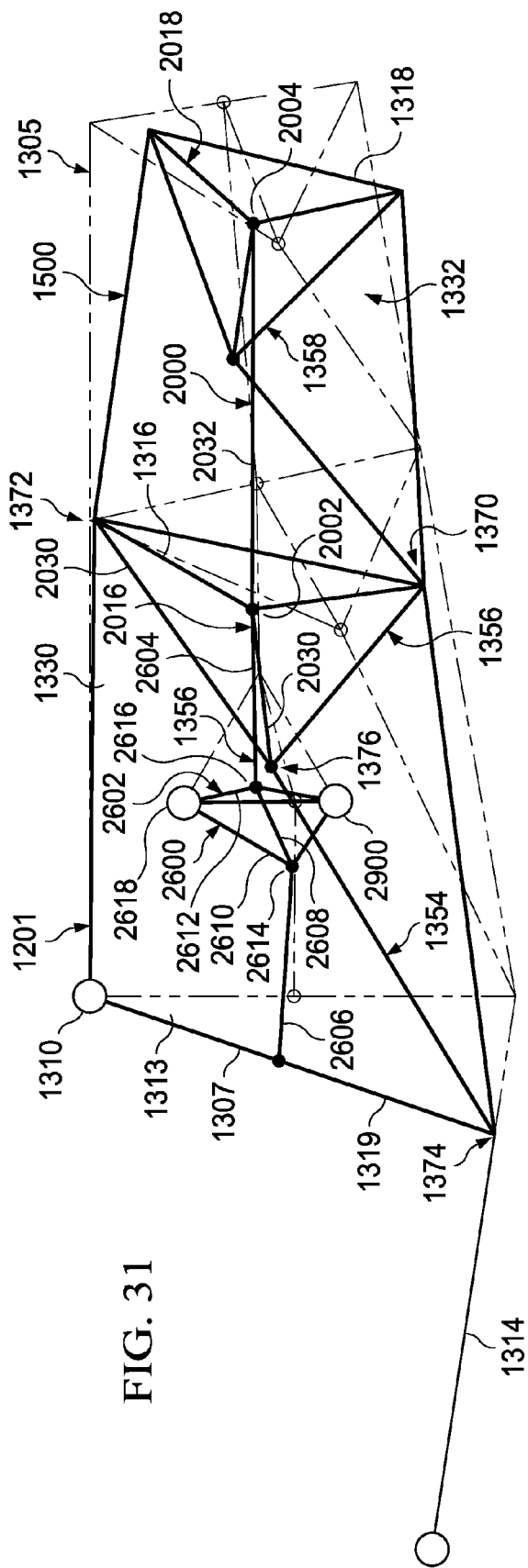
FIG. 31 is a cross-sectional view of a flap in a deployed configuration in accordance with an advantageous embodiment.

With reference now to FIG. 31, a cross-sectional view of flap 1300 in a deployed configuration is depicted in accordance with an advantageous embodiment. Flap 1300 may have deployed configuration 1500.

In response to rotation of spar 1319 by primary actuator 1314, polyhedron structure 2602 of linking system 2600 may rotate about hinge points 2618 and 2900. This rotation may change the shape of structure 1301 and flap 1300.

Figure 32:
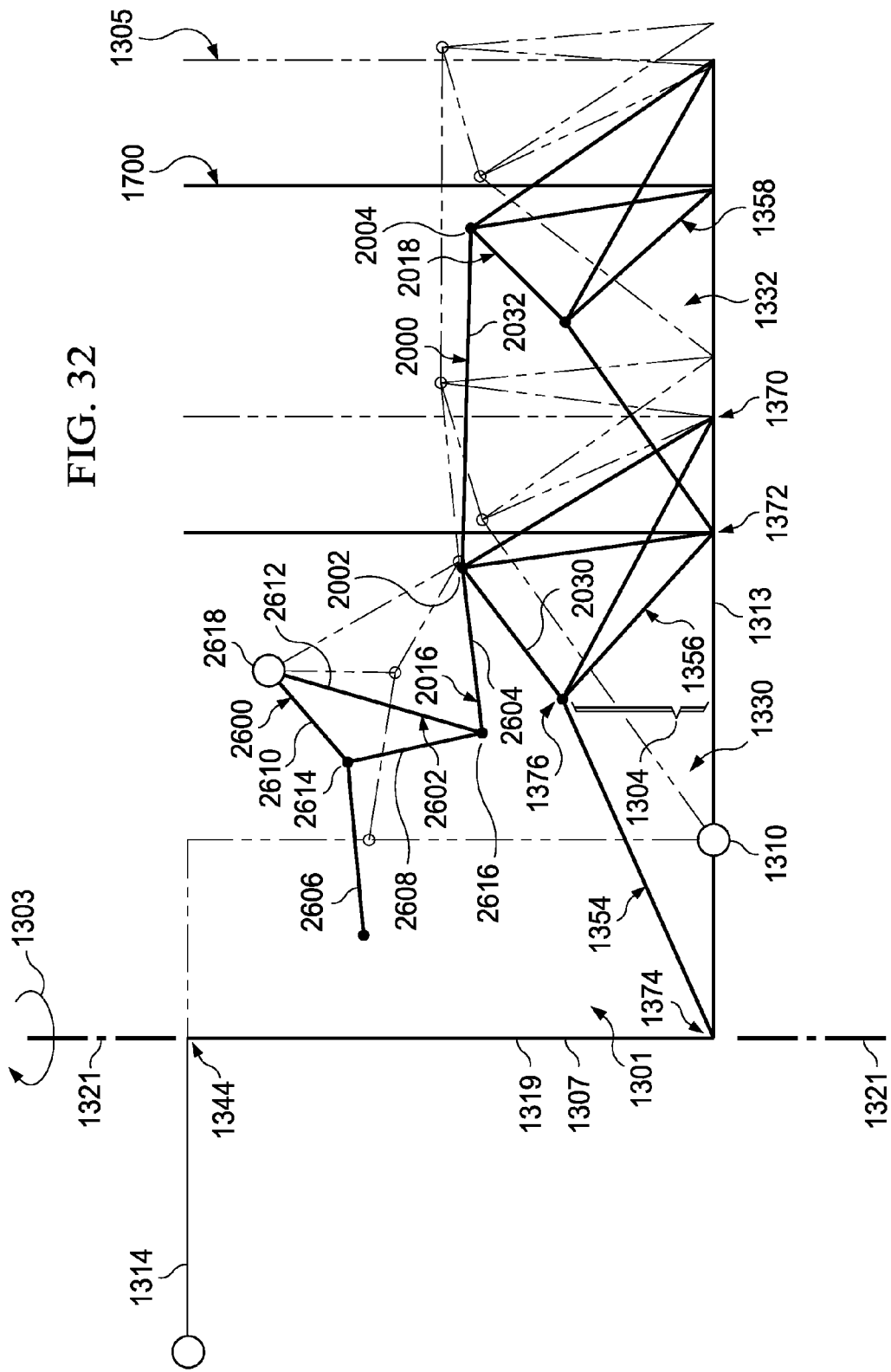
FIG. 32 is an exposed top view of a flap in a deployed configuration in accordance with an advantageous embodiment.

With reference now to FIG. 32, an exposed top view of flap 1300 in a deployed configuration is depicted in accordance with an advantageous embodiment. Flap 1300 may have deployed configuration 1700.

Polyhedron structure 2602 of linking system 2600 may be rotated in response to rotation of spar 1319 by primary actuator 1314. Rotation of polyhedron structure 2602 may move vertex E 2002, which may in turn, move vertex D 1376 and connector system 2000. In this manner, linking system 2600 may be used to change the heights and forms of the deformable assemblies of flap 1300.

Figure 33:
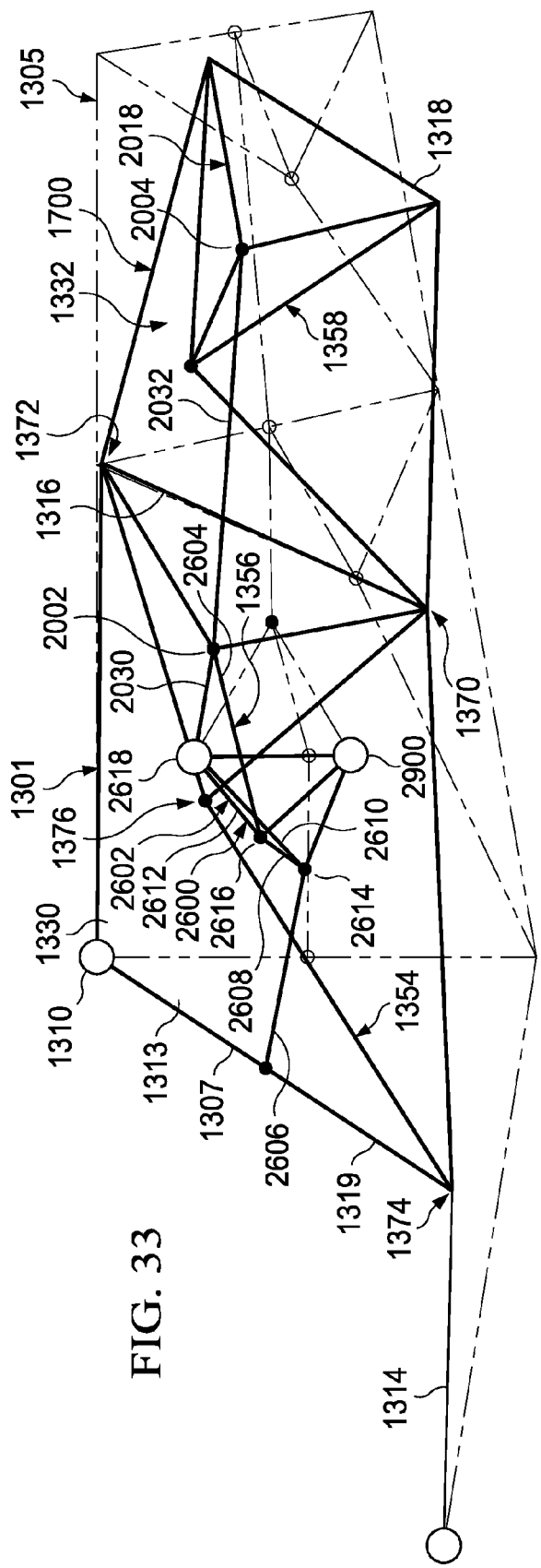
FIG. 33 is a cross-sectional view of a flap in a deployed configuration in accordance with an advantageous embodiment.

With reference now to FIG. 33, a cross-sectional view of flap 1300 in a deployed configuration is depicted in accordance with an advantageous embodiment. Flap 1300 may have deployed configuration 1700. Rotation of spar 1319 by primary actuator 1314 may translate into forming deployed configuration 1700 with a curved shape for flap 1300.

The illustrations of flap 900 in FIGS. 9-11 and flap 1300 in FIGS. 13-18, 20-26, and 28-33 are not meant to imply physical or architectural limitations to the manner in which a flap may be implemented. Other components in addition to, or in place of, the ones illustrated may be used in some advantageous embodiments. Some components illustrated in flap 900 may be omitted in some advantageous embodiments.

For example, in other advantageous embodiments, flap 900 and flap 1300 may have a different number of bays than shown. In some advantageous embodiments, flap 900 and flap 1300 may have more than one bay in the spanwise direction. Further, flap 900 may have additional diagonal members in the center of its bays to provide additional support. This additional support may help flap 900 operate even under conditions of damage that may be sustained due to battle, malfunction, or some other condition. In the same manner, flap 1300 may have additional deformable assemblies positioned in the center of its bays to provide additional support.

In other advantageous embodiments, deformable assemblies 1356-1368 may be attached to structure 1301 in a manner to cause movement of vertex D 1376 in an opposite direction.

Figure 34:
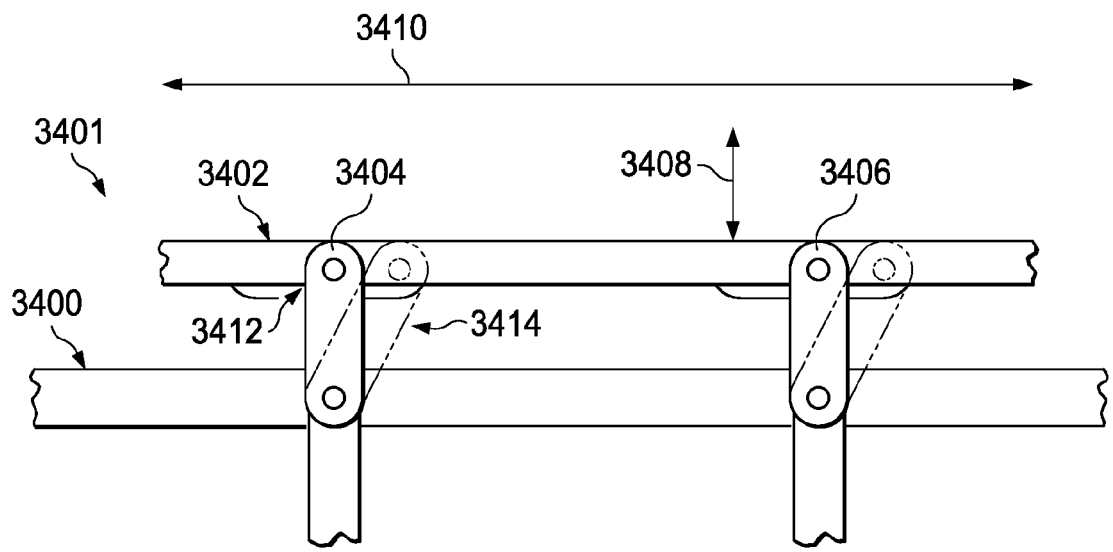
FIG. 34 is a diagram of a portion of a truss of a structure of a flap in accordance with an advantageous embodiment.

With reference now to FIG. 34, a diagram of a portion of a truss of a structure of a flap is depicted in accordance with an advantageous embodiment. In these illustrative examples, truss 3400 may be one example of one implementation of a truss such as, for example, truss 130 in FIG. 1 and truss 912 in FIG. 9. Truss 3400 may be a part of structure 3401 of a flap. Structure 3401 may be one example of a structure for a flap such as, for example, structure 911 for flap 900 in FIG. 9.

The portion of truss 3400 depicted in FIG. 34 may show a portion of a flexible skin, such as flexible skin 3402 attached to truss 3400. In this view, flexible skin 3402 may be attached to truss 3400 by link 3404 and link 3406. When the shape of structure 3401 changes in response to one of the mechanisms described above, flexible skin 3402 may be restrained by links 3404 and 3406 in the directions of axis 3408. Axis 3408 may be axis normal to flexible skin 3402.

Further, links 3404 and 3406 may allow flexible skin 3402 to slide along truss 3400 and structure 3401 in chordwise direction 3410 in a manner that does not lengthen or shorten flexible skin 3402. For example, flexible skin 3402 may slide from position 3412 to position 3414 using links 3404 and 3406 without lengthening or shortening. In other advantageous embodiments, mechanisms other than links, such as links 3404 and 3406, may be used.

Figure 35:
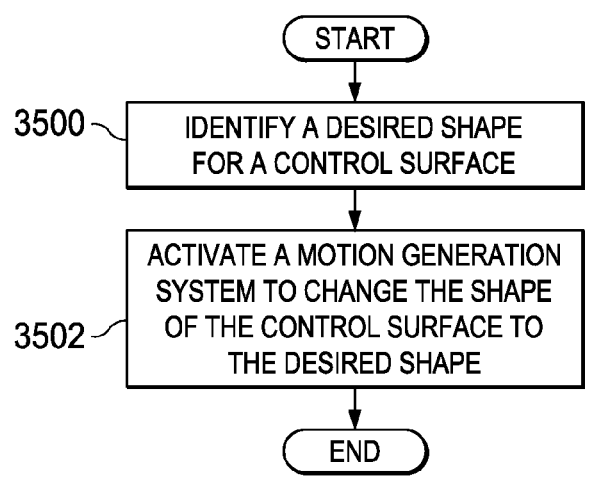
FIG. 35 is a flowchart of a method for controlling a control surface in accordance with an advantageous embodiment.

With reference now to FIG. 35, a flowchart of a method for controlling a control surface is depicted in accordance with an advantageous embodiment. In these examples, the process illustrated in FIG. 35 may be performed for a control surface such as, for example, without limitation, control surface 100 in FIG. 1.

The process may begin by identifying a desired shape for the control surface (operation 3500). The control surface may comprise a structure having a first side and a second side substantially opposite to the first side. A flexible skin may be attached to the first side and the second side of the structure. Further, a plurality of deformable assemblies may be moveably connected to the structure. Each deformable assembly in the plurality of deformable assemblies may have a vertex, a base, and a height that is capable of changing to change a shape of the control surface.

The process then activates a motion generation system to change the shape of the control surface to the desired shape (operation 3502). The motion generation system may be connected to the vertex of a deformable assembly to move the vertex to change the height of a number of deformable assemblies in the plurality of deformable assemblies to change the shape of the control surface. Thereafter, the process may terminate.

Although the different advantageous embodiments in the illustrative examples are described with respect to an aircraft, one or more of the different advantageous embodiments may be applied to other vehicles other than aircraft such as, for example, without limitation, a submarine, a personnel carrier, a tank, a train, an automobile, a bus, a spacecraft, a surface ship, and other suitable vehicles.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a structure having a first side and a second side substantially opposite to the first side;
   a flexible skin attached to the first side and the second side of the structure; and
   a plurality of deformable assemblies moveably connected to the structure, in which each deformable assembly in the plurality of deformable assemblies has a vertex and a base, wherein the each deformable assembly in the plurality of deformable assemblies has a height that is capable of changing to change a shape of the structure and a shape of the flexible skin.

2. The apparatus of claim 1 further comprising:
   a motion generation system capable of moving the vertex of the each deformable assembly in the plurality of deformable assemblies to change the height of the each deformable assembly in the plurality of deformable assemblies to change the shape of the structure and the shape of the flexible skin attached to the structure.

3. The apparatus of claim 2, wherein the structure has a plurality of bays and a tip section and wherein a number of deformable assemblies in the plurality of deformable assemblies are located in each of the plurality of bays.

4. The apparatus of claim 3, wherein the each of the plurality of bays has a diagonal length, wherein the diagonal length changes as the height of the each deformable assembly in the plurality of deformable assemblies changes.

5. The apparatus of claim 4, wherein the each of the plurality of bays has a quadrilateral shape, wherein the quadrilateral shape changes as a diagonal length for the quadrilateral shape changes.

6. The apparatus of claim 1, wherein the plurality of deformable assemblies is moveably connected to the structure.

7. The apparatus of claim 1, wherein the structure includes a truss.

8. The apparatus of claim 1, wherein a base of the structure is moveably attached to a frame of a part.

9. The apparatus of claim 8, wherein the part is selected from one of a wing, a horizontal stabilizer, and a vertical stabilizer.

10. The apparatus of claim 8, wherein the structure further comprises:
a spar, wherein the spar is moveably connected to a frame of the part.

11. The apparatus of claim 1, further comprising:
a number of stiffening elements at a number of locations on the flexible skin, wherein the number of stiffening elements is capable of stiffening the flexible skin in a spanwise direction at the number of locations.

12. The apparatus of claim 3, wherein the motion generation system further comprises:
a primary actuator, wherein the primary actuator is capable of rotating the structure about an axis.

13. The apparatus of claim 12, wherein the structure has a spar moveably attached to a frame of a part at hinge points on the spar and wherein the hinge points are aligned to form the axis.

14. The apparatus of claim 3, wherein the motion generating system further comprises:
a horizontal actuator system, wherein the horizontal actuator system comprises a number of horizontal actuators capable of changing the height of the each deformable assembly in the plurality of deformable assemblies in the plurality of bays to change the shape of the structure.

15. The apparatus of claim 14, wherein each of the number of horizontal actuators is connected to a first vertex of a first deformable assembly in a first number of deformable assemblies connected to a first end of the structure and a second vertex of a second deformable assembly in a second number of deformable assemblies connected to a second end of the structure.

16. The apparatus of claim 15, wherein a length of the each of the number of horizontal actuators changes to move the first vertex of the first deformable assembly connected to the first end of the structure and the second vertex of the second deformable assembly connected to the second end of the structure to change the height of the plurality of deformable assemblies.

17. The apparatus of claim 3, wherein the motion generation system is connected to a first vertex of a first deformable assembly in a first bay of the plurality of bays and a second vertex of a second deformable assembly in the first bay and wherein a first number of the plurality of deformable assemblies has a first number of vertices linked in series to the first vertex and wherein a second number of the plurality of deformable assemblies has a second number of vertices linked in series to the second vertex.

18. The apparatus of claim 3, wherein an actuator in the motion generation system is connected to a first vertex of a first deformable assembly in a first bay of the plurality of bays and a second vertex of a second deformable assembly in the first bay and further comprises:
a connector system capable of connecting the first vertex of the first deformable assembly in the first bay to a first number of deformable assemblies in the plurality of deformable assemblies in the plurality of bays; and connecting the second vertex of the second deformable assembly connected in the first bay to a second number of deformable assemblies in the plurality of deformable assemblies in the plurality of bays.

19. The apparatus of claim 18, wherein the actuator moves the first vertex of the first deformable assembly in the first bay and the second vertex of the second deformable assembly in the first bay to change a first height of the first deformable assembly and a second height of the second deformable assembly.

20. The apparatus of claim 19, wherein a change in the first height of the first deformable assembly and the second height of the second deformable assembly in the first bay causes the connector system to change heights of deformable assemblies in other bays in the plurality of bays to change the shape of the structure.

21. The apparatus of claim 17, wherein the motion generation system comprises a primary actuator connected to the structure, wherein the primary actuator is connected to a base of the structure and capable of rotating the structure about an axis and further comprising:
a linking system connected to the base of the structure and the connector system, wherein the primary actuator changes the shape of the structure when rotating the structure about the axis.

22. The apparatus of claim 21, wherein the linking system comprises:
a polyhedron structure connected to the base of the structure and to a connector system capable of connecting the first vertex of the first deformable assembly in the first bay to the first number of deformable assemblies in the plurality of deformable assemblies in the plurality of bays; and connecting the second vertex of the second deformable assembly connected in the first bay to the second number of deformable assemblies in the plurality of deformable assemblies in the plurality of bays.

23. The apparatus of claim 22, wherein the linking system further comprises:
a first member connected to the polyhedron structure and the connector system; and
a second member connected to the polyhedron structure and the base of the structure.

24. The apparatus of claim 18, wherein the connector system comprises:
a plurality of connection structures connected to the plurality of deformable assemblies, wherein each connection structure in the plurality of connection structures has a vertex and a plurality of members extending from the vertex to an associated deformable assembly in the plurality of deformable assemblies.

25. The apparatus of claim 24, wherein a first member of the plurality of members in the each connection structure is connected to the vertex of the associated deformable assembly and a number of other members in the plurality of members is connected to the base of the associated deformable assembly.

26. The apparatus of claim 1, wherein the shape of the structure is selected from one of a straight shape and a curved shape.

27. The apparatus of claim 1, wherein the structure is one of a flap, an aileron, a rudder, an elevator, an elevon, a ruddevator, a spoiler, an air brake, and a thrust reverser.

28. The apparatus of claim 1, wherein the apparatus is a trailing edge control surface.

29. The apparatus of claim 1 further comprising:
a vehicle, wherein the structure, the flexible skin, and the plurality of deformable assemblies form a control surface and wherein the control surface is attached to and located in the vehicle.

30. The apparatus of claim 29, wherein the vehicle is selected from one of a mobile platform, an aircraft, a surface ship, a tank, a personnel carrier, a train, a spacecraft, a submarine, a bus, and an automobile.

31. An apparatus comprising:
a structure having a first side and a second side substantially opposite to the first side;
a plurality of bays located within the structure;
a flexible skin attached to the first side and the second side of the structure;
a plurality of deformable assemblies moveably connected to the structure, in which each deformable assembly in the plurality of deformable assemblies has a vertex and a base, wherein the each deformable assembly in the plurality of deformable assemblies has a height that is capable of changing to change a shape of the structure and a shape of the flexible skin;
a plurality of connection structures connected to the plurality of deformable assemblies, wherein each connection structure in the plurality of connection structures has a vertex and a plurality of members extending from the vertex to an associated deformable assembly in the plurality of deformable assemblies, and wherein a first member of the plurality of members is connected to the vertex of the associated deformable assembly and a number of other members in the plurality of members are connected to a base of the associated deformable assembly; and
an actuator system connected to a first vertex of a first deformable assembly in a first bay of the plurality of bays and a second vertex of a second deformable assembly in the first bay, wherein a first number of the plurality of deformable assemblies has a first number of vertices linked in series to the first vertex, wherein a second number of the plurality of deformable assemblies has a second number of vertices linked in series to the second vertex, and wherein the actuator system is capable of moving the first vertex and the second vertex to change the shape of the structure and the shape of the flexible skin attached to the structure.

32. The apparatus of claim 31, wherein the actuator system comprises an actuator connected to the first vertex and the second vertex.

33. The apparatus of claim 31, wherein movement of the first vertex and the second vertex causes heights for vertices of the plurality of deformable assemblies to change such that the plurality of bays change shape to change the shape of the structure and the shape of the flexible skin attached to the structure.

34. The apparatus of claim 31, wherein the shape of the structure and the shape of the flexible skin changes by bending.

35. The apparatus of claim 34, wherein the shape bends from around 0 degrees to around 60 degrees.

36. The apparatus of claim 31 further comprising:
a number of stiffening elements at a number of locations on the flexible skin, wherein the number of stiffening elements are capable of stiffening the flexible skin in a spanwise direction at the number of locations.

37. The apparatus of claim 31, wherein the structure has a base and a tip, wherein the base is rotatably connected to a frame of a vehicle, and wherein the actuator system is capable of rotating the structure while changing the shape of the structure.

38. The apparatus of claim 31, wherein the shape of the structure is selected from one of a straight shape and a curved shape.

39. The apparatus of claim 31 further comprising:
a vehicle, wherein the structure is connected to the vehicle and forms a control surface.

40. The apparatus of claim 39, wherein the vehicle is selected from one of a mobile platform, an aircraft, a surface ship, a tank, a personnel carrier, a train, a spacecraft, a submarine, a bus, and an automobile.

41. An apparatus comprising:
a structure having a first side, a second side substantially opposite to the first side, and a base rotatably connected to a frame;
a plurality of bays located within the structure;
a flexible skin attached to the first side and the second side of the structure;
a plurality of deformable assemblies moveably connected to the structure, in which each deformable assembly in the plurality of deformable assemblies has a vertex, and a base, wherein the vertex has a height that is capable of changing to change a shape of the structure and a shape of the flexible skin;
a plurality of connection structures connected to the plurality of deformable assemblies, wherein each connection structure in the plurality of connection structures has a vertex and a plurality of members extending from the vertex to an associated deformable assembly in the plurality of deformable assemblies, wherein a first member of the plurality of members is connected to the vertex of the associated deformable assembly and a number of other members in the plurality of members is connected to a base of the associated deformable assembly and wherein vertices in a number of connection structures in the plurality of connection structures are connected in series to each other;
a polyhedron structure having a first vertex and a second vertex forming an edge of the polyhedron structure; a first elongate member extending from a third vertex of the polyhedron structure to the base of the structure; and a second elongate member extending from a fourth vertex to a first vertex in a first connection structure in the number of connection structures; and
an actuator connected to the base of the structure, wherein the actuator is capable of moving the base to rotate the structure, and wherein movement of the base is capable of causing the polyhedron structure to move the first vertex in the first connection structure such that the vertex of the associated deformable assembly changes height to change the shape of the structure and the shape of the flexible skin attached to the structure.

42. The apparatus of claim 41, wherein the shape of the structure and the shape of the flexible skin changes by bending.

43. The apparatus of claim 42, wherein the shape bends at an angle.

44. The apparatus of claim 41 further comprising:
a number of stiffening elements at a number of locations on the flexible skin, wherein the number of stiffening elements are capable of stiffening the flexible skin in a spanwise direction at the number of locations.

45. The apparatus of claim 41 further comprising:
a vehicle, wherein the structure is connected to the vehicle and forms a control surface.

46. The apparatus of claim 45, wherein the vehicle is selected from one of a mobile platform, an aircraft, a surface ship, a tank, a personnel carrier, a train, a spacecraft, a submarine, a bus, and an automobile.

47. An apparatus comprising:
a structure, wherein the structure has a base rotatably attached to a frame;
a flexible skin attached to the structure;
an array of bays in the structure having a quadrilateral shape and capable of changing shape; and
a plurality of diagonal members connected to corners in the array of bays and wherein the plurality of diagonal members is capable of changing a length in connection with each other to change the quadrilateral shape of the array of bays to change a shape of the structure and wherein one of the plurality of diagonal members is capable of rotating the structure with a control surface about the frame.

48. The apparatus of claim 47, wherein the frame is located in a wing of an aircraft and the flexible skin and the structure form a flap for the aircraft.

49. The apparatus of claim 47, wherein the plurality of diagonal members is a plurality of linear actuators.

50. A method for controlling a control surface, the method comprising:
identifying a desired shape for the control surface comprising a structure having a first side and a second side substantially opposite to the first side; a flexible skin attached to the first side and the second side of the structure; and a plurality of deformable assemblies moveably connected to the structure, wherein each deformable assembly in the plurality of deformable assemblies has a vertex and a base, and wherein the each deformable assembly in the plurality of deformable assemblies has a height that is capable of changing to change a shape of the control surface; and
activating a motion generation system connected to the vertex to move the vertex to change the height of a number of deformable assemblies in the plurality of deformable assemblies to change the shape of the control surface to the desired shape.

51. The method of claim 50, wherein the structure has a plurality of bays and a tip section and wherein a number of deformable assemblies in the plurality of deformable assemblies are located in each of the plurality of bays.

52. The method of claim 51, wherein the each of the plurality of bays has a diagonal length, wherein the diagonal length changes as the height of the each deformable assembly in the plurality of deformable assemblies changes.

53. The method of claim 52, wherein the each of the plurality of bays has a quadrilateral shape, wherein the quadrilateral shape changes as a diagonal length for the quadrilateral shape changes.

54. The method of claim 50, wherein the plurality of deformable assemblies is moveably connected to the structure.

55. The method of claim 50, wherein the structure includes a truss.

56. The method of claim 50, wherein a base of the structure is moveably attached to a frame of a part.

57. The method of claim 56, wherein the part is selected from one of a wing, a horizontal stabilizer, and a vertical stabilizer.

58. The method of claim 56, wherein the structure further comprises:
a spar, wherein the spar is moveably connected to the frame of the part.

59. The method of claim 50, further comprising:
a number of stiffening elements at a number of locations on the flexible skin, wherein the number of stiffening elements is capable of stiffening the flexible skin in a spanwise direction at the number of locations.

60. The method of claim 50, wherein the activating step further comprises:
rotating the control surface.

* * * * *

UNITED STATES PATENT AND TRADEMARK OFFICE
CERTIFICATE OF CORRECTION

| | |
|---|---|
| PATENT NO. | : 8,056,865 B2 |
| APPLICATION NO. | : 12/398951 |
| DATED | : November 15, 2011 |
| INVENTOR(S) | : Grip |

Page 1 of 1

It is certified that error appears in the above-identified patent and that said Letters Patent is hereby corrected as shown below:

Title page, Item (75) Inventor: Delete "Ranchos" and insert -- Rancho --.

Signed and Sealed this
Twenty-first Day of May, 2013

Teresa Stanek Rea
*Acting Director of the United States Patent and Trademark Office*